(12) United States Patent
Song

(10) Patent No.: US 11,861,369 B2
(45) Date of Patent: Jan. 2, 2024

(54) PROCESSING-IN-MEMORY (PIM) DEVICE

(71) Applicant: SK hynix Inc., Icheon-si (KR)

(72) Inventor: Choung Ki Song, Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 306 days.

(21) Appl. No.: 17/149,622

(22) Filed: Jan. 14, 2021

(65) Prior Publication Data

US 2021/0208894 A1 Jul. 8, 2021

Related U.S. Application Data

(63) Continuation-in-part of application No. 17/090,462, filed on Nov. 5, 2020, now Pat. No. 11,537,323.

(60) Provisional application No. 62/960,961, filed on Jan. 14, 2020, provisional application No. 62/960,969, filed on Jan. 14, 2020, provisional application No. 62/958,223, filed on Jan. 7, 2020.

(30) Foreign Application Priority Data

Jan. 17, 2020 (KR) ........................ 10-2020-0006902

(51) Int. Cl.
*G06F 9/38* (2018.01)
*G06F 9/30* (2018.01)
*G06F 17/16* (2006.01)
*G06F 7/544* (2006.01)
*G06F 12/02* (2006.01)

(52) U.S. Cl.
CPC .......... *G06F 9/3893* (2013.01); *G06F 7/5443* (2013.01); *G06F 9/3001* (2013.01); *G06F 12/0207* (2013.01); *G06F 12/0238* (2013.01); *G06F 17/16* (2013.01)

(58) Field of Classification Search
CPC .. G06F 7/5443; G06F 9/3893; G06F 12/0238; G06F 12/0207; G06F 9/3001
See application file for complete search history.

(56) References Cited

U.S. PATENT DOCUMENTS

| | | | |
|---|---|---|---|
| 10,042,639 | B2 | 8/2018 | Gopal et al. |
| 2019/0303167 | A1 | 10/2019 | Hughes et al. |
| 2020/0193277 | A1 | 6/2020 | Kwon |
| 2020/0294575 | A1 | 9/2020 | O et al. |
| 2021/0072987 | A1* | 3/2021 | Yudanov ............... G06F 9/3001 |

FOREIGN PATENT DOCUMENTS

| | | |
|---|---|---|
| KR | 101921433 B1 | 11/2018 |
| KR | 1020200019736 A | 2/2020 |

\* cited by examiner

*Primary Examiner* — Zachary K Huson
(74) *Attorney, Agent, or Firm* — WILLIAM PARK & ASSOCIATES LTD.

(57) ABSTRACT

A PIM device writes elements of a first matrix to a first memory bank, and may writes elements of a second matrix to a second memory bank. The PIM device simultaneously reads elements with the same order among the elements of the first and second matrices by simultaneously accessing the first and second memory banks. An MAC operator generates arithmetic data by performing a calculation on data that is read from the first and second memory banks, and writes the arithmetic data to a third memory bank.

19 Claims, 55 Drawing Sheets

FIG. 38
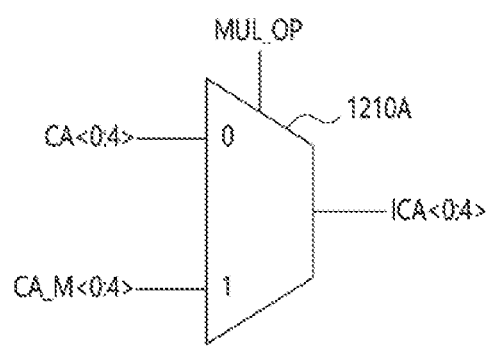
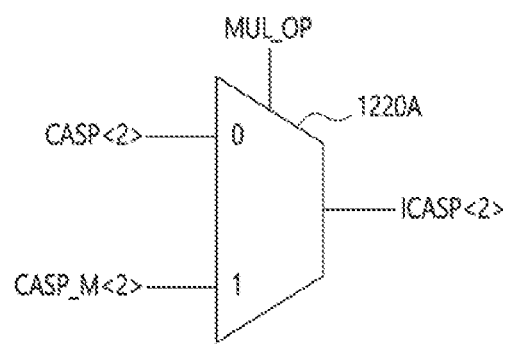

FIG. 45
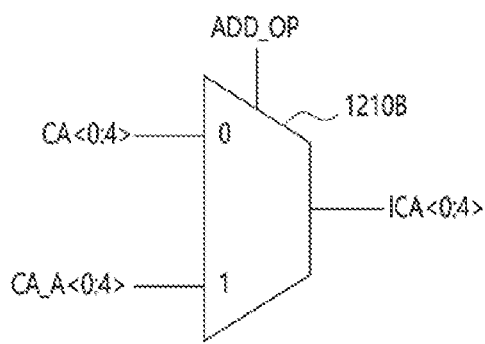
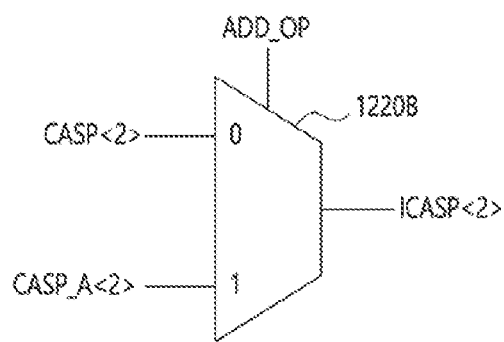

FIG. 53
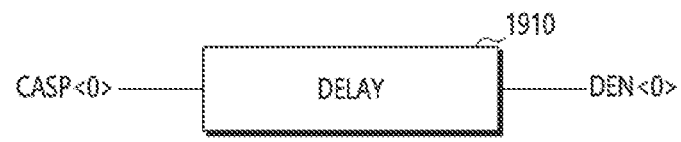
FIG. 54
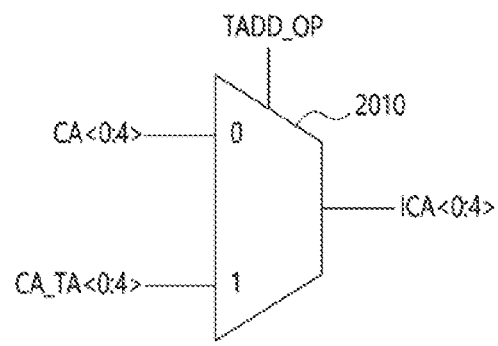
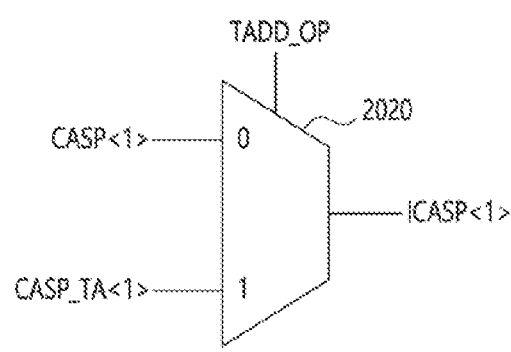

PROCESSING-IN-MEMORY (PIM) DEVICE

CROSS-REFERENCE TO RELATED APPLICATIONS

The present application claims priority to provisional application No. 62/960,961, filed on Jan. 14, 2020, and provisional application No. 62/960,969, filed on Jan. 14, 2020 and this application is a continuation-in-part of U.S. patent application Ser. No. 17/090,462, filed on Nov. 5, 2020, which claims priority under 35 U.S.C. 119(a) to provisional application No. 62/958,223, filed on Jan. 7, 2020, and Korean Application No. 10-2020-0006902, filed on Jan. 17, 2020, which are incorporated herein by references in their entirety.

BACKGROUND

1. Technical Field

Various embodiments of the present disclosure relate to processing-in-memory (PIM) devices and, more particularly, to PIM devices performing a deterministic arithmetic operation.

2. Related Art

Recently, interest in artificial intelligence (AI) has been increasing not only in the information technology industry but also in the financial and medical industries. Accordingly, in various fields, artificial intelligence, more precisely, the introduction of deep learning, is considered and prototyped. One cause of this widespread interest may be due to the improved performance of processors performing arithmetic operations. To improve the performance of artificial intelligence, it may be necessary to increase the number of layers constituting a neural network of the artificial intelligence to educate the artificial intelligence. This trend has continued in recent years, which has led to an exponential increase in the amount of computations required for hardware actually performing the computations. Moreover, if artificial intelligence employs a general hardware system including a memory and a processor which are separated from each other, the performance of the artificial intelligence may be degraded due to a limitation of the amount of data communication between the memory and the processor. In order to solve this problem, a PIM device in which a processor and memory are integrated in one semiconductor chip has been used as a neural network computing device. Because the PIM device directly performs arithmetic operations in the PIM device, a data processing speed in the neural network may be improved.

SUMMARY

In an embodiment, a processing-in-memory (PIM) device may include at least one multiplication-accumulative addition (MAC) operator coupled to at least a first memory bank, a second memory bank, and a third memory bank. A method for operating the PIM device may include writing data, corresponding to a plurality of elements of a first matrix, to the first memory bank, and writing data, corresponding to a plurality of elements of a second matrix, to the second memory bank. The method may include reading data, corresponding to elements with the same order among the pluralities of elements of the first and second matrices, from the first and second memory banks. The method may include generating arithmetic data by performing a calculation on data that is read from the first and second memory banks. And the method may include writing the arithmetic data to the third memory bank.

In an embodiment, a processing-in-memory (PIM) device may include a first memory bank, a second memory bank, a third memory bank, a column control circuit, and a multiplication-accumulative addition (MAC). The first memory bank may be configured to output data that corresponds to a plurality of elements of a first matrix based on a first bank access control signal and a bank column address signal. The second memory bank may be configured to output data that corresponds to a plurality of elements of a second matrix based on a second bank access control signal and the bank column address signal. The third memory bank may be configured to store arithmetic data based on a delayed bank access control signal and a delayed column address signal. The column control circuit may be configured to generate the first bank access control signal, the second bank access control signal, and an arithmetic operation signal based on a calculation signal, and configured to generate the bank column address signal based on a column address signal. The MAC operator may be configured to generate the arithmetic data by performing a calculation on data that is output from the first and second memory banks, provide the arithmetic data to the third memory bank, and generate the delayed bank access control signal and the delayed column address signal based on the first bank access control signal, the second bank access control signal, the arithmetic operation signal, and the bank column address signal.

BRIEF DESCRIPTION OF THE DRAWINGS

Certain features of the disclosed technology are illustrated by various embodiments with reference to the attached drawings.

FIG. 38 is a diagram illustrating a part among components of a Y-decoder/I/O circuit of a third memory bank of FIG. 33.

FIG. 45 is a diagram illustrating a part among components of a Y-decoder/I/O circuit of a third memory bank of FIG. 40.

FIG. 53 is a diagram illustrating a part among components of a Y-decoder/I/O circuit of a first memory bank of FIG. 49.

FIG. 54 is a diagram illustrating a part among components of a Y-decoder/I/O circuit of a second memory bank of FIG. 49.

DETAILED DESCRIPTION OF THE EMBODIMENTS

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean relative positional relationship, but not used to limit certain cases for which the element directly contacts the other element, or at least one intervening element is present between the two elements. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements between the two elements. Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed. A logic "high" level and a logic "low" level may be used to describe logic levels of electric signals. A signal with a logic "high" level may be distinguished from a signal with a logic "low" level. For example, when a signal with a first voltage corresponds to a signal with a logic "high" level, a signal with a second voltage may correspond to a signal with a logic "low" level. In an embodiment, the logic "high" level may be set as a voltage level which is higher than a voltage level of the logic "low" level. Meanwhile, logic levels of signals may be set to be different or opposite according to embodiment. For example, a certain signal with a logic "high" level in one embodiment may be set to have a logic "low" level in another embodiment.

Various embodiments of the present disclosure will be described hereinafter in detail with reference to the accompanying drawings. However, the embodiments described herein are for illustrative purposes only and are not intended to limit the scope of the present disclosure.

Various embodiments are directed to processing-in-memory (PIM) devices which are capable of performing a deterministic arithmetic operation at a high speed.

Figure 1:
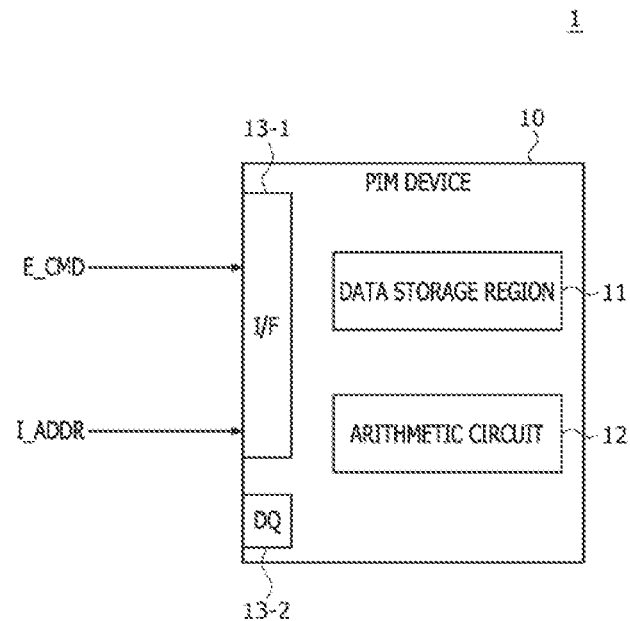
FIG. 1 is a block diagram illustrating a PIM device according to an embodiment of the present disclosure.

FIG. 1 is a block diagram illustrating a PIM device according to an embodiment of the present disclosure. As illustrated in FIG. 1, the PIM device 10 may include a data storage region 11, an arithmetic circuit 12, an interface (I/F) 13-1, and a data (DQ) input/output (I/O) pad 13-2. The data storage region 11 may include a first storage region and a second storage region. In an embodiment, the first storage region and the second storage region may be a first memory bank and a second memory bank, respectively. In another embodiment, the first data storage region and the second storage region may be a memory bank and buffer memory, respectively. The data storage region 11 may include a volatile memory element or a non-volatile memory element. For an embodiment, the data storage region 11 may include both a volatile memory element and a non-volatile memory element.

The arithmetic circuit 12 may perform an arithmetic operation on the data transferred from the data storage region 11. In an embodiment, the arithmetic circuit 12 may include a multiplying-and-accumulating (MAC) operator. The MAC operator may perform a multiplying calculation on the data transferred from the data storage region 11 and perform an accumulating calculation on a multiplication result data. After MAC operations, the MAC operator may output an MAC result data. The MAC result data may be stored in the data storage region 11 or output from the PIM device 10 through the data I/O pad 13-2. In an embodiment, the arithmetic circuit 12 may perform additional operations, for example a bias addition operation and an active function operation, for a neural network calculation, for example, an arithmetic operation in a deep learning process. In another embodiment, the PIM device 10 may include a bias addition circuit and active function circuit separated from the arithmetic circuit 12.

The interface 13-1 of the PIM device 10 may receive an external command E_CMD and an input address I_ADDR from an external device. The external device may denote a host or a PIM controller coupled to the PIM device 10. Hereinafter, it may be assumed that the external command E_CMD transmitted to the PIM device 10 is a command requesting the MAC arithmetic operation. That is, the PIM device 10 may perform a MAC arithmetic operation in response to the external command E_CMD. The data I/O pad 13-2 of the PIM device 10 may function as a data communication terminal between a device external to the PIM device 10, for example the PIM controller or a host located outside the PIM system 1. Accordingly, data that is output from the host or the PIM controller may be input into the PIM device 10 through the data I/O pad 13-2. Also, data that is output from the PIM device 10 may be input to the host or the PIM controller through the data I/O pad 13-2.

In an embodiment, the PIM device 10 may operate in a memory mode or a MAC arithmetic mode. In the event that the PIM device 10 operates in the memory mode, the PIM device 10 may perform a data that is read operation or a data write operation for the data storage region 11. In the event that the PIM device 10 operates in the MAC arithmetic mode, the arithmetic circuit 12 of the PIM device 10 may receive first data and second data from the data storage region 11 to perform the MAC arithmetic operation. In the event that PIM device 10 operates in the MAC arithmetic mode, the PIM device 10 may also perform the data write operation for the data storage region 11 to execute the MAC arithmetic operation. The MAC arithmetic operation may be a deterministic arithmetic operation that is performed during a predetermined fixed time. The word "predetermined" as used herein with respect to a parameter, such as a predetermined fixed time or time period, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

Figure 2:
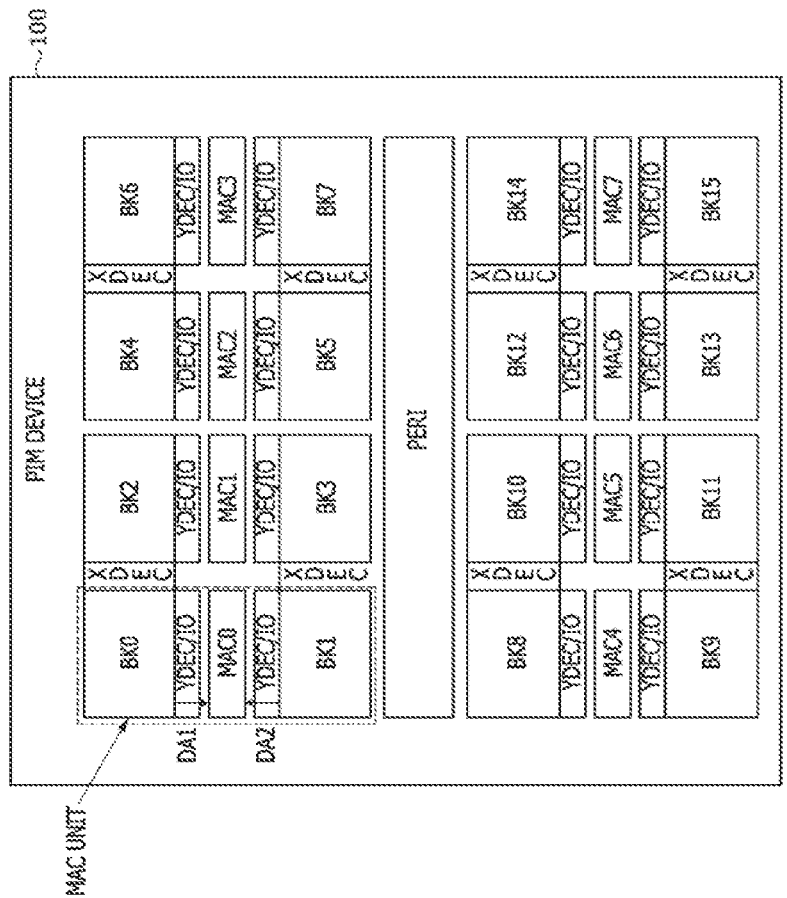
FIG. 2 is a schematic diagram illustrating an arrangement of memory banks and multiplication/accumulation (MAC) operators included in a PIM device according to a first embodiment of the present disclosure.

FIG. 2 illustrates a disposal structure indicating placement of memory banks BK0, . . . , and BK15 and MAC operators MAC0, . . . , and MAC7 included in a PIM device 100 according to an embodiment of the present disclosure. In an embodiment, the memory banks BK0, . . . , and BK15 and the MAC operators MAC0, . . . , and MAC7 may be included in the data storage region and the arithmetic circuit of the PIM device 10 of FIG. 1, respectively. Referring to FIG. 2, the PIM device 100 may include a data storage region and an arithmetic circuit. In an embodiment, the data storage region may include the memory banks BK0, . . . , and BK15. Although the present embodiment illustrates an example in which the data storage region includes the memory banks BK0, . . . , and BK15, the memory banks BK0, . . . , and BK15 are merely examples which are suitable for the data storage region. In some embodiments, the memory banks BK0, . . . , and BK15 may be a memory region corresponding to a volatile memory device, for example, a DRAM device. In an embodiment, each of the memory banks BK0, . . . , and BK15 may be a component unit which is independently activated and may be configured to have the same data bus width as data I/O lines in the PIM device 100. In an embodiment, the memory banks BK0, . . . , and BK15 may operate through interleaving such that an active operation of any one of the memory banks is performed in parallel while another memory bank is selected. Although the present embodiment illustrates an example in which the PIM device 100 includes the memory banks BK0, . . . , and BK15, the number of the memory banks is not limited to 16 and may be different in different embodiments. Each of the memory banks BK0, . . . , and BK15 may include at least one cell array which includes memory unit cells located at cross points of a plurality of rows and a plurality of columns. The memory banks BK0, . . . , and BK15 may include a first group of memory banks (e.g., odd-numbered memory banks BK0, BK2, . . . , and BK14) and a second group of memory banks (e.g., even-numbered memory banks BK1, BK3, . . . , and BK15).

A core circuit may be disposed to be adjacent to the memory banks BK0, . . . , and BK15. The core circuit may include X-decoders XDECs and Y-decoders/IO circuits YDEC/IOs. An X-decoder XDEC may also be referred to as a word line decoder or a row decoder. In an embodiment, two odd-numbered memory banks arrayed to be adjacent to each other in one row among the odd-numbered memory banks BK0, BK2, . . . , and BK14 may share one of the X-decoders XDECs with each other. For example, the first memory bank BK0 and the third memory bank BK2 adjacent to each other in a first row may share one of the X-decoders XDECs, and the fifth memory bank BK4 and the seventh memory bank BK6 adjacent to each other in the first row may also share one of the X-decoders XDECs. Similarly, two even-numbered memory banks arrayed to be adjacent to each other in one row among the even-numbered memory banks BK1, BK3, . . . , and BK15 may share one of the X-decoders XDECs with each other. For example, the second memory bank BK1 and the fourth memory bank BK3 adjacent to each other in a second row may share one of the X-decoders XDECs, and the sixth memory bank BK5 and the eighth memory bank BK7 adjacent to each other in the second row may also share one of the X-decoders XDECs. The X-decoder XDEC may receive a row address from an address latch included in a peripheral circuit PERI and may decode the row address to select and enable one of rows (i.e., word lines) coupled to the memory banks adjacent to the X-decoder XDEC.

The Y-decoders/IO circuits YDEC/IOs may be disposed to be allocated to the memory banks BK0, . . . , and BK15, respectively. For example, the first memory bank BK0 may be allocated to one of the Y-decoders/IO circuits YDEC/IOs, and the second memory bank BK1 may be allocated to another one of the Y-decoders/IO circuits YDEC/IOs. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address from an address latch included in the peripheral circuit PERI and may decode the column address to select and enable at least one of columns (i.e., bit lines) coupled to the selected memory bank. Each of the I/O circuits may include an I/O sense amplifier for sensing and amplifying a level of a read datum output from the corresponding memory bank during a read operation and a write driver for driving a write datum during a write operation for the corresponding memory bank.

In an embodiment, the arithmetic circuit may include MAC operators MAC0, . . . , and MAC7. Although the present embodiment illustrates an example in which the MAC operators MAC0, . . . , and MAC7 are employed as the arithmetic circuit, the present embodiment may be merely an example of the present disclosure. For example, in some other embodiments, processors other than the MAC operators MAC0, . . . , and MAC7 may be employed as the arithmetic circuit. The MAC operators MAC0, . . . , and MAC7 may be disposed such that one of the odd-numbered memory banks BK0, BK2, . . . , and BK14 and one of the even-numbered memory banks BK1, BK3, . . . , and BK15 share any one of the MAC operators MAC0, . . . , and MAC7 with each other. Specifically, one odd-numbered memory bank and one even-numbered memory bank arrayed in one column to be adjacent to each other may constitute a pair of memory banks sharing one of the MAC operators MAC0, . . . , and MAC7 with each other. One of the MAC operators MAC0, . . . , and MAC7 and a pair of memory banks sharing the one MAC operator with each other will be referred to as 'a MAC unit' hereinafter.

In an embodiment, the number of the MAC operators MAC0, . . . , and MAC7 may be equal to the number of the odd-numbered memory banks BK0, BK2, . . . , and BK14 or the number of the even-numbered memory banks BK1, BK3, . . . , and BK15. The first memory bank BK0, the second memory bank BK1, and the first MAC operator MAC0 between the first memory bank BK0 and the second memory bank BK1 may constitute a first MAC unit. In addition, the third memory bank BK2, the fourth memory bank BK3, and the second MAC operator MAC1 between the third memory bank BK2 and the fourth memory bank BK3 may constitute a second MAC unit. The first MAC operator MAC0 included in the first MAC unit may receive first data DA1 output from the first memory bank BK0 included in the first MAC unit and second data DA2 that are output from the second memory bank BK1 included in the first MAC unit. In addition, the first MAC operator MAC0 may perform a MAC arithmetic operation of the first data DA1 and the second data DA2. In the event that the PIM device 100 performs a neural network calculation, for example, an arithmetic operation in a deep learning process, one of the first data DA1 and the second data DA2 may be weight data and the other may be vector data. A configuration of any one of the MAC operators MAC0~MAC7 will be described in more detail hereinafter.

In the PIM device 100, the peripheral circuit PERI may be disposed in a region other than an area in which the memory banks BK0, BK1, . . . , and BK15, the MAC operators MAC0, . . . , and MAC7, and the core circuit are disposed. The peripheral circuit PERI may include a control circuit and a transmission path for a command/address signal, a control circuit and a transmission path for input/output of data, and a power supply circuit. The control circuit for the command/address signal may include a command decoder for decoding a command included in the command/address signal to generate an internal command signal, an address latch for converting an input address into a row address and a column address, a control circuit for controlling various functions of row/column operations, and a control circuit for controlling a delay locked loop (DLL) circuit. The control circuit for the input/output of data in the peripheral circuit PERI may include a control circuit for controlling a read/write operation, a read/write buffer, and an output driver. The power supply circuit in the peripheral circuit PERI may include a reference power voltage generation circuit for generating an internal reference power voltage and an internal power voltage generation circuit for generating an internal power voltage from an external power voltage.

The PIM device 100 according to the present embodiment may operate in any one mode of a memory mode and a MAC arithmetic mode. In the memory mode, the PIM device 100 may operate to perform the same operations as general memory devices. The memory mode may include a memory read operation mode and a memory write operation mode. In the memory read operation mode, the PIM device 100 may perform a read operation for reading out data from the memory banks BK0, BK1, . . . , and BK15 to output the read data, in response to an external request. In the memory write operation mode, the PIM device 100 may perform a write operation for storing data provided by an external device into the memory banks BK0, BK1, . . . , and BK15, in response to an external request.

In the MAC arithmetic mode, the PIM device 100 may perform the MAC arithmetic operation using the MAC operators MAC0, . . . , and MAC7. Specifically, the PIM device 100 may perform the read operation of the first data DA1 for each of the odd-numbered memory banks BK0, BK2, . . . , and BK14 and the read operation of the second data DA2 for each of the even-numbered memory banks BK1, BK3, . . . , and BK15, for the MAC arithmetic operation in the MAC arithmetic mode. In addition, each of the MAC operators MAC0, . . . , and MAC7 may perform the MAC arithmetic operation of the first data DA1 and the second data DA2 which are read out of the memory banks to store a result of the MAC arithmetic operation into the memory bank or to output the result of the MAC arithmetic operation. In some cases, the PIM device 100 may perform a data write operation for storing data to be used for the MAC arithmetic operation into the memory banks before the data that is read operation for the MAC arithmetic operation is performed in the MAC arithmetic mode.

The operation mode of the PIM device 100 according to the present embodiment may be determined by a command which is transmitted from a host or a controller to the PIM device 100. In an embodiment, if a first external command requesting a read operation or a write operation for the memory banks BK0, BK1, . . . , and BK15 is input to the PIM device 100, the PIM device 100 may perform the data that is read operation or the data write operation in the memory mode. Meanwhile, if a second external command requesting a MAC calculation corresponding to the MAC arithmetic operation is input to the PIM device 100, the PIM device 100 may perform the MAC arithmetic operation.

The PIM device 100 may perform a deterministic MAC arithmetic operation. The term "deterministic MAC arithmetic operation" used in the present disclosure may be defined as the MAC arithmetic operation that is performed in the PIM device 100 during a predetermined fixed time. Thus, the host or the controller may always predict a point in time (or a clock) when the MAC arithmetic operation terminates in the PIM device 100 at a point in time when an external command requesting the MAC arithmetic operation is transmitted from the host or the controller to the PIM device 100. No operation for informing the host or the controller of a status of the MAC arithmetic operation is required while the PIM device 100 performs the deterministic MAC arithmetic operation. In an embodiment, a latency during which the MAC arithmetic operation is performed in the PIM device 100 may be fixed for the deterministic MAC arithmetic operation.

Figure 3:
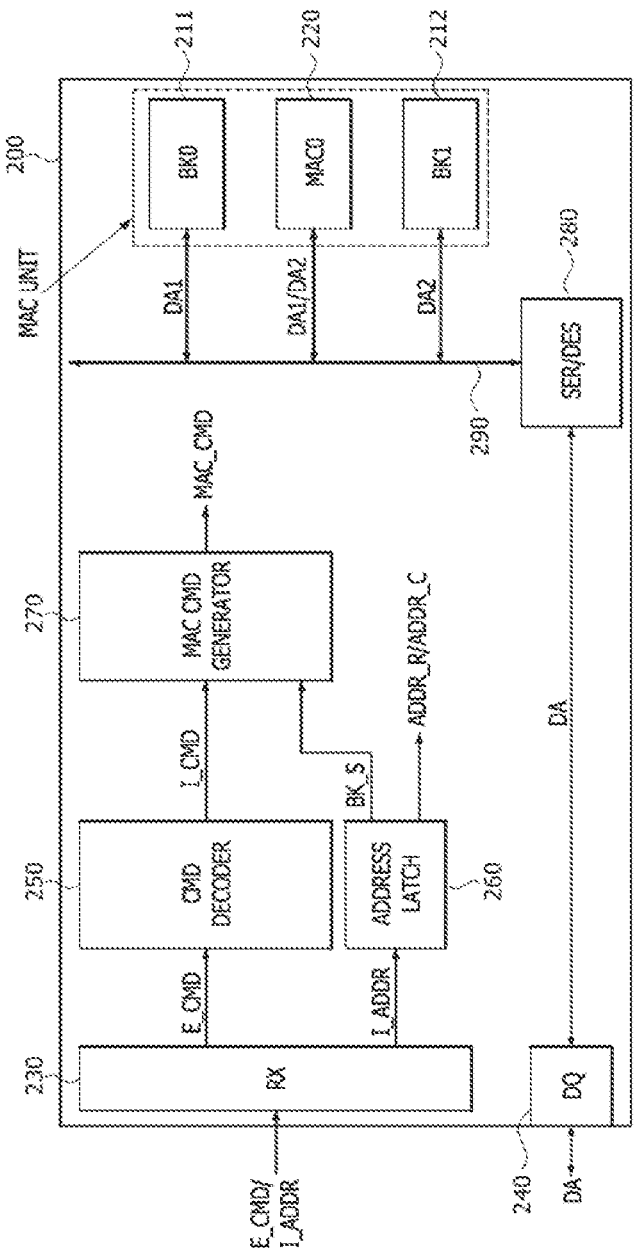
FIG. 3 is a block diagram illustrating a configuration of a PIM device according to the first embodiment of the present disclosure.
Figure 4:
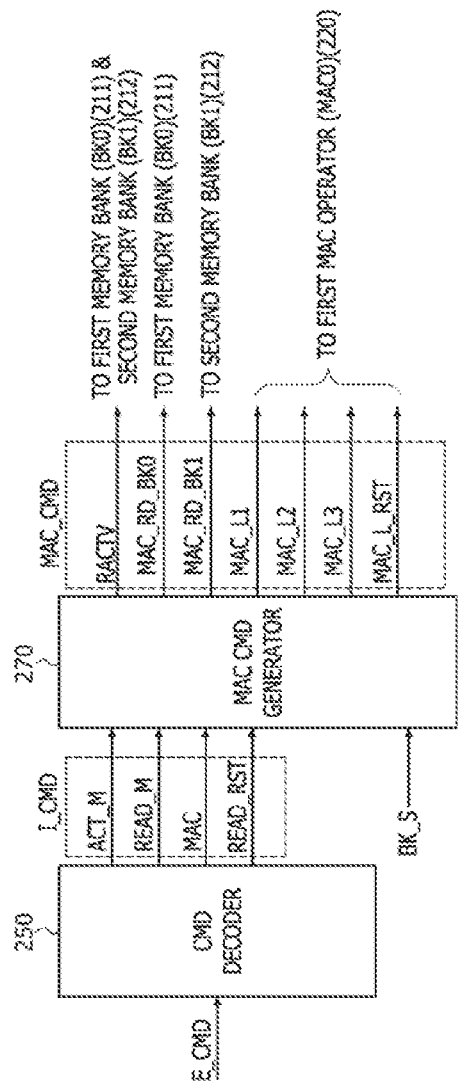
FIG. 4 illustrates internal command signals that are output from a command decoder and MAC command signals that are output from a MAC command generator in the PIM device of FIG. 3.

FIG. 3 is a block diagram illustrating a configuration of a PIM device 200 corresponding to the PIM device 100 illustrated in FIG. 3, and FIG. 4 illustrates an internal command signal I_CMD that is output from a command decoder 250 and a MAC command signal MAC_CMD that is output from a MAC command generator 270 included in the PIM device 200 of FIG. 3. FIG. 3 illustrates only the first memory bank (BK0) 211, the second memory bank (BK1) 212, and the first MAC operator (MAC0) 220 constituting the first MAC unit among the plurality of MAC units. However, FIG. 3 illustrates merely an example for simplification of the drawing. Accordingly, the following description for the first MAC unit may be equally applicable to the remaining MAC units. Referring to FIG. 3, the PIM device 200 may include a global I/O line (hereinafter, referred to as a 'GIO line') 290. The first memory bank (BK0) 211, the second memory bank (BK1) 212, and the first MAC operator (MAC0) 220 may communicate with each other through the GIO line 290. In an embodiment, the GIO line 290 may be disposed in the peripheral circuit PERI of FIG. 2.

The PIM device 200 may include a receiving driver (RX) 230, a data I/O circuit (DQ) 240, a command decoder 250, an address latch 260, a MAC command generator 270, and a serializer/deserializer (SER/DES) 280. The command decoder 250, the address latch 260, the MAC command generator 270, and the serializer/deserializer 280 may be disposed in the peripheral circuit PERI of the PIM device 100 illustrated in FIG. 2. The receiving driver 230 may receive an external command E_CMD and an input address I_ADDR from an external device. The external device may denote a host or a controller coupled to the PIM device 200. Hereinafter, it may be assumed that the external command E_CMD transmitted to the PIM device 200 is a command requesting the MAC arithmetic operation. That is, the PIM device 200 may perform the deterministic MAC arithmetic operation in response to the external command E_CMD. The data I/O circuit 240 may include an I/O pad. The data I/O circuit 240 may be coupled to data I/O line. The PIM device 200 may communicate with the external device through the data I/O circuit 240. The receiving driver 230 may separately output the external command E_CMD and the input address I_ADDR received from the external device. Data DA that is input to the PIM device 200 through the data I/O circuit 240 may be processed by the serializer/deserializer 280 and may be transmitted to the first memory bank (BK0) 211 and the second memory bank (BK1) 212 through the GIO line 290 of the PIM device 200. The data DA that is output from the first memory bank (BK0) 211, the second memory bank (BK1) 212, and the first MAC operator (MAC0) 220 through the GIO line 290 may be processed by the serializer/deserializer 280 and may be output to the external device through the data I/O circuit 240. The serializer/deserializer 280 may convert the data DA into parallel data if the data DA are serial data or may convert the data DA into serial data if the data DA are parallel data. For the data conversion, the serializer/deserializer 280 may include a serializer converting parallel data into serial data and a deserializer converting serial data into parallel data.

The command decoder 250 may decode the external command E_CMD that is output from the receiving driver 230 to generate and output the internal command signal I_CMD. As illustrated in FIG. 4, the internal command signal I_CMD that is output from the command decoder 250 may include first to fourth internal command signals. In an embodiment, the first internal command signal may be a memory active signal ACT_M, the second internal command signal may be a memory read signal READ_M, the third internal command signal may be a MAC arithmetic signal MAC, and the fourth internal command signal may be a result read signal READ_RST. The first to fourth internal command signals that are output from the command decoder 250 may be sequentially input to the MAC command generator 270.

In order to perform the deterministic MAC arithmetic operation of the PIM device 200, the memory active signal ACT_M, the memory read signal READ_M, the MAC arithmetic signal MAC, and the result read signal READ_RST that is output from the command decoder 250 may be sequentially generated at predetermined points in time (or clocks). In an embodiment, the memory active signal ACT_M, the memory read signal READ_M, the MAC arithmetic signal MAC, and the result read signal READ_RST may have predetermined latencies, respectively. For example, the memory read signal READ_M may be generated after a first latency elapses from a point in time when the memory active signal ACT_M is generated, the MAC arithmetic signal MAC may be generated after a second latency elapses from a point in time when the memory read signal READ_M is generated, and the result read signal READ_RST may be generated after a third latency elapses from a point in time when the MAC arithmetic signal MAC is generated. No signal is generated by the command decoder 250 until a fourth latency elapses from a point in time when the result read signal READ_RST is generated. The first to fourth latencies may be predetermined and fixed. Thus, the host or the controller outputting the external command E_CMD may predict the points in time when the first to fourth internal command signals constituting the internal command signal I_CMD are generated by the command decoder 250 in advance at a point in time when the external command E_CMD is output from the host or the controller.

The address latch 260 may convert the input address I_ADDR that is output from the receiving driver 230 into a bank selection signal BK_S and a row/column address ADDR_R/ADDR_C to output the bank selection signal BK_S and the row/column address ADDR_R/ADDR_C. The bank selection signal BK_S may be input to the MAC command generator 270. The row/column address ADDR_R/ADDR_C may be transmitted to the first and second memory banks 211 and 212. One of the first and second memory banks 211 and 212 may be selected by the bank selection signal BK_S. One of rows included in the selected memory bank and one of columns included in the selected memory bank may be selected by the row/column address ADDR_R/ADDR_C. In an embodiment, a point in time when the bank selection signal BK_S is input to the MAC command generator 270 may be the same moment as a point in time when the row/column address ADDR_R/ADDR_C is input to the first and second memory banks 211 and 212. In an embodiment, the point in time when the bank selection signal BK_S is input to the MAC command generator 270 and the point in time when the row/column address ADDR_R/ADDR_C is input to the first and second memory banks 211 and 212 may be a point in time when the MAC command is generated to read out data from the first and second memory banks 211 and 212 for the MAC arithmetic operation.

The MAC command generator 270 may output the MAC command signal MAC_CMD in response to the internal command signal I_CMD that is output from the command decoder 250 and the bank selection signal BK_S output from the address latch 260. As illustrated in FIG. 4, the MAC command signal MAC_CMD that is output from the MAC command generator 270 may include first to seventh MAC command signals. In an embodiment, the first MAC command signal may be a MAC active signal RACTV, the second MAC command signal may be a first MAC read signal MAC_RD_BK0, the third MAC command signal may be a second MAC read signal MAC_RD_BK1, the fourth MAC command signal may be a first MAC input latch signal MAC_L1, the fifth MAC command signal may be a second MAC input latch signal MAC_L2, the sixth MAC command signal may be a MAC output latch signal MAC_L3, and the seventh MAC command signal may be a MAC result latch signal MAC_L_RST.

The MAC active signal RACTV may be generated based on the memory active signal ACT_M that is output from the command decoder 250. The first MAC read signal MAC_RD_BK0 may be generated in response to the memory read signal READ_M output from the command decoder 250 and the bank selection signal BK_S with a first level (e.g., a logic "low" level) output from the address latch 260. The first MAC input latch signal MAC_L1 may be generated at a point in time when a certain time elapses from a point in time when the first MAC read signal MAC_RD_BK0 is generated. For various embodiments, a certain time means a fixed time duration. The second MAC read signal MAC_RD_BK1 may be generated in response to the memory read signal READ_M output from the command decoder 250 and the bank selection signal BK_S with a second level (e.g., a logic "high" level) output from the address latch 260. The second MAC input latch signal MAC_L2 may be generated at a point in time when a certain time elapses from a point in time when the second MAC read signal MAC_RD_BK1 is generated. The MAC output latch signal MAC_L3 may be generated in response to the MAC arithmetic signal MAC that is output from the command decoder 250. Finally, the MAC result latch signal MAC_L_RST may be generated in response to the result read signal READ_RST that is output from the command decoder 250.

The MAC active signal RACTV that is output from the MAC command generator 270 may control an activation operation for the first and second memory banks 211 and 212. The first MAC read signal MAC_RD_BK0 output from the MAC command generator 270 may control a data that is read operation for the first memory bank 211. The second MAC read signal MAC_RD_BK1 output from the MAC command generator 270 may control a data that is read operation for the second memory bank 212. The first MAC input latch signal MAC_L1 and the second MAC input latch signal MAC_L2 output from the MAC command generator 270 may control an input data latch operation of the first MAC operator (MAC0) 220. The MAC output latch signal MAC_L3 that is output from the MAC command generator 270 may control an output data latch operation of the first MAC operator (MAC0) 220. The MAC result latch signal MAC_L_RST that is output from the MAC command generator 270 may control a reset operation of the first MAC operator (MAC0) 220.

As described above, in order to perform the deterministic MAC arithmetic operation of the PIM device 200, the memory active signal ACT_M, the memory read signal READ_M, the MAC arithmetic signal MAC, and the result read signal READ_RST that is output from the command decoder 250 may be sequentially generated at predetermined points in time (or clocks), respectively. Thus, the MAC active signal RACTV, the first MAC read signal MAC_RD_BK0, the second MAC read signal MAC_RD_BK1, the first MAC input latch signal MAC_L1, the second MAC input latch signal MAC_L2, the MAC output latch signal MAC_L3, and the MAC result latch signal MAC_L_RST may also be generated and output from the MAC command generator 270 at predetermined points in time after the external command E_CMD is input to the PIM device 200, respectively. That is, a time period from a point in time when the first and second memory banks 211 and 212 are activated by the MAC active signal RACTV until a point in time when the first MAC operator (MAC0) 220 is reset by the MAC result latch signal MAC_L_RST may be predetermined, and thus the PIM device 200 may perform the deterministic MAC arithmetic operation.

Figure 5:
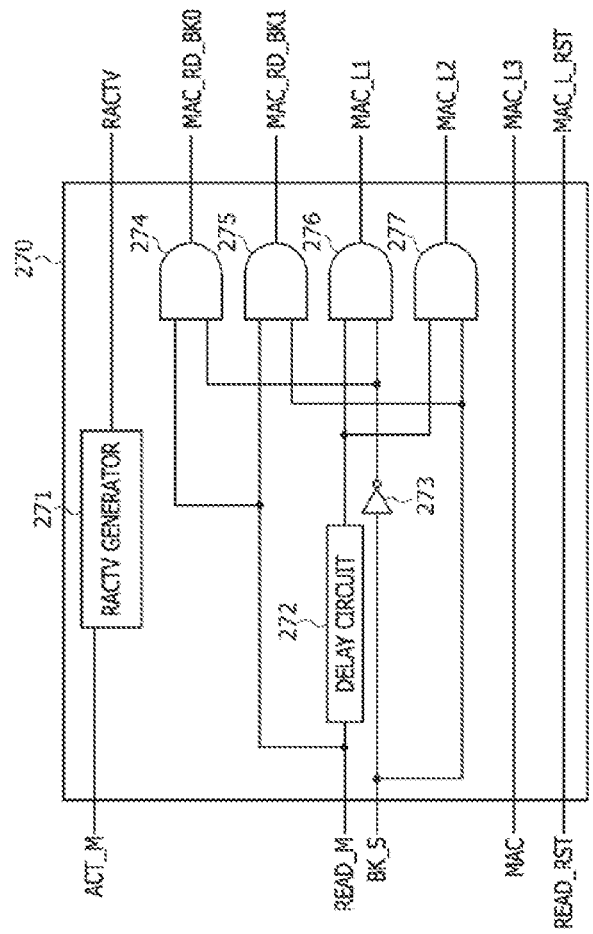
FIG. 5 illustrates an example of a configuration of a MAC command generator included in the PIM device of FIG. 3.

FIG. 5 illustrates an example of a configuration of the MAC command generator 270 included in the PIM device 200 illustrated in FIG. 3. Referring to FIG. 5, the MAC command generator 270 may sequentially receive the memory active signal ACT_M, the memory read signal READ_M, the MAC arithmetic signal MAC, and the result read signal READ_RST from the command decoder 250. In addition, the MAC command generator 270 may also receive the bank selection signal BK_S from the address latch 260. The MAC command generator 270 may output the MAC active signal RACTV, the first MAC read signal MAC_RD_BK0, the second MAC read signal MAC_RD_BK1, the first MAC input latch signal MAC_L1, the second MAC input latch signal MAC_L2, the MAC output latch signal MAC_L3, and the MAC result latch signal MAC_L_RST in series with certain time intervals. For an embodiment, a certain time interval is a time interval with a fixed duration.

In an embodiment, the MAC command generator 270 may be configured to include an active signal generator 271, a delay circuit 272, an inverter 273, and first to fourth AND gates 274, 275, 276, and 277. The active signal generator 271 may receive the memory active signal ACT_M to generate and output the MAC active signal RACTV. The MAC active signal RACTV that is output from the active signal generator 271 may be transmitted to the first and second memory banks 211 and 212 to activate the first and second memory banks 211 and 212. The delay circuit 272 may receive the memory read signal READ_M and may delay the memory read signal READ_M by a delay time DELAY_T to output the delayed signal of the memory read signal READ_M. The inverter 273 may receive the bank selection signal BK_S and may invert a logic level of the bank selection signal BK_S to output the inverted signal of the bank selection signal BK_S.

The first AND gate 274 may receive the memory read signal READ_M and an output signal of the inverter 273 and may perform a logical AND operation of the memory read signal READ_M and an output signal of the inverter 273 to generate and output the first MAC read signal MAC_RD_BK0. The second AND gate 275 may receive the memory read signal READ_M and the bank selection signal BK_S and may perform a logical AND operation of the memory read signal READ_M and the bank selection signal BK_S to generate and output the second MAC read signal MAC_RD_BK1. The third AND gate 276 may receive an output signal of the delay circuit 272 and an output signal of the inverter 273 and may perform a logical AND operation of the output signals of the delay circuit 272 and the inverter 273 to generate and output the first MAC input latch signal MAC_L1. The fourth AND gate 277 may receive an output signal of the delay circuit 272 and the bank selection signal BK_S and may perform a logical AND operation of the output signal of the delay circuit 272 and the bank selection signal BK_S to generate and output the second MAC input latch signal MAC_L2.

It may be assumed that the memory read signal READ_M that is input to the MAC command generator 270 has a logic "high" level and the bank selection signal BK_S that is input to the MAC command generator 270 has a logic "low" level. A level of the bank selection signal BK_S may change from a logic "low" level into a logic "high" level after a certain time elapses. When the memory read signal READ_M has a logic "high" level and the bank selection signal BK_S has a logic "low" level, the first AND gate 274 may output the first MAC read signal MAC_RD_BK0 with a logic "high" level and the second AND gate 275 may output the second MAC read signal MAC_RD_BK1 with a logic "low" level. The first memory bank 211 may transmit the first data DA1 to the first MAC operator 220 according to a control operation based on the first MAC read signal MAC_RD_BK0 with a logic "high" level. If a level transition of the bank selection signal BK_S occurs so that both of the memory read signal READ_M and the bank selection signal BK_S have a logic "high" level, the first AND gate 274 may output the first MAC read signal MAC_RD_BK0 with a logic "low" level and the second AND gate 275 may output the second MAC read signal MAC_RD_BK1 with a logic "high" level. The second memory bank 212 may transmit the second data DA2 to the first MAC operator 220 according to a control operation based on the second MAC read signal MAC_RD_BK1 with a logic "high" level.

Due to the delay time of the delay circuit 272, the output signals of the third and fourth AND gates 276 and 277 may be generated after the first and second MAC read signals MAC_RD_BK0 and MAC_RD_BK1 are generated. Thus, after the second MAC read signal MAC_RD_BK1 is generated, the third AND gate 276 may output the first MAC input latch signal MAC_L1 with a logic "high" level. The first MAC operator 220 may latch the first data DA1 in response to the first MAC input latch signal MAC_L1 with a logic "high" level. After a certain time elapses from a point in time when the first data DA1 are latched by the first MAC operator 220, the fourth AND gate 277 may output the second MAC input latch signal MAC_L2 with a logic "high" level. The first MAC operator 220 may latch the second data DA2 in response to the second MAC input latch signal MAC_L2 with a logic "high" level. The first MAC operator 220 may start to perform the MAC arithmetic operation after the first and second data DA1 and DA2 are latched.

The MAC command generator 270 may generate the MAC output latch signal MAC_L3 in response to the MAC arithmetic signal MAC that is output from the command decoder 250. The MAC output latch signal MAC_L3 may have the same logic level as the MAC arithmetic signal MAC. For example, if the MAC arithmetic signal MAC with a logic "high" level is input to the MAC command generator 270, the MAC command generator 270 may generate the MAC output latch signal MAC_L3 with a logic "high" level. The MAC command generator 270 may generate the MAC result latch signal MAC_L_RST in response to the result read signal READ_RST that is output from the command decoder 250. The MAC result latch signal MAC_L_RST may have the same logic level as the result read signal READ_RST. For example, if the result read signal READ_RST with a logic "high" level is input to the MAC command generator 270, the MAC command generator 270 may generate the MAC result latch signal MAC_L_RST with a logic "high" level.

Figure 6:
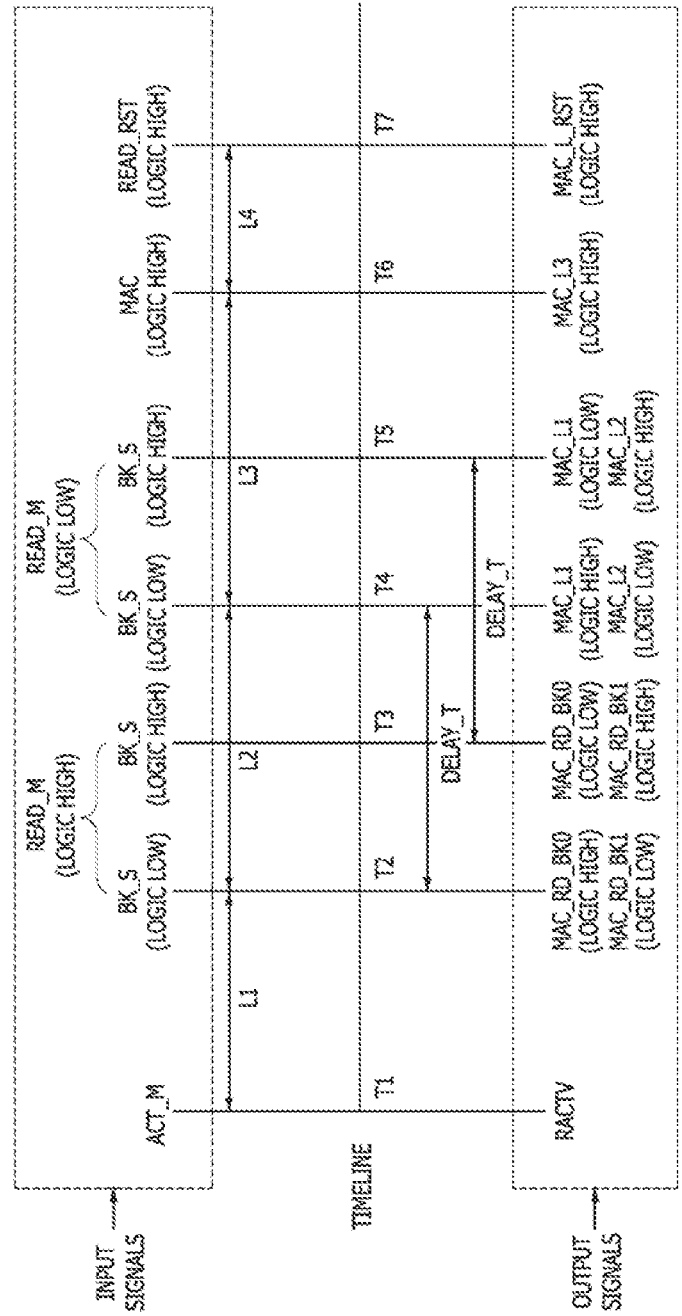
FIG. 6 illustrates input signals and output signals of the MAC command generator illustrated in FIG. 5 with a timeline.

FIG. 6 illustrates input signals and output signals of the MAC command generator 270 illustrated in FIG. 5 along a timeline. In FIG. 6, signals transmitted from the command decoder 250 to the MAC command generator 270 are illustrated in an upper dotted line box, and signals that are output from the MAC command generator 270 are illustrated in a lower dotted line box. Referring to FIGS. 5 and 6 at a first point in time "T1" of the timeline, the memory active signal ACT_M may be input to the MAC command generator 270 and the MAC command generator 270 may output the MAC active signal RACTV. At a second point in time "T2" when a certain time, for example, a first latency L1 elapses from the first point in time "T1", the memory read signal READ_M with a logic "high" level and the bank selection signal BK_S with a logic "low" level may be input to the MAC command generator 270. In response to the memory read signal READ_M with a logic "high" level and the bank selection signal BK_S with a logic "low" level, the MAC command generator 270 may output the first MAC read signal MAC_RD_BK0 with a logic "high" level and the second MAC read signal MAC_RD_BK1 with a logic "low" level in response to the memory read signal READ_M with a logic "high" level and the bank selection signal BK_S with a logic "low" level, as described with reference to FIG. 5. At a third point in time "T3" when a certain time elapses from the second point in time "T2", a logic level of the bank selection signal BK_S may change from a logic "low" level into a logic "high" level. In such a case, the MAC command generator 270 may output the first MAC read signal MAC_RD_BK0 with a logic "low" level and the second MAC read signal MAC_RD_BK1 with a logic "high" level, as described with reference to FIG. 5.

At a fourth point in time "T4" when the delay time DELAY_T elapses from the second point in time "T2", the MAC command generator 270 may output the first MAC input latch signal MAC_L1 with a logic "high" level and the second MAC input latch signal MAC_L2 with a logic "low" level. The delay time DELAY_T may be set by the delay circuit 272. The delay time DELAY_T may bet to be different according a logic design scheme of the delay circuit 272 and may be fixed once the logic design scheme of the delay circuit 272 is determined. In an embodiment, the delay time DELAY_T may be set to be equal to or greater than a second latency L2. At a fifth point in time "T5" when a certain time elapses from the fourth point in time "T4", the MAC command generator 270 may output the first MAC input latch signal MAC_L1 with a logic "low" level and the second MAC input latch signal MAC_L2 with a logic "high" level. The fifth point in time "T5" may be a moment when the delay time DELAY_T elapses from the third point in time "T3".

At a sixth point in time "T6" when a certain time, for example, a third latency L3 elapses from the fourth point in time "T4", the MAC arithmetic signal MAC with a logic "high" level may be input to the MAC command generator 270. In response to the MAC arithmetic signal MAC with a logic "high" level, the MAC command generator 270 may output the MAC output latch signal MAC_L3 with a logic "high" level, as described with reference to FIG. 5. Subsequently, at a seventh point in time "T7" when a certain time, for example, a fourth latency L4 elapses from the sixth point in time "T6", the result read signal READ_RST with a logic "high" level may be input to the MAC command generator 270. In response to the result read signal READ_RST with a logic "high" level, the MAC command generator 270 may output the MAC result latch signal MAC_L_RST with a logic "high" level, as described with reference to FIG. 5.

In order to perform the deterministic MAC arithmetic operation, moments when the internal command signals ACT_M, READ_M, MAC, and READ_RST generated by the command decoder 250 are input to the MAC command generator 270 may be fixed and moments when the MAC command signals RACTV, MAC_RD_BK0, MAC_RD_BK1, MAC_L1, MAC_L2, MAC_L3, and MAC_L_RST are output from the MAC command generator 270 in response to the internal command signals ACT_M, READ_M, MAC, and READ_RST may also be fixed. Thus, all of the first latency L1 between the first point in time "T1" and the second point in time "T2", the second latency L2 between the second point in time "T2" and the fourth point in time "T4", the third latency L3 between the fourth point in time "T4" and the sixth point in time "T6", and the fourth latency L4 between the sixth point in time "T6" and the seventh point in time "T7" may have fixed values.

In an embodiment, the first latency L1 may be defined as a time it takes to activate both of the first and second memory banks based on the MAC active signal RACTV. The second latency L2 may be defined as a time it takes to read the first and second data out of the first and second memory banks BK0 and BK1 based on the first and second MAC read signals MAC_RD_BK0 and MAC_RD_BK1 and to input the first and second data DA1 and DA2 into the first MAC operator (MAC0) 220. The third latency L3 may be defined as a time it takes to latch the first and second data DA1 and DA2 in the first MAC operator (MAC0) 220 based on the first and second MAC input latch signals MAC_L1 and MAC_L2 and it takes the first MAC operator (MAC0) 220 to perform the MAC arithmetic operation of the first and second data. The fourth latency L4 may be defined as a time it takes to latch the output data in the first MAC operator (MAC0) 220 based on the MAC output latch signal MAC_L3.

Figure 7:
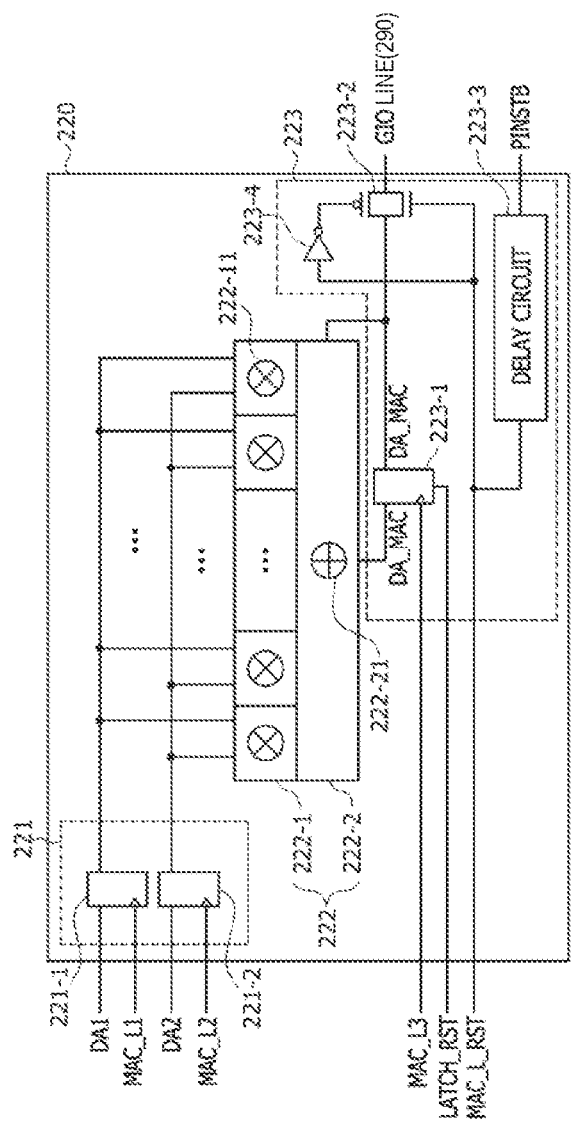
FIG. 7 illustrates an example of a configuration of a MAC operator included in the PIM device of FIG. 3.
Figure 8:
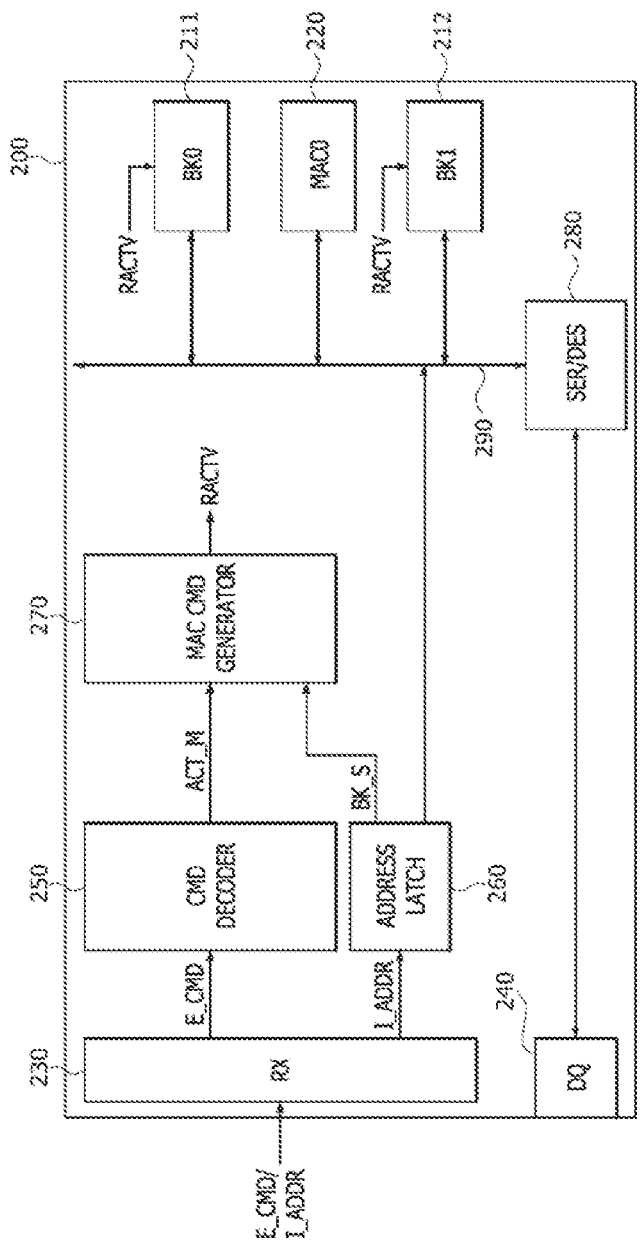
FIGS. 8 to 14 are block diagrams illustrating operations of the PIM device illustrated in FIG. 3.

FIG. 7 illustrates an example of a configuration of the first MAC operator (MAC0) 220 included in the PIM device 200 illustrated in FIG. 3. Referring to FIG. 7, the first MAC operator (MAC0) 220 may be configured to include a data input circuit 221, a MAC circuit 222, and a data output circuit 223. The data input circuit 221 may be configured to include a first input latch 221-1 and a second input latch 221-2. The MAC circuit 222 may be configured to include a multiplication logic circuit 222-1 and an addition logic circuit 222-2. The data output circuit 223 may be configured to include an output latch 223-1, a transfer gate 223-2, a delay circuit 223-3, and an inverter 223-4. In an embodiment, the first input latch 221-1, the second input latch 221-2, and the output latch 223-1 may be realized using flip-flops.

The data input circuit 221 of the first MAC operator (MAC0) 220 may be synchronized with the first and second MAC input latch signals MAC_L1 and MAC_L2 to receive and output the first and second data DA1 and DA2 that are input through the GIO line 290 to the MAC circuit 222. Specifically, the first data DA1 may be transmitted from the first memory bank BK0 (211 of FIG. 3) to the first input latch 221-1 of the data input circuit 221 through the GIO line 290, in response to the first MAC read signal MAC_RD_BK0 with a logic "high" level that is output from the MAC command generator (270 of FIG. 3). The second data DA2 may be transmitted from the second memory bank BK1 (212 of FIG. 2) to the second input latch 221-2 of the data input circuit 221 through the GIO line 290, in response to the second MAC read signal MAC_RD_BK1 with a logic "high" level that is output from the MAC command generator 270. The first input latch 221-1 may output the first data DA1 to the MAC circuit 222 in synchronization with the first MAC input latch signal MAC_L1 with a logic "high" level that is output from the MAC command generator 270 (270 of FIG. 3). The second input latch 221-2 may output the second data DA2 to the MAC circuit 222 in synchronization with the second MAC input latch signal MAC_L2 with a logic "high" level that is output from the MAC command generator (270 of FIG. 3). As described with reference to FIG. 5, the second MAC input latch signal MAC_L2 may be generated at a moment (corresponding to the fifth point in time "T5" of FIG. 6) when a certain time elapses from a moment (corresponding to the fourth point in time "T4" of FIG. 6) when the first MAC input latch signal MAC_L1 is generated. Thus, after the first data DA1 is input to the MAC circuit 222, the second data DA2 may then be input to the MAC circuit 222.

The MAC circuit 222 may perform a multiplying calculation and an accumulative adding calculation for the first and second data DA1 and DA2. The multiplication logic circuit 222-1 of the MAC circuit 222 may include a plurality of multipliers 222-11. Each of the plurality of multipliers 222-11 may perform a multiplying calculation of the first data DA1 output from the first input latch 221-1 and the second data DA2 that are output from the second input latch 221-2 and may output the result of the multiplying calculation. Bit values constituting the first data DA1 may be separately input to the multipliers 222-11. Similarly, bit values constituting the second data DA2 may also be separately input to the multipliers 222-11. For example, if each of the first and second data DA1 and DA2 is comprised of an 'N'-bit binary stream and the number of the multipliers 222-11 is 'M', the first data DA1 with 'N/M' bits and the second data DA2 with 'N/M' bits may be input to each of the multipliers 222-11. That is, each of the multipliers 222-11 may be configured to perform a multiplying calculation of first 'N/M'-bit data and second 'N/M'-bit data. The multiplication result data that is output from each of the multipliers 222-11 may have '2N/M' bits.

The addition logic circuit 222-2 of the MAC circuit 222 may include a plurality of adders 222-21. Although not shown in the drawings, the plurality of adders 222-21 may be disposed to provide a tree structure including a plurality of stages. Each of the adders 222-21 disposed at a first stage may receive two sets of the multiplication result data from two of the multipliers 222-11 included in the multiplication logic circuit 222-1 and may perform an adding calculation of the two sets of the multiplication result data to output an addition result data. Each of the adders 222-21 disposed at a second stage may receive two sets of the addition result data from two of the adders 222-21 disposed at the first stage and may perform an adding calculation of the two sets of the addition result data to output the addition result data. The adders 222-21 disposed at a last stage may receive two sets of the addition result data from two adders 222-21 disposed at the previous stage and may perform an adding calculation of the two sets of the addition result data to output the addition result data. The adders 222-21 constituting the addition logic circuit 222-2 may include an adder for performing an accumulative adding calculation of the addition result data that is output from the adder 222-21 disposed at the last stage and the previous MAC result data that is stored in the output latch 223-1 of the data output circuit 223.

The data output circuit 223 may output the MAC result data DA_MAC that is output from the MAC circuit 222 to the GIO line 290. Specifically, the output latch 223-1 of the data output circuit 223 may latch the MAC result data DA_MAC that is output from the MAC circuit 222 and may output the latched data of the MAC result data DA_MAC in synchronization with the MAC output latch signal MAC_L3 with a logic "high" level that is output from the MAC command generator (270 of FIG. 3). The MAC result data DA_MAC that is output from the output latch 223-1 may be fed back to the MAC circuit 222 for the accumulative adding calculation. In addition, the MAC result data DA_MAC may be input to the transfer gate 223-2, and the transfer gate 223-2 may output the MAC result data DA_MAC to the GIO line 290. The output latch 223-1 may be initialized if a latch reset signal LATCH_RST is input to the output latch 223-1. In such a case, all of data latched by the output latch 223-1 may be removed. In an embodiment, the latch reset signal LATCH_RST may be activated by generation of the MAC result latch signal MAC_L_RST with a logic "high" level and may be input to the output latch 223-1.

The MAC result latch signal MAC_L_RST that is output from the MAC command generator 270 may be input to the transfer gate 223-2, the delay circuit 223-3, and the inverter 223-4. The inverter 223-4 may inversely buffer the MAC result latch signal MAC_L_RST to output the inversely buffered signal of the MAC result latch signal MAC_L_RST to the transfer gate 223-2. The transfer gate 223-2 may transfer the MAC result data DA_MAC from the output latch 223-1 to the GIO line 290 in response to the MAC result latch signal MAC_L_RST with a logic "high" level. The delay circuit 223-3 may delay the MAC result latch signal MAC_L_RST by a certain time to generate and output a latch control signal PINSTB.

FIGS. 8 to 14 are block diagrams illustrating operations of the PIM device 200 illustrated in FIG. 3. In FIGS. 8 to 14, the same reference numerals or the same reference symbols as used in FIG. 3 denote the same elements. First, referring to FIG. 8, if the external command E_CMD requesting the MAC arithmetic operation and the input address I_ADDR are transmitted from an external device to the receiving driver 230, the receiving driver 230 may output the external command E_CMD and the input address I_ADDR to the command decoder 250 and the address latch 260, respectively. The command decoder 250 may decode the external command E_CMD to generate and transmit the memory active signal ACT_M to the MAC command generator 270. The address latch 260 receiving the input address I_ADDR may generate and transmit the bank selection signal BK_S to the MAC command generator 270. The MAC command generator 270 may generate and output the MAC active signal RACTV in response to the memory active signal ACT_M and the bank selection signal BK_S. The MAC active signal RACTV may be transmitted to the first memory bank (BK0) 211 and the second memory bank (BK1) 212. The first memory bank (BK0) 211 and the second memory bank (BK1) 212 may be activated by the MAC active signal RACTV.

Figure 9:
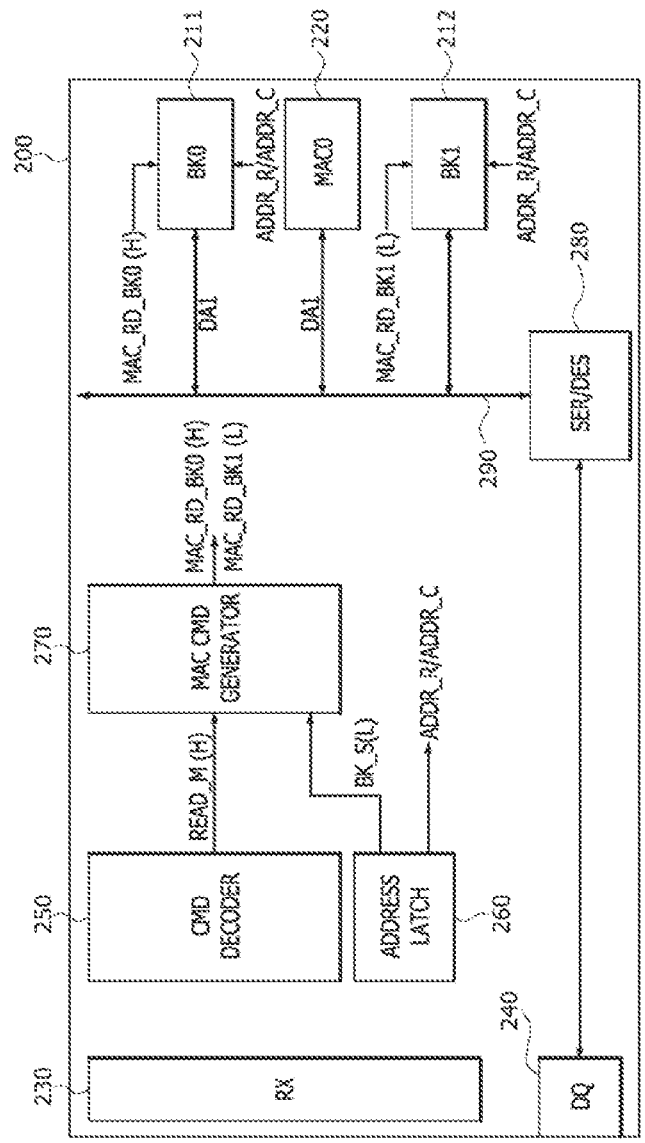

Next, referring to FIG. 9, the command decoder 250 may generate and output the memory read signal READ_M with a logic "high(H)" level to the MAC command generator 270. In addition, the address latch 260 may generate and output the bank selection signal BK_S with a logic "low(L)" level to the MAC command generator 270. In response to the memory read signal READ_M with a logic "high(H)" level and the bank selection signal BK_S with a logic "low(L)" level, the MAC command generator 270 may generate and output the first MAC read signal MAC_RD_BK0 with a logic "high(H)" level and the second MAC read signal MAC_RD_BK1 with a logic "low(L)" level, as described with reference to FIG. 4. The first MAC read signal MAC_RD_BK0 with a logic "high(H)" level, together with the row/column address ADDR_R/ADDR_C, may be transmitted to the first memory bank (BK0) 211. The second MAC read signal MAC_RD_BK1 with a logic "low(L)" level, together with the row/column address ADDR_R/ADDR_C, may be transmitted to the second memory bank (BK1) 212. The first data DA1 may be read out of the first memory bank (BK0) 211 by the first MAC read signal MAC_RD_BK0 with a logic "high(H)" level and may be transmitted to the first MAC operator (MAC0) 220 through the GIO line 290.

Figure 10:
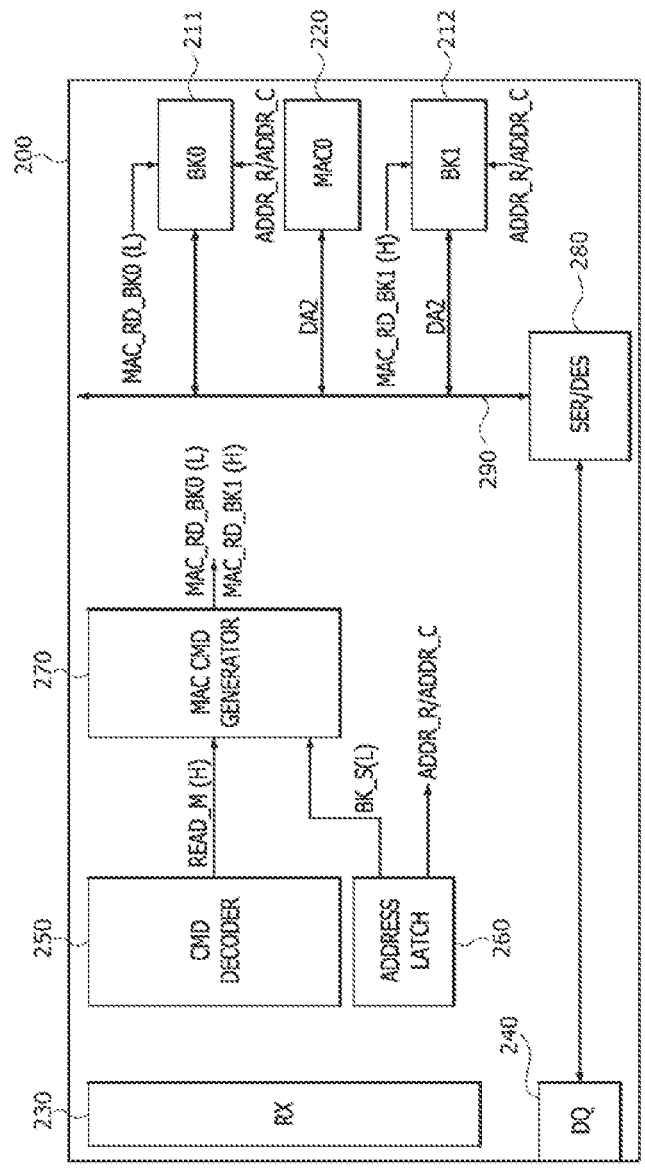

Next, referring to FIG. 10, a logic level of the bank selection signal BK_S may change from a logic "low(L)" level into a logic "high(H)" level while the memory read signal READ_M maintains a logic "high(H)" level. In such a case, as described with reference to FIG. 5, the MAC command generator 270 may generate and output the first MAC read signal MAC_RD_BK0 with a logic "low(L)" level and the second MAC read signal MAC_RD_BK1 with a logic "high(H)" level. The first MAC read signal MAC_RD_BK0 with a logic "low(L)" level, together with the row/column address ADDR_R/ADDR_C, may be transmitted to the first memory bank (BK0) 211. The second MAC read signal MAC_RD_BK1 with a logic "high(H)" level, together with the row/column address ADDR_R/ADDR_C, may be transmitted to the second memory bank (BK1) 212. The second data DA2 may be read out of the second memory bank (BK1) 212 by the second MAC read signal MAC_RD_BK1 with a logic "high(H)" level and may be transmitted to the first MAC operator (MAC0) 220 through the GIO line 290.

Figure 11:
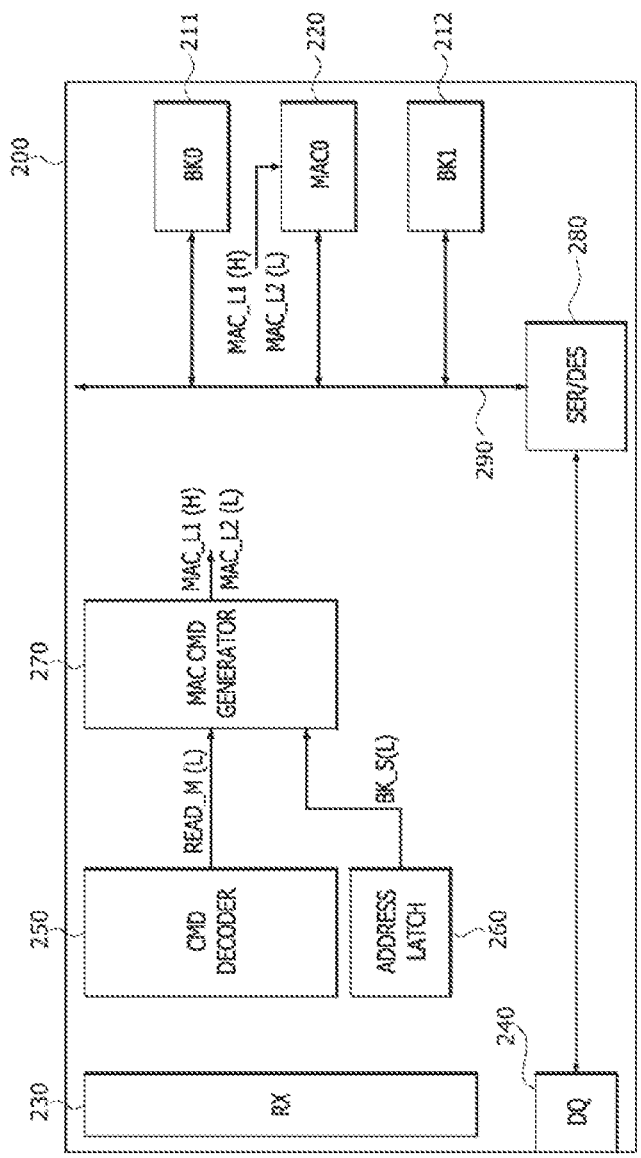

Next, referring to FIG. 11, a logic level of the memory read signal READ_M transmitted from the command decoder 250 to the MAC command generator 270 may change from a logic "high(H)" level into a logic "low(L)" level. In addition, a logic level of the bank selection signal BK_S transmitted from the address latch 260 to the MAC command generator 270 may change from a logic "high(H)" level into a logic "low(L)" level. In such a case, the MAC command generator 270 may generate and output the first MAC input latch signal MAC_L1 with a logic "high(H)" level and the second MAC input latch signal MAC_L2 with a logic "low(L)" level. A point in time when the first MAC input latch signal MAC_L1 with a logic "high(H)" level and the second MAC input latch signal MAC_L2 with a logic "low(L)" level are output from the MAC command generator 270 may be determined by a delay time of the delay circuit (271 of FIG. 4), as described with reference to FIG. 5. The first MAC input latch signal MAC_L1 with a logic "high(H)" level and the second MAC input latch signal MAC_L2 with a logic "low(L)" level that is output from the MAC command generator 270 may be transmitted to the first MAC operator (MAC0) 220. As described with reference to FIG. 7, the first MAC operator (MAC0) 220 may perform a latch operation of the first data DA1.

Figure 12:
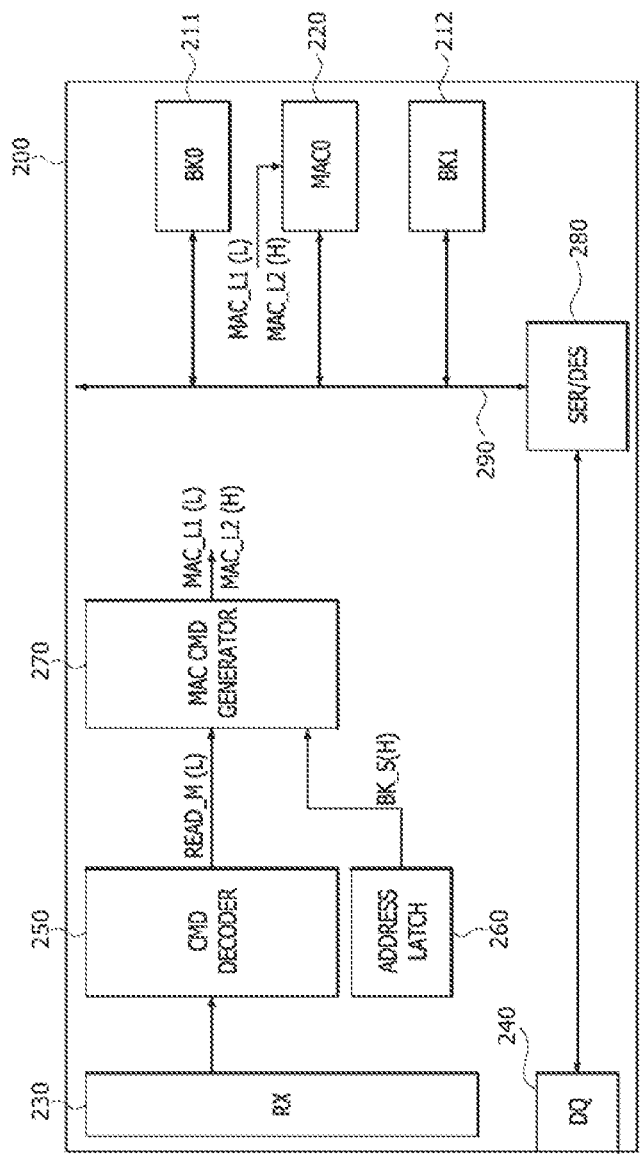

Next, referring to FIG. 12, a logic level of the bank selection signal BK_S transmitted from the address latch 260 to the MAC command generator 270 may change from a logic "low(L)" level into a logic "high(H)" level while the memory read signal READ_M maintains a logic "low(L)" level. In such a case, the MAC command generator 270 may generate and output the first MAC input latch signal MAC_L1 with a logic "low(L)" level and the second MAC input latch signal MAC_L2 with a logic "high(H)" level. A point in time when the first MAC input latch signal MAC_L1 with a logic "low(L)" level and the second MAC input latch signal MAC_L2 with a logic "high(H)" level are output from the MAC command generator 270 may be determined by a delay time of the delay circuit (271 of FIG. 5), as described with reference to FIG. 5. The first MAC input latch signal MAC_L1 with a logic "low(L)" level and the second MAC input latch signal MAC_L2 with a logic "high(H)" level that is output from the MAC command generator 270 may be transmitted to the first MAC operator (MAC0) 220. As described with reference to FIG. 7, the first MAC operator (MAC0) 220 may perform a latch operation of the second data DA2. After the latch operations of the first and second data DA1 and DA2 terminate, the first MAC operator (MAC0) 220 may perform the MAC arithmetic operation and may generate the MAC result data DA_MAC. The MAC result data DA_MAC generated by the first MAC operator (MAC0) 220 may be input to the output latch 223-1 included in the first MAC operator (MAC0) 220.

Figure 13:
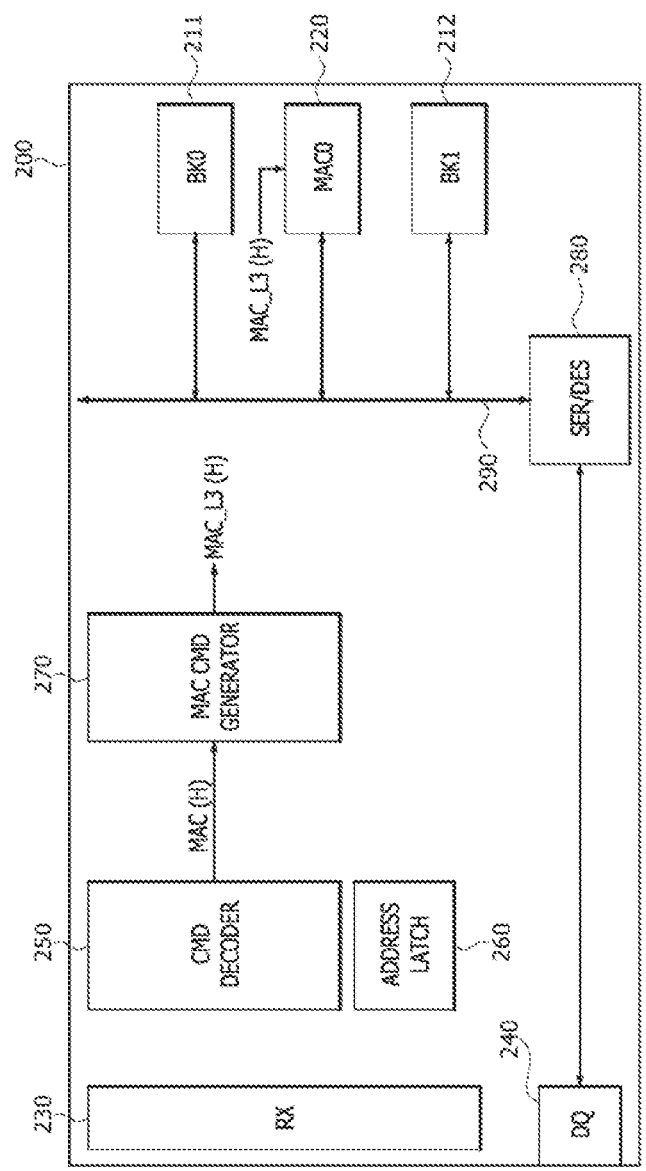

Next, referring to FIG. 13, the command decoder 250 may output and transmit the MAC arithmetic signal MAC with a logic "high(H)" level to the MAC command generator 270. The MAC command generator 270 may generate and output the MAC output latch signal MAC_L3 with a logic "high" level in response to the MAC arithmetic signal MAC with a logic "high(H)" level. The MAC output latch signal MAC_L3 with a logic "high" level may be transmitted to the first MAC operator (MAC0) 220. As described with reference to FIG. 7, the output latch (223-1 of FIG. 7) of the first MAC operator (MAC0) 220 may be synchronized with the MAC output latch signal MAC_L3 with a logic "high" level to transfer the MAC result data DA_MAC that is output from the MAC circuit 222 of the first MAC operator (MAC0) 220 to the transfer gate (233-2 of FIG. 7) of the first MAC operator (MAC0) 220. The MAC result data DA_MAC that is output from the output latch (223-1 of FIG. 7) may be fed back to the addition logic circuit (222-2 of FIG. 7) for the accumulative adding calculation.

Figure 14:
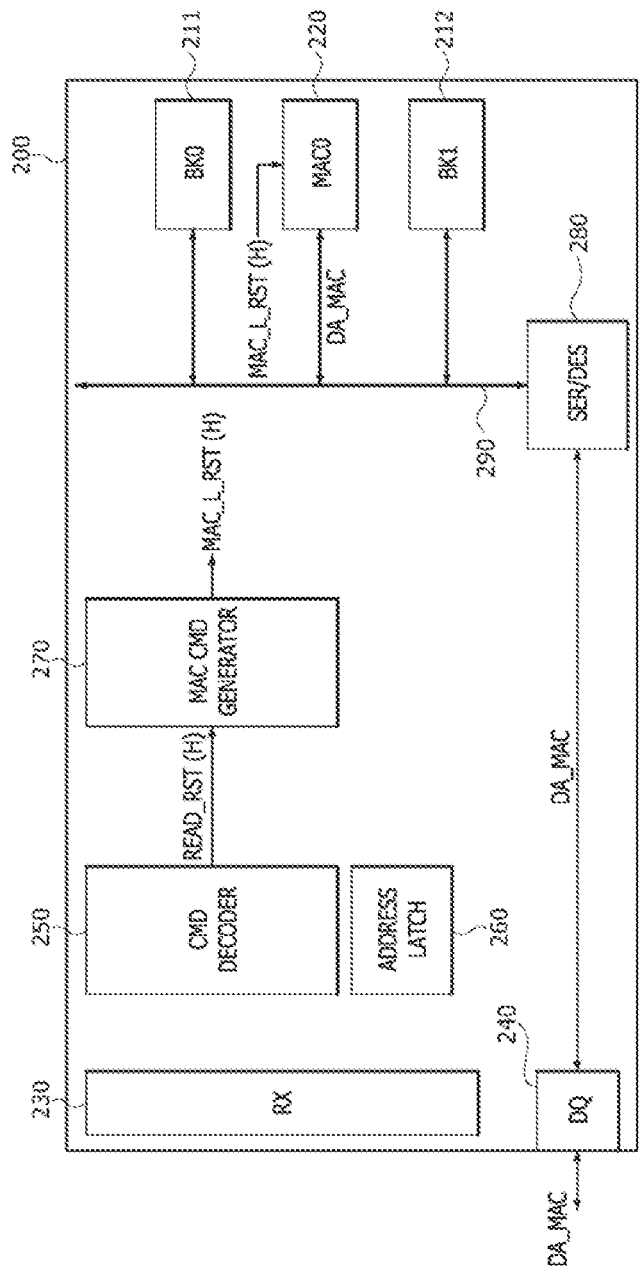

Next, referring to FIG. 14, the command decoder 250 may output and transmit the result read signal READ_RST with a logic "high(H)" level to the MAC command generator 270. The MAC command generator 270 may generate and output the MAC result latch signal MAC_L_RST with a logic "high" level in response to the result read signal READ_RST with a logic "high(H)" level. The MAC result latch signal MAC_L_RST with a logic "high" level may be transmitted to the first MAC operator (MAC0) 220. As described with reference to FIG. 7, the first MAC operator (MAC0) 220 may output the MAC result data DA_MAC to the GIO line 290 in response to the MAC result latch signal MAC_L_RST with a logic "high" level and may also reset the output latch (223-1 of FIG. 6) included in the first MAC operator (MAC0) 220 in response to the MAC result latch signal MAC_L_RST with a logic "high" level. The MAC result data DA_MAC transmitted to the GIO line 290 may be output to an external device through the serializer/deserializer 280 and the data I/O circuit 240.

Figure 15:
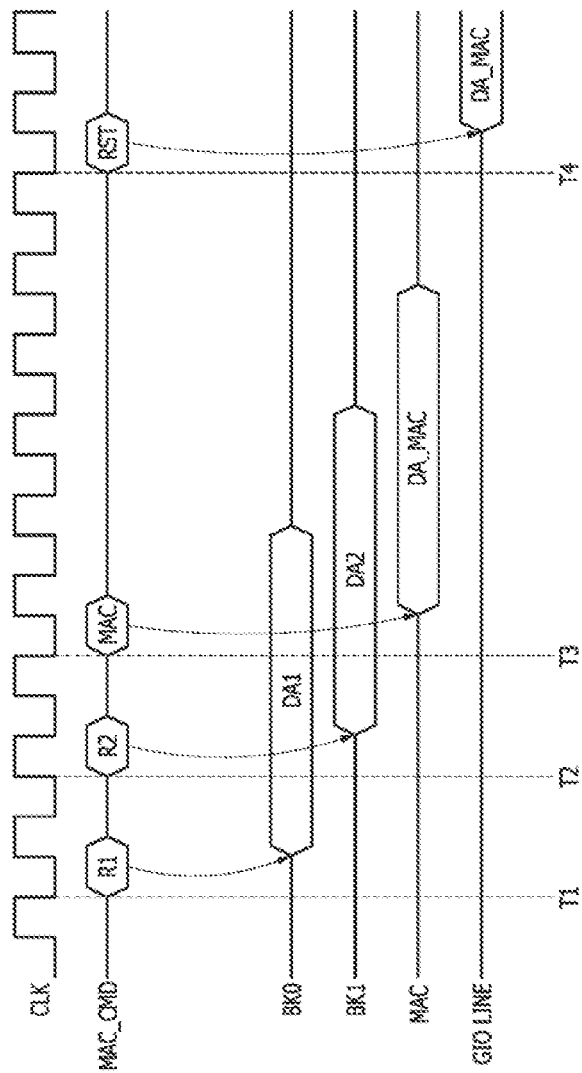
FIG. 15 is a timing diagram illustrating an operation of the PIM device illustrated in FIG. 3.

FIG. 15 is a timing diagram illustrating an operation of the PIM device 200 illustrate in FIG. 3. Referring to FIG. 15, at a first point in time "T1", the MAC command generator 270 may be synchronized with a falling edge of a clock signal CLK to generate and output the first MAC read signal MAC_RD_BK0 (R1) with a logic "high(H)" level. The first memory bank (BK0) 211 may be selected by the first MAC read signal MAC_RD_BK0 (R1) with a logic "high(H)" level so that the first data DA1 are read out of the first memory bank (BK0) 211. At a second point in time "T2", the MAC command generator 270 may be synchronized with a falling edge of the clock signal CLK to generate and output the second MAC read signal MAC_RD_BK1 (R2) with a logic "high(H)" level. The second memory bank (BK1) 212 may be selected by the second MAC read signal MAC_RD_BK1 (R2) with a logic "high(H)" level so that the second data DA2 are read out of the second memory bank (BK1) 212. At a third point in time "T3", the MAC command generator 270 may be synchronized with a falling edge of the clock signal CLK to generate and output the MAC arithmetic signal MAC with a logic "high(H)" level. The first MAC operator (MAC0) 220 may perform the multiplying calculations and the adding calculations of the first and second data DA1 and DA2 to generate the MAC result data DA_MAC, in response to the MAC arithmetic signal MAC with a logic "high(H)" level. At a fourth point in time "T4", the MAC command generator 270 may be synchronized with a falling edge of the clock signal CLK to generate and output the MAC result latch signal MAC_L_RST (RST) with a logic "high" level. The MAC result data DA_MAC generated by the first MAC operator (MAC0) 220 may be transmitted to the GIO line 290 by the MAC result latch signal MAC_L_RST (RST) with a logic "high" level.

Figure 16:
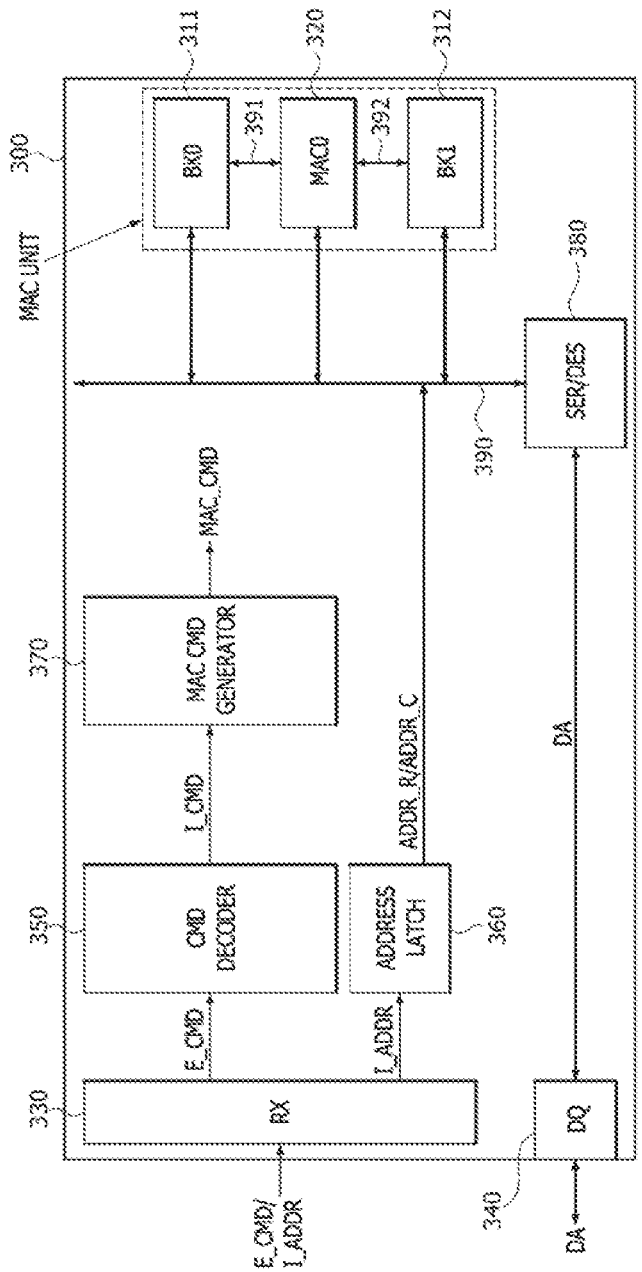
FIG. 16 is a block diagram illustrating another configuration of a PIM device according to the first embodiment of the present disclosure.
Figure 17:
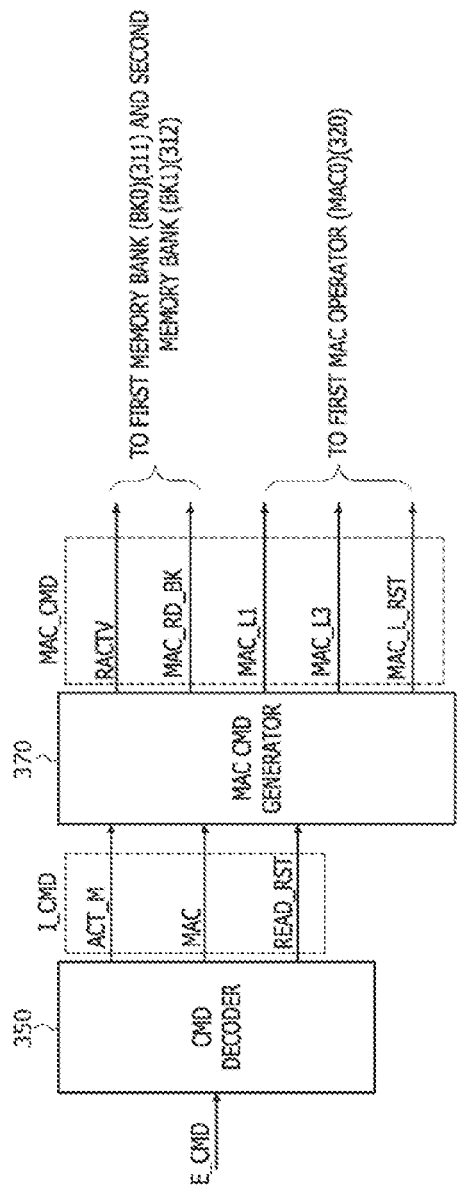
FIG. 17 illustrates internal command signals that are output from a command decoder and MAC command signals that are output from a MAC command generator in the PIM device of FIG. 16.

FIG. 16 is a block diagram illustrating another configuration of a PIM device 300 according to an embodiment of the present disclosure, and FIG. 17 illustrates an internal command signal I_CMD that is output from a command decoder 350 of the PIM device 300 and a MAC command signal MAC_CMD that is output from a MAC command generator 370 of the PIM device 300. FIG. 16 illustrates only a first memory bank (BK0) 311, a second memory bank (BK1) 312, and a first MAC operator (MAC0) 320 constituting a first MAC unit among the plurality of MAC units. However, FIG. 16 illustrates merely an example for simplification of the drawing. Accordingly, the following description for the first MAC unit may be equally applicable to the remaining MAC units.

Referring to FIG. 16, the PIM device 300 may be configured to include the first memory bank (BK0) 311, the second memory bank (BK1) 312, and the first MAC operator (MAC0) 320. The PIM device 300 according to the present embodiment may include a GIO line 390, a first bank input/output (BIO) line 391, and a second BIO line 392 acting as data transmission lines. Data communication of the first memory bank (BK0) 311, the second memory bank (BK1) 312, and the first MAC operator (MAC0) 320 may be achieved through the GIO line 390. Only the data transmission between the first memory bank (BK0) 311 and the first MAC operator (MAC0) 320 may be achieved through the first BIO line 391, and only the data transmission between the second memory bank (BK1) 312 and the first MAC operator (MAC0) 320 may be achieved through the second BIO line 392. Thus, the first MAC operator (MAC0) 320 may directly receive first data and second data from the first and second memory banks (BK0 and BK1) 311 and 312 through the first BIO line 391 and the second BIO line 392 without using the GIO line 390.

The PIM device 300 may further include a receiving driver (RX) 330, a data I/O circuit (DQ) 340, the command decoder 350, an address latch 360, the MAC command generator 370, and a serializer/deserializer (SER/DES) 380. The command decoder 350, the address latch 360, the MAC command generator 370, and the serializer/deserializer 380 may be disposed in the peripheral circuit PERI of the PIM device 100 illustrated in FIG. 2. The receiving driver 330 may receive an external command E_CMD and an input address I_ADDR from an external device. The external device may denote a host or a controller coupled to the PIM device 300. Hereinafter, it may be assumed that the external command E_CMD transmitted to the PIM device 300 is a command requesting the MAC arithmetic operation. That is, the PIM device 300 may perform the deterministic MAC arithmetic operation in response to the external command E_CMD. The data I/O circuit 340 may include a data I/O pad. The data I/O pad may be coupled with an data I/O line. The PIM device 300 communicates with the external device through the data I/O circuit 340.

The receiving driver 330 may separately output the external command E_CMD and the input address I_ADDR received from the external device. Data DA that is input to the PIM device 300 through the data I/O circuit 340 may be processed by the serializer/deserializer 380 and may be transmitted to the first memory bank (BK0) 311 and the second memory bank (BK1) 312 through the GIO line 390 of the PIM device 300. The data DA that is output from the first memory bank (BK0) 311, the second memory bank (BK1) 312, and the first MAC operator (MAC0) 320 through the GIO line 390 may be processed by the serializer/deserializer 380 and may be output to the external device through the data I/O circuit 340. The serializer/deserializer 380 may convert the data DA into parallel data if the data DA are serial data or may convert the data DA into serial data if the data DA are parallel data. For the data conversion, the serializer/deserializer 380 may include a serializer for converting parallel data into serial data and a deserializer for converting serial data into parallel data.

The command decoder 350 may decode the external command E_CMD that is output from the receiving driver 330 to generate and output the internal command signal I_CMD. As illustrated in FIG. 17, the internal command signal I_CMD that is output from the command decoder 350 may include first to third internal command signals. In an embodiment, the first internal command signal may be a memory active signal ACT_M, the second internal command signal may be a MAC arithmetic signal MAC, and the third internal command signal may be a result read signal READ_RST. The first to third internal command signals that are output from the command decoder 350 may be sequentially input to the MAC command generator 370.

In order to perform the deterministic MAC arithmetic operation of the PIM device 300, the memory active signal ACT_M, the MAC arithmetic signal MAC, and the result read signal READ_RST that is output from the command decoder 350 may be sequentially generated at predetermined points in time (or clocks). In an embodiment, the memory active signal ACT_M, the MAC arithmetic signal MAC, and the result read signal READ_RST may have predetermined latencies, respectively. For example, the MAC arithmetic signal MAC may be generated after a first latency elapses from a point in time when the memory active signal ACT_M is generated, and the result read signal READ_RST may be generated after a third latency elapses from a point in time when the MAC arithmetic signal MAC is generated. No signal is generated by the command decoder 350 until a fourth latency elapses from a point in time when the result read signal READ_RST is generated. The first to fourth latencies may be predetermined and fixed. Thus, the host or the controller outputting the external command E_CMD may predict the points in time when the first to third internal command signals constituting the internal command signal I_CMD are generated by the command decoder 350 in advance at a point in time when the external command E_CMD is output from the host or the controller. That is, the host or the controller may predict a point in time (or a clock) when the MAC arithmetic operation terminates in the PIM device 300 after the external command E_CMD requesting the MAC arithmetic operation is transmitted from the host or the controller to the PIM device 300, even without receiving any signals from the PIM device 300.

The address latch 360 may convert the input address I_ADDR that is output from the receiving driver 330 into a row/column address ADDR_R/ADDR_C to output the row/column address ADDR_R/ADDR_C. The row/column address ADDR_R/ADDR_C that is output from the address latch 360 may be transmitted to the first and second memory banks 311 and 312. According to the present embodiment, the first data and the second data to be used for the MAC arithmetic operation may be simultaneously read out of the first and second memory banks (BK0 and BK1) 311 and 312, respectively. Thus, it may be unnecessary to generate a bank selection signal for selecting any one of the first and second memory banks 311 and 312. In an embodiment, a point in time when the row/column address ADDR_R/ADDR_C is input to the first and second memory banks 311 and 312 may be a point in time when a MAC command (i.e., the MAC arithmetic signal MAC) requesting a data that is read operation for the first and second memory banks 311 and 312 for the MAC arithmetic operation is generated.

The MAC command generator 370 may output the MAC command signal MAC_CMD in response to the internal command signal I_CMD that is output from the command decoder 350. As illustrated in FIG. 16, the MAC command signal MAC_CMD that is output from the MAC command generator 370 may include first to fifth MAC command signals. In an embodiment, the first MAC command signal may be a MAC active signal RACTV, the second MAC command signal may be a MAC read signal MAC_RD_BK, the third MAC command signal may be a MAC input latch signal MAC_L1, the fourth MAC command signal may be a MAC output latch signal MAC_L3, and the fifth MAC command signal may be a MAC result latch signal MAC_L_RST.

The MAC active signal RACTV may be generated based on the memory active signal ACT_M that is output from the command decoder 350. The MAC read signal MAC_RD_BK, the MAC input latch signal MAC_L1, the MAC output latch signal MAC_L3, and the MAC result latch signal MAC_L_RST may be sequentially generated based on the MAC arithmetic signal MAC that is output from the command decoder 350. That is, the MAC input latch signal MAC_L1 may be generated at a point in time when a certain time elapses from a point in time when the MAC read signal MAC_RD_BK is generated. The MAC output latch signal MAC_L3 may be generated at a point in time when a certain time elapses from a point in time when the MAC input latch signal MAC_L1 is generated. Finally, the MAC result latch signal MAC_L_RST may be generated based on the result read signal READ_RST that is output from the command decoder 350.

The MAC active signal RACTV that is output from the MAC command generator 370 may control an activation operation for the first and second memory banks 311 and 312. The MAC read signal MAC_RD_BK that is output from the MAC command generator 370 may control a data that is read operation for the first and second memory banks 311 and 312. The MAC input latch signal MAC_L1 that is output from the MAC command generator 370 may control an input data latch operation of the first MAC operator (MAC0) 320. The MAC output latch signal MAC_L3 that is output from the MAC command generator 370 may control an output data latch operation of the first MAC operator (MAC0) 320. The MAC result latch signal MAC_L_RST that is output from the MAC command generator 370 may control an output operation of MAC result data of the first MAC operator (MAC0) 320 and a reset operation of the first MAC operator (MAC0) 320.

As described above, in order to perform the deterministic MAC arithmetic operation of the PIM device 300, the memory active signal ACT_M, the MAC arithmetic signal MAC, and the result read signal READ_RST that is output from the command decoder 350 may be sequentially generated at predetermined points in time (or clocks), respectively. Thus, the MAC active signal RACTV, the MAC read signal MAC_RD_BK, the MAC input latch signal MAC_L1, the MAC output latch signal MAC_L3, and the MAC result latch signal MAC_L_RST may also be generated and output from the MAC command generator 370 at predetermined points in time after the external command E_CMD is input to the PIM device 300, respectively. That is, a time period from a point in time when the first and second memory banks 311 and 312 are activated by the MAC active signal RACTV until a point in time when the first MAC operator (MAC0) 320 is reset by the MAC result latch signal MAC_L_RST may be predetermined.

Figure 18:
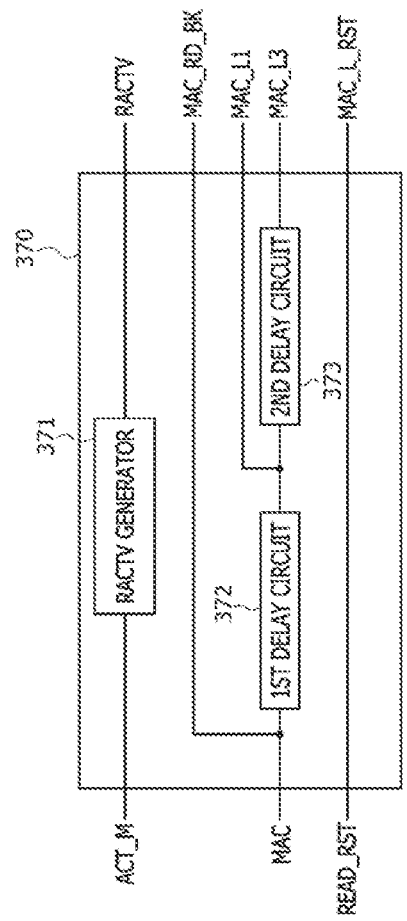
FIG. 18 illustrates an example of a configuration of a MAC command generator included in the PIM device of FIG. 16.

FIG. 18 illustrates an example of a configuration of the MAC command generator 370 included in the PIM device 300 illustrated in FIG. 16. Referring to FIG. 18, the MAC command generator 370 may sequentially receive the memory active signal ACT_M, the MAC arithmetic signal MAC, and the result read signal READ_RST from the command decoder 350. In addition, the MAC command generator 370 may sequentially generate and output the MAC active signal RACTV, the MAC read signal MAC_RD_BK, the MAC input latch signal MAC_L1, the MAC output latch signal MAC_L3, and the MAC result latch signal MAC_L_RST. The MAC active signal RACTV, the MAC read signal MAC_RD_BK, the MAC input latch signal MAC_L1, the MAC output latch signal MAC_L3, and the MAC result latch signal MAC_L_RST may be output in series with certain time intervals.

In an embodiment, the MAC command generator 370 may be configured to include an active signal generator 371, a first delay circuit 372, and a second delay circuit 373. The active signal generator 371 may receive the memory active signal ACT_M to generate and output the MAC active signal RACTV. The MAC active signal RACTV that is output from the active signal generator 371 may be transmitted to the first and second memory banks 311 and 312 to activate the first and second memory banks 311 and 312. The MAC command generator 370 may receive the MAC arithmetic signal MAC that is output from the command decoder 350 to output the MAC arithmetic signal MAC as the MAC read signal MAC_RD_BK. The first delay circuit 372 may receive the MAC arithmetic signal MAC and may delay the MAC arithmetic signal MAC by a first delay time DELAY_T1 to generate and output the MAC input latch signal MAC_L1. The second delay circuit 373 may receive an output signal of the first delay circuit 372 and may delay the output signal of the first delay circuit 372 by a second delay time DELAY_T2 to generate and output the MAC output latch signal MAC_L3. The MAC command generator 370 may generate the MAC result latch signal MAC_L_RST in response to the result read signal READ_RST that is output from the command decoder 350.

The MAC command generator 370 may generate and output the MAC active signal RACTV in response to the memory active signal ACT_M that is output from the command decoder 350. Subsequently, the MAC command generator 370 may generate and output the MAC read signal MAC_RD_BK in response to the MAC arithmetic signal MAC that is output from the command decoder 350. The MAC arithmetic signal MAC may be input to the first delay circuit 372. The MAC command generator 370 may delay the MAC arithmetic signal MAC by a certain time determined by the first delay circuit 372 to generate and output an output signal of the first delay circuit 372 as the MAC input latch signal MAC_L1. The output signal of the first delay circuit 372 may be input to the second delay circuit 373. The MAC command generator 370 may delay the MAC input latch signal MAC_L1 by a certain time determined by the second delay circuit 373 to generate and output an output signal of the second delay circuit 373 as the MAC output latch signal MAC_L3. Subsequently, the MAC command generator 370 may generate and output the MAC result latch signal MAC_L_RST in response to the result read signal READ_RST that is output from the command decoder 350.

Figure 19:
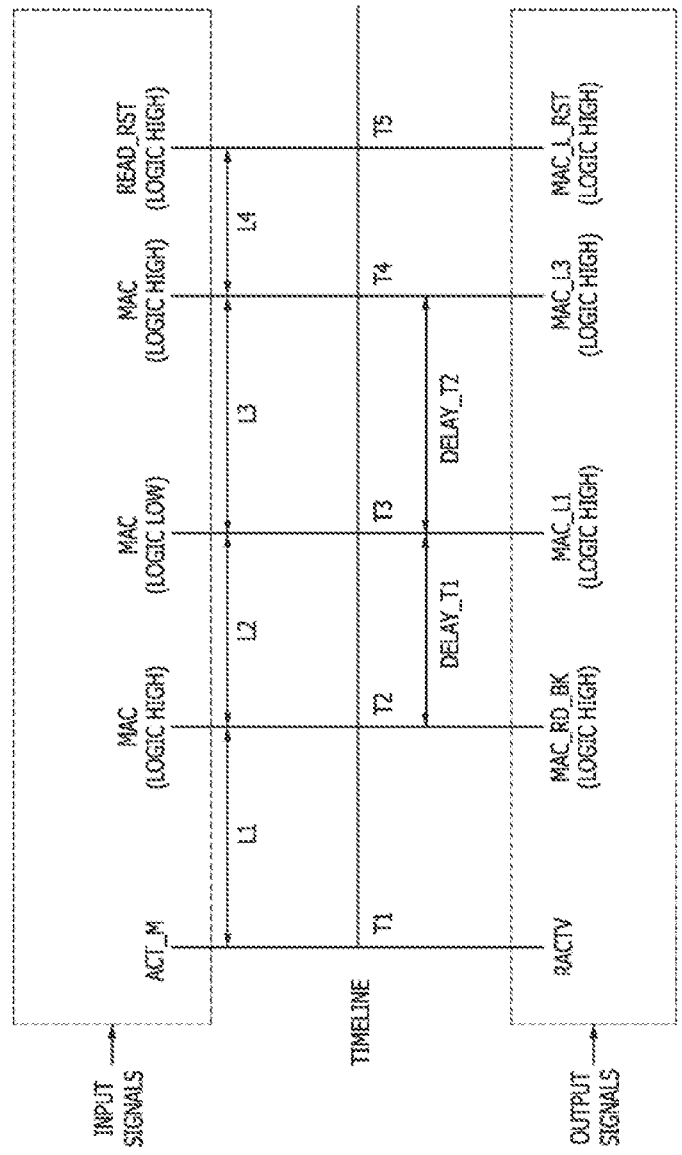
FIG. 19 illustrates input signals and output signals of the MAC command generator illustrated in FIG. 18 with a timeline.

FIG. 19 illustrates input signals and output signals of the MAC command generator 370 illustrated in FIG. 18 with a timeline. In FIG. 19, signals transmitted from the command decoder 350 to the MAC command generator 370 are illustrated in an upper dotted line box, and signals that are output from the MAC command generator 370 are illustrated in a lower dotted line box. Referring to FIGS. 18 and 19, at a first point in time "T1" of the timeline, the memory active signal ACT_M may be input to the MAC command generator 370 and the MAC command generator 370 may output the MAC active signal RACTV. At a second point in time "T2" when a certain time, for example, a first latency L1 elapses from the first point in time "T1", the MAC arithmetic signal MAC with a logic "high" level may be input to the MAC command generator 370. In response to the MAC arithmetic signal MAC with a logic "high" level, the MAC command generator 370 may output the MAC read signal MAC_RD_BK with a logic "high" level. At a third point in time "T3" when a certain time elapses from the second point in time "T2", a logic level of the MAC arithmetic signal MAC may change from a logic "high" level into a logic "low" level.

At the third point in time "T3" when the first delay time DELAY_T1 elapses from the second point in time "T2", the MAC command generator 370 may output the MAC input latch signal MAC_L1 with a logic "high" level. The first delay time DELAY_T1 may correspond to a delay time determined by the first delay circuit 372 illustrated in FIG. 18. The first delay time DELAY_T1 may be set to be different according to a logic design scheme of the first delay circuit 372. In an embodiment, the first delay time DELAY_T1 may be set to be equal to or greater than a second latency L2. At a fourth point in time "T4" when a certain time elapses from the third point in time "T3", the MAC command generator 370 may output the MAC output latch signal MAC_L3 with a logic "high" level. The fourth point in time "T4" may be a moment when the second delay time DELAY_T2 elapses from the third point in time "T3". The second delay time DELAY_T2 may correspond to a delay time determined by the second delay circuit 373 illustrated in FIG. 18. The second delay time DELAY_T2 may be set to be different according to a logic design scheme of the second delay circuit 373. In an embodiment, the second delay time DELAY_T2 may be set to be equal to or greater than a third latency L3. At a fifth point in time "T5" when a certain time, for example, a fourth L4 elapses from the fourth point in time "T4", the result read signal READ_RST with a logic "high" level may be input to the MAC command generator 370. In response to the result read signal READ_RST with a logic "high" level, the MAC command generator 370 may output the MAC result latch signal MAC_L_RST with a logic "high" level, as described with reference to FIG. 18.

In order to perform the deterministic MAC arithmetic operation, moments when the internal command signals ACT_M, MAC, and READ_RST generated by the command decoder 350 are input to the MAC command generator 370 may be fixed and moments when the MAC command signals RACTV, MAC_RD_BK, MAC_L1, MAC_L3, and MAC_L_RST are output from the MAC command generator 370 in response to the internal command signals ACT_M, MAC, and READ_RST may also be fixed. Thus, all of the first latency L1 between the first point in time "T1" and the second point in time "T2", the second latency L2 between the second point in time "T2" and the third point in time "T3", the third latency L3 between the third point in time "T3" and the fourth point in time "T4", and the fourth latency L4 between the fourth point in time "T4" and the fifth point in time "T5" may have fixed values.

In an embodiment, the first latency L1 may be defined as a time it takes to activate both of the first and second memory banks based on the MAC active signal RACTV. The second latency L2 may be defined as a time it takes to read the first and second data out of the first and second memory banks (BK0 and BK1) 311 and 312 based on the MAC read signals MAC_RD_BK and to input the first and second data DA1 and DA2 into the first MAC operator (MAC0) 320. The third latency L3 may be defined as a time it takes to latch the first and second data DA1 and DA2 in the first MAC operator (MAC0) 320 based on the MAC input latch signals MAC_L1 and it takes the first MAC operator (MAC0) 320 to perform the MAC arithmetic operation of the first and second data. The fourth latency L4 may be defined as a time it takes to latch the output data in the first MAC operator (MAC0) 320 based on the MAC output latch signal MAC_L3.

Figure 20:
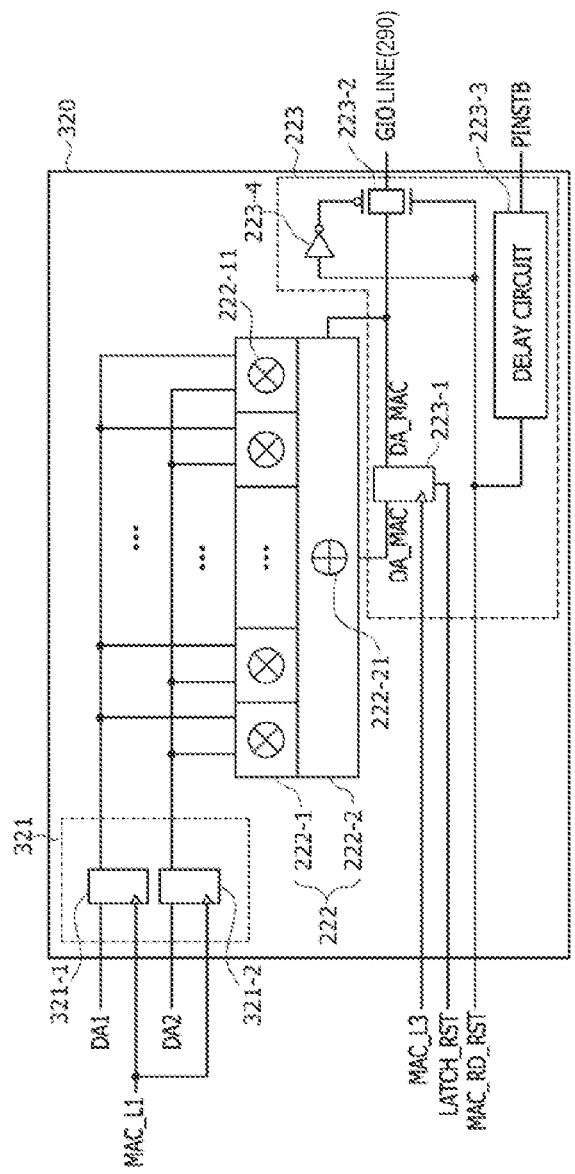
FIG. 20 illustrates an example of a configuration of a MAC operator included in the PIM device of FIG. 16.
Figure 21:
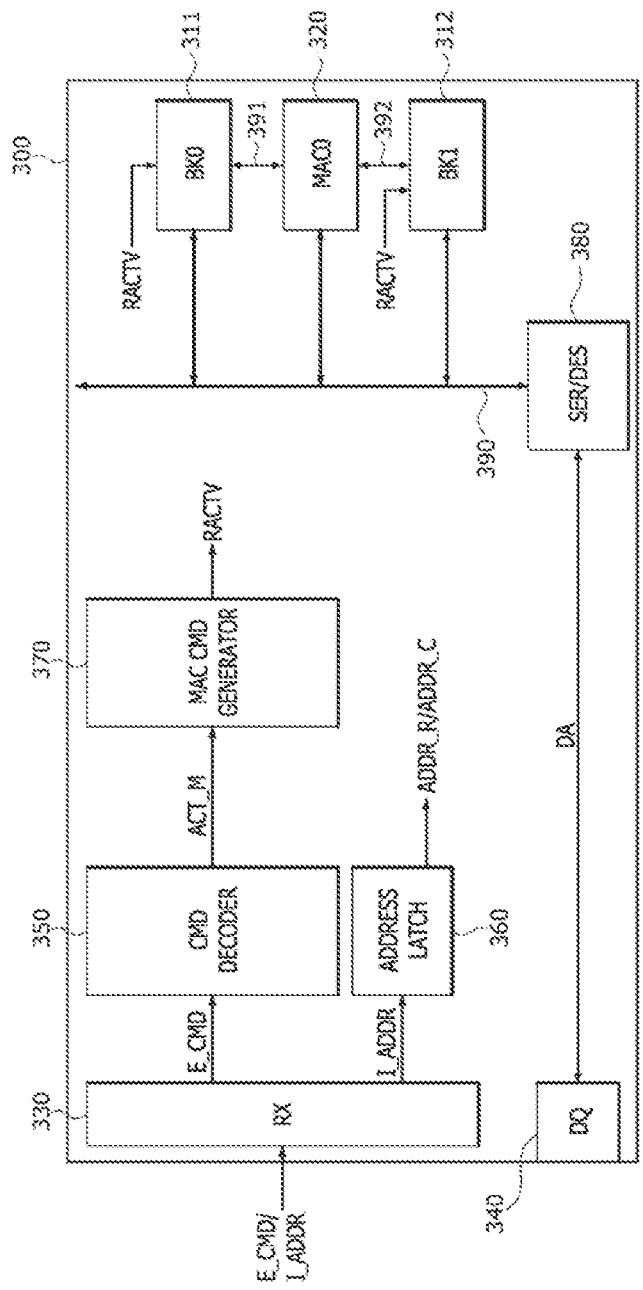
FIGS. 21 to 25 are block diagrams illustrating operations of the PIM device illustrated in FIG. 16.

FIG. 20 illustrates an example of a configuration of the first MAC operator (MAC0) 320 included in the PIM device 300 of FIG. 16. The first MAC operator (MAC0) 320 included in the PIM device 300 may have the same configuration as the first MAC operator (MAC0) 220 described with reference to FIG. 7 except for a signal applied to clock terminals of first and second input latches 321-1 and 321-2 constituting a data input circuit 321. Thus, in FIG. 20, the same reference numerals or the same reference symbols as used in FIG. 7 denote the same elements, and descriptions of the same elements as set forth with reference to FIG. 7 will be omitted hereinafter.

Describing in detail the differences between the first MAC operator (MAC0) 220 and the first MAC operator (MAC0) 320, in case of the first MAC operator (MAC0) 220 illustrated in FIG. 7, the first input latch (221-1 of FIG. 7) and the second input latch (221-2 of FIG. 7) of the data input circuit (221 of FIG. 7) may be synchronized with the first and second MAC input latch signals MAC_L1 and MAC_L2, respectively, sequentially generated with a certain time interval to output the first data DA1 and the second data DA2. In contrast, in case of the first MAC operator (MAC0) 320, the MAC input latch signal MAC_L1 may be input to both of the clock terminals of the first and second input latches 321-1 and 321-2 constituting a data input circuit 321. Thus, both of the first and second input latches 321-1 and 321-2 may be synchronized with the MAC input latch signal MAC_L1 to output the first data DA1 and the second data DA2, respectively. Accordingly, the first MAC operator (MAC0) 320 may transmit the first and second data DA1 and DA2 to the MAC circuit 222 in parallel without any time interval between the first and second data DA1 and DA2. As a result, the MAC arithmetic operation of the MAC circuit 222 may be quickly performed without any delay of data input time.

FIGS. 21 to 25 are block diagrams illustrating operations of the PIM device 300 illustrated in FIG. 16. In FIGS. 21 to 25, the same reference numerals or the same reference symbols as used in FIG. 16 denote the same elements. First, referring to FIG. 21, if the external command E_CMD requesting the MAC arithmetic operation and the input address I_ADDR are transmitted from an external device to the receiving driver 330, the receiving driver 330 may output the external command E_CMD and the input address I_ADDR to the command decoder 350 and the address latch 360, respectively. The command decoder 350 may decode the external command E_CMD to generate and transmit the memory active signal ACT_M to the MAC command generator 370. The MAC command generator 370 may generate and output the MAC active signal RACTV in response to the memory active signal ACT_M. The MAC active signal RACTV may be transmitted to the first memory bank (BK0) 311 and the second memory bank (BK1) 312. Both of the first memory bank (BK0) 311 and the second memory bank (BK1) 312 may be activated by the MAC active signal RACTV.

Figure 22:
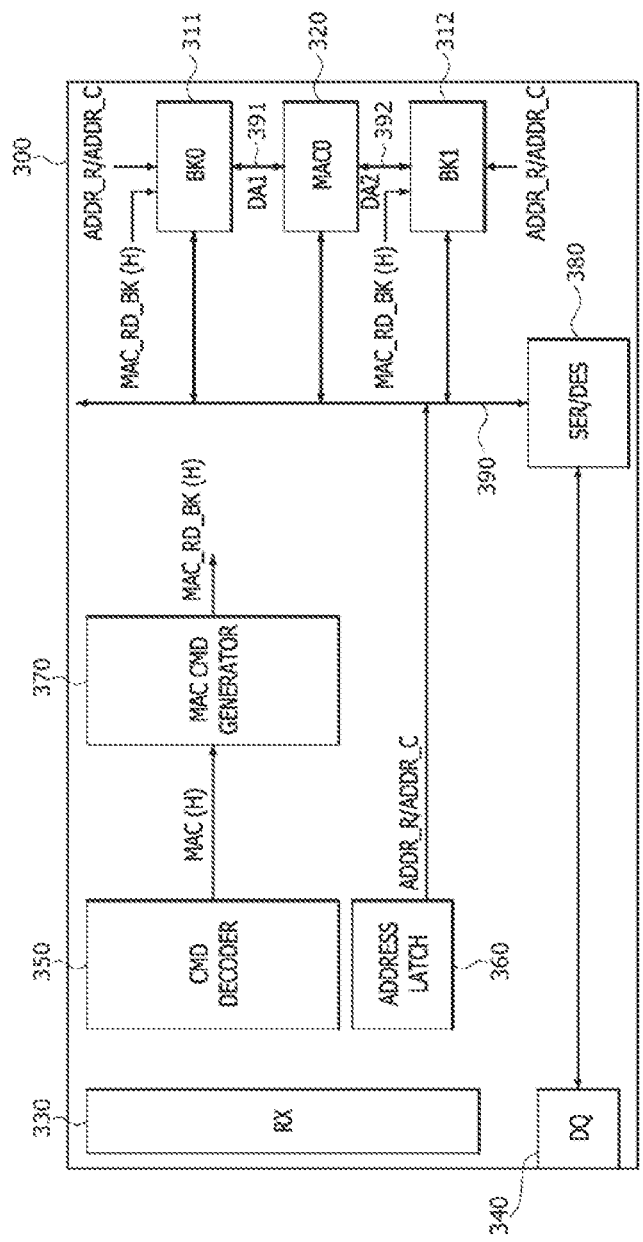

Next, referring to FIG. 22, the command decoder 350 may generate and output the MAC arithmetic signal MAC with a logic "high(H)" level to the MAC command generator 370.

In response to the MAC arithmetic signal MAC with a logic "high(H)" level, the MAC command generator 370 may generate and output the MAC read signal MAC_RD_BK with a logic "high(H)" level. The MAC read signal MAC_RD_BK with a logic "high(H)" level, together with the row/column address ADDR_R/ADDR_C, may be transmitted to the first memory bank (BK0) 311 and the second memory bank (BK1) 312. The first data DA1 may be read out of the first memory bank (BK0) 311 by the MAC read signal MAC_RD_BK with a logic "high(H)" level and may be transmitted to the first MAC operator (MAC0) 320 through the first BIO line 391. In addition, the second data DA2 may be read out of the second memory bank (BK1) 312 by the MAC read signal MAC_RD_BK with a logic "high (H)" level and may be transmitted to the first MAC operator (MAC0) 320 through the second BIO line 392.

Figure 23:
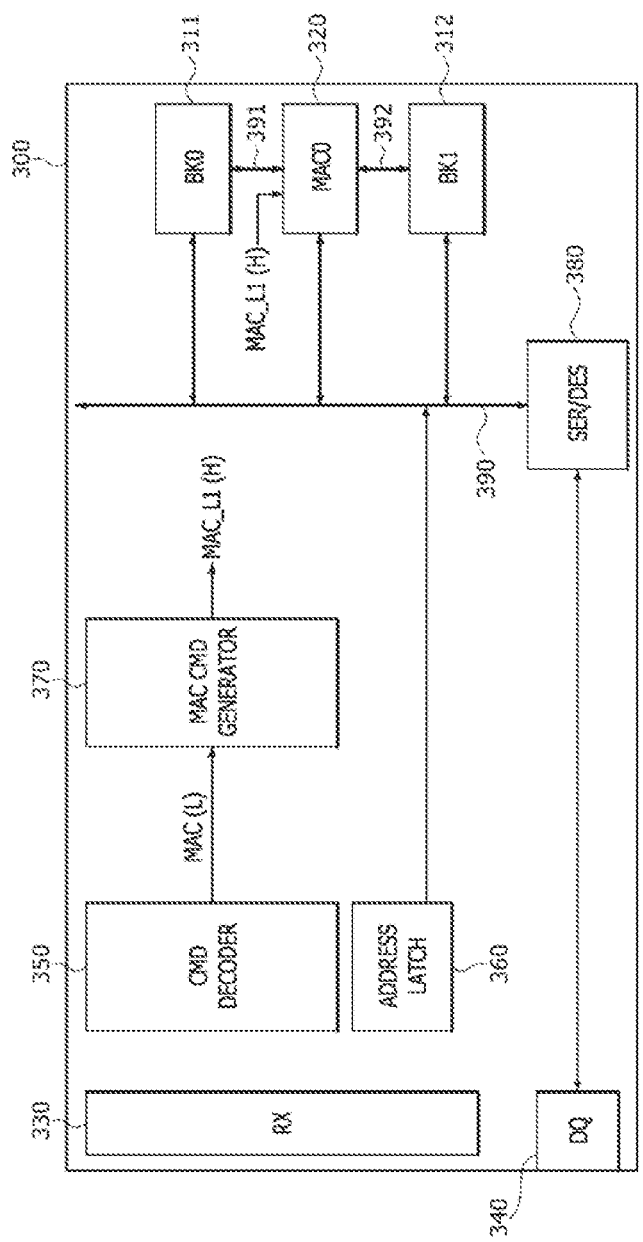

Next, referring to FIG. 23, a logic level of the MAC arithmetic signal MAC that is output from the command decoder 350 may change from a logic "high(H)" level into a logic "low(L)" level at a point in time when the first delay time DELAY_T1 determined by the first delay circuit (372 of FIG. 18) elapses from a point in time when the MAC read signal MAC_RD_BK is output from the MAC command generator 370. The MAC command generator 370 may generate and output the MAC input latch signal MAC_L1 with a logic "high(H)" level in response to the MAC arithmetic signal MAC with a logic "low(L)" level. The MAC input latch signal MAC_L1 with a logic "high(H)" level may be transmitted to the first MAC operator (MAC0) 320. The first MAC operator (MAC0) 320 may be synchronized with the MAC input latch signal MAC_L1 with a logic "high(H)" level to perform a latch operation of the first and second data DA1 and DA2 that are output from the first and second memory banks (BK0 and BK1) 311 and 312. If the latch operation of the first and second data DA1 and DA2 terminates, the first MAC operator (MAC0) 320 may perform the MAC arithmetic operation and may generate the MAC result data DA_MAC. The MAC result data DA_MAC generated by the first MAC operator (MAC0) 320 may be input to the output latch (223-1 of FIG. 20) included in the first MAC operator (MAC0) 320.

Figure 24:
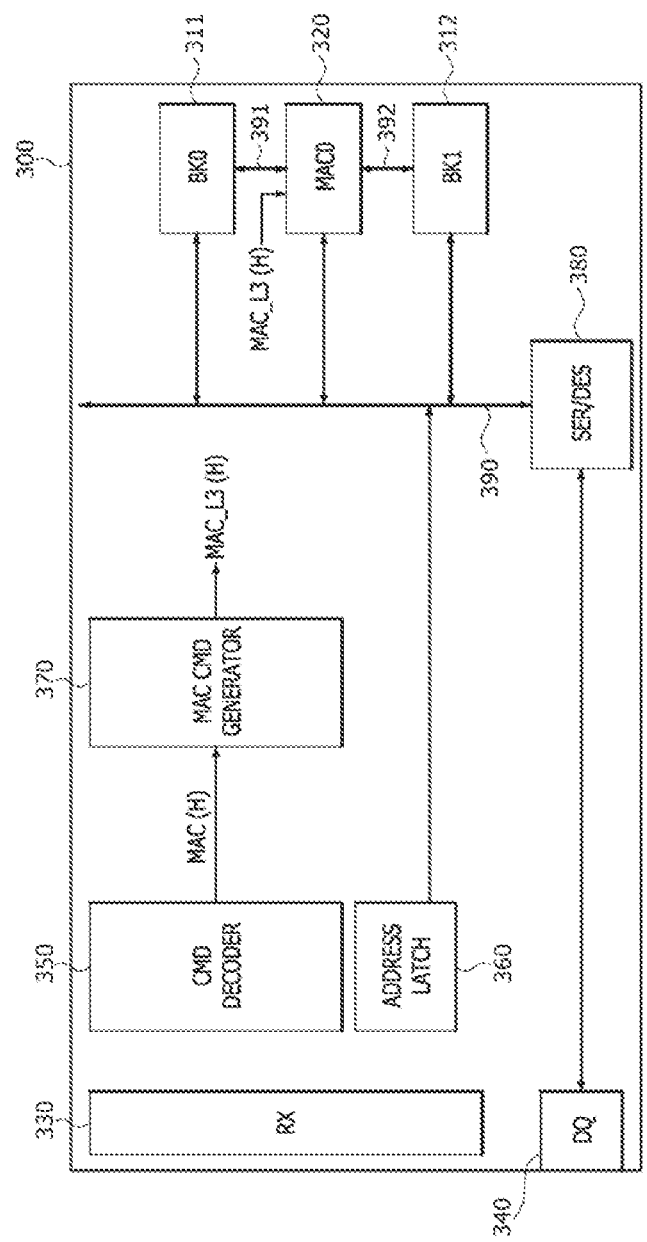

Next, referring to FIG. 24, a logic level of the MAC arithmetic signal MAC that is output from the command decoder 350 may change from a logic "low(L)" level into a logic "high(H)" level at a point in time when the second delay time DELAY_T2 determined by the second delay circuit (373 of FIG. 18) elapses from a point in time when the MAC input latch signal MAC_L1 with a logic "high(H)" level is output from the MAC command generator 370. The MAC command generator 370 may generate and output the MAC output latch signal MAC_L3 with a logic "high(H)" level in response to the MAC arithmetic signal MAC with a logic "high(H)" level. The MAC output latch signal MAC_L3 with a logic "high(H)" level may be transmitted to the first MAC operator (MAC0) 320. The output latch (223-1 of FIG. 20) included in the first MAC operator (MAC0) 320 may be synchronized with the MAC output latch signal MAC_L3 with a logic "high(H)" level to transfer the MAC result data DA_MAC generated by the MAC circuit (222 of FIG. 20) to the transfer gate (223-2 of FIG. 20) included in the first MAC operator (MAC0) 320. The MAC result data DA_MAC that is output from the output latch (223-1 of FIG. 20) may be fed back to the addition logic circuit (222-2 of FIG. 20) for the accumulative adding calculation executed by the MAC circuit (222 of FIG. 20).

Figure 25:
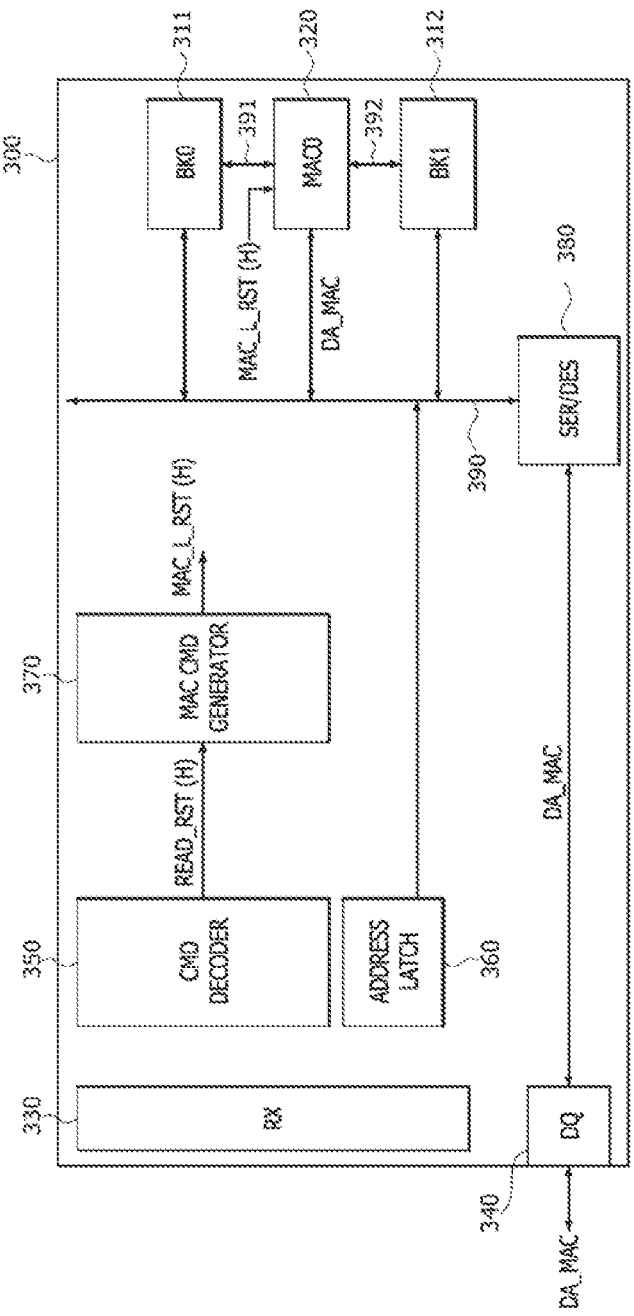

Next, referring to FIG. 25, the command decoder 350 may output and transmit the result read signal READ_RST with a logic "high(H)" level to the MAC command generator 370. The MAC command generator 370 may generate and output the MAC result latch signal MAC_L_RST with a logic "high" level in response to the result read signal READ_RST with a logic "high(H)" level. The MAC result latch signal MAC_L_RST with a logic "high" level may be transmitted to the first MAC operator (MAC0) 320. As described with reference to FIG. 20, the first MAC operator (MAC0) 320 may output the MAC result data DA_MAC to the GIO line 390 in response to the MAC result latch signal MAC_L_RST with a logic "high" level and may also reset the output latch (223-1 of FIG. 20) included in the first MAC operator (MAC0) 320 in response to the MAC result latch signal MAC_L_RST with a logic "high" level. The MAC result data DA_MAC transmitted to the GIO line 390 may be output to an external device through the serializer/deserializer 380 and the data I/O line 340. Although not shown in the drawings, the MAC result data DA_MAC that is output from the first MAC operator (MAC0) 320 may be written into the first memory bank (BK0) 311 through the first BIO line 391 without using the GIO line 390 or may be written into the second memory bank (BK1) 312 through the second BIO line 392 without using the GIO line 390.

Figure 26:
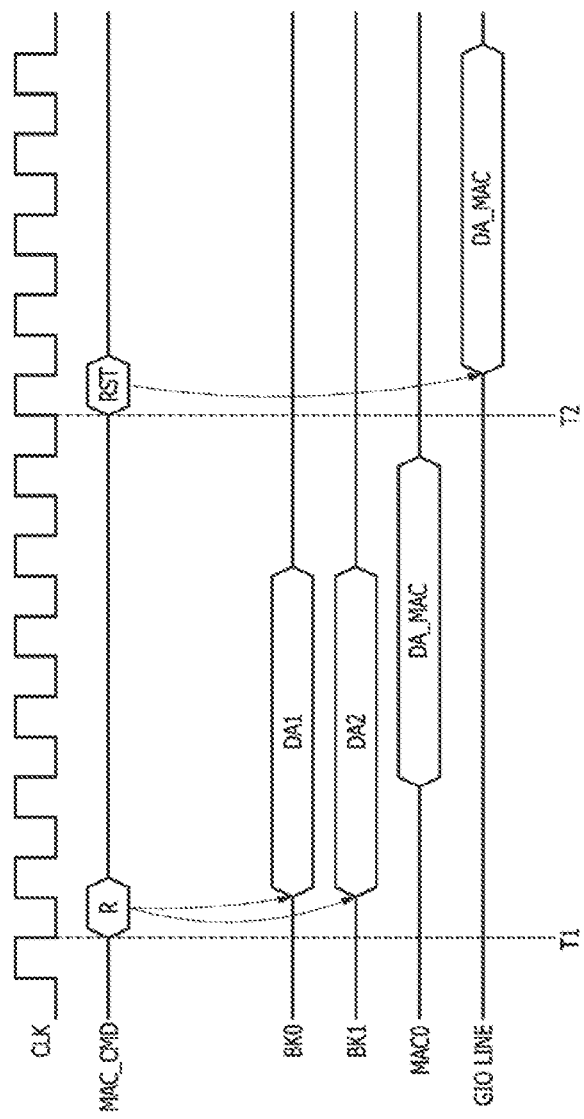
FIG. 26 is a timing diagram an operation of the PIM device illustrated in FIG. 16.

FIG. 26 is a timing diagram illustrating an operation of the PIM device 300 illustrated in FIG. 16. Referring to FIG. 26, at a first point in time "T1", the MAC command generator 370 may be synchronized with a falling edge of a clock signal CLK to generate and output the MAC read signal MAC_RD_BK (R) with a logic "high(H)" level. The first and second memory banks (BK0 and BK1) 311 and 312 may be selected by the MAC read signal MAC_RD_BK (R) with a logic "high(H)" level so that the first data DA1 and the second data DA2 are read out of the first and second memory banks (BK0 and BK1) 311 and 312. If a certain time elapses from a point in time when first data DA1 and the second data DA2 are read out, the first MAC operator (MAC0) 320 may perform the MAC arithmetic operation of the first and second data DA1 and DA2 to generate the MAC result data DA_MAC. At a second point in time "T2", the MAC command generator 370 may be synchronized with a falling edge of the clock signal CLK to generate and output the MAC result latch signal MAC_L_RST (RST) with a logic "high" level. The MAC result data DA_MAC may be transmitted to the GIO line 390 by the MAC result latch signal MAC_L_RST (RST) with a logic "high" level.

Figure 27:
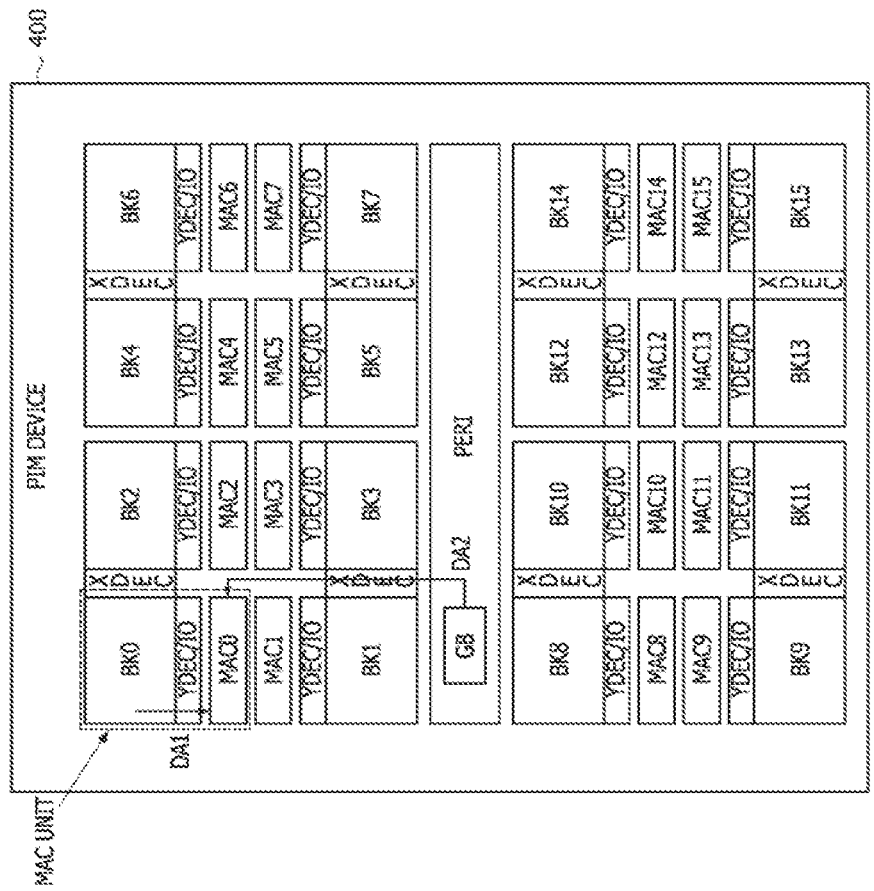
FIG. 27 is a schematic diagram illustrating an arrangement of memory banks and multiplication/accumulation (MAC) operators included in a PIM device according to a second embodiment of the present disclosure.

FIG. 27 illustrates a disposal structure indicating placement of memory banks and MAC operators included in a PIM device 400 according to another embodiment of the present disclosure.

Referring to FIG. 27, the PIM device 400 may include memory devices such as a plurality of memory banks (e.g., first to sixteenth memory banks BK0, . . . , and BK15), processing devices such as a plurality of MAC operators (e.g., first to sixteenth MAC operators MAC0, . . . , and MAC15), and a global buffer GB. A core circuit may be disposed to be adjacent to the memory banks BK0, . . . , and BK15. The core circuit may include X-decoders XDECs and Y-decoders/IO circuits YDEC/IOs. The memory banks BK0, . . . , and BK15 and the core circuit may have the same configuration as described with reference to FIG. 2. Thus, descriptions of the memory banks BK0, . . . , and BK15 and the core circuit will be omitted hereinafter. The MAC operators MAC0, . . . , and MAC15 may be disposed to be allocated to the memory banks BK0, . . . , and BK15, respectively. That is, in the PIM device 400, two or more memory banks do not share one MAC operator with each other. Thus, the number of the MAC operators MAC0, . . . , and MAC15 included in the PIM device 400 may be equal to the number of the memory banks BK0, . . . , and BK15 included in the PIM device 400. One of the memory banks BK0, . . . , and BK15 together with one of the MAC operators MAC0, . . . , and MAC15 may constitute one MAC unit. For example, the first memory bank BK0 and the first MAC operator MAC0 may constitute a first MAC unit, and the second memory bank BK1 and the second MAC operator MAC1 may constitute a second MAC unit. Similarly, the sixteenth memory bank BK15 and the sixteenth MAC operator MAC15 may constitute a sixteenth MAC unit. In each of the first to sixteenth MAC units, the MAC operator may receive first data DA1 to be used for the MAC arithmetic operation from the respective memory bank.

The PIM device 400 may further include a peripheral circuit PERI. The peripheral circuit PERI may be disposed in a region other than an area in which the memory banks BK0, BK1, . . . , and BK15; the MAC operators MAC0, . . . , and MAC15; and the core circuit are disposed. The peripheral circuit PERI may be configured to include a control circuit relating to a command/address signal, a control circuit relating to input/output of data, and a power supply circuit. The peripheral circuit PERI of the PIM device 400 may have substantially the same configuration as the peripheral circuit PERI of the PIM device 100 illustrated in FIG. 2. A difference between the peripheral circuit PERI of the PIM device 400 and the peripheral circuit PERI of the PIM device 100 is that the global buffer GB is disposed in the peripheral circuit PERI of the PIM device 400. The global buffer GB may receive second data DA2 to be used for the MAC operation from an external device and may store the second data DA2. The global buffer GB may output the second data DA2 to each of the MAC operators MAC0, . . . , and MAC15 through a GIO line. In the event that the PIM device 400 performs neural network calculation, for example, an arithmetic operation in a deep learning process, the first data DA1 may be weight data and the second data DA2 may be vector data.

The PIM device 400 according to the present embodiment may operate in a memory mode or a MAC arithmetic mode. In the memory mode, the PIM device 400 may operate to perform the same operations as general memory devices. The memory mode may include a memory read operation mode and a memory write operation mode. In the memory read operation mode, the PIM device 400 may perform a read operation for reading out data from the memory banks BK0, BK1, . . . , and BK15 to output the read data, in response to an external request. In the memory write operation mode, the PIM device 400 may perform a write operation for storing data provided by an external device into the memory banks BK0, BK1, . . . , and BK15, in response to an external request. In the MAC arithmetic mode, the PIM device 400 may perform the MAC arithmetic operation using the MAC operators MAC0, . . . , and MAC15. In the PIM device 400, the MAC arithmetic operation may be performed in a deterministic way, and the deterministic MAC arithmetic operation of the PIM device 400 will be described more fully hereinafter. Specifically, the PIM device 400 may perform the read operation of the first data DA1 for each of the memory banks BK0, . . . , and BK15 and the read operation of the second data DA2 for the global buffer GB, for the MAC arithmetic operation in the MAC arithmetic mode. In addition, each of the MAC operators MAC0, . . . , and MAC15 may perform the MAC arithmetic operation of the first data DA1 and the second data DA2 to store a result of the MAC arithmetic operation into the memory bank or to output the result of the MAC arithmetic operation to an external device. In some cases, the PIM device 400 may perform a data write operation for storing data to be used for the MAC arithmetic operation into the memory banks before the data that is read operation for the MAC arithmetic operation is performed in the MAC arithmetic mode.

The operation mode of the PIM device 400 according to the present embodiment may be determined by a command which is transmitted from a host or a controller to the PIM device 400. In an embodiment, if a first external command requesting a read operation or a write operation for the memory banks BK0, BK1, . . . , and BK15 is transmitted from the host or the controller to the PIM device 400, the PIM device 400 may perform the data that is read operation or the data write operation in the memory mode. Alternatively, if a second external command requesting the MAC arithmetic operation is transmitted from the host or the controller to the PIM device 400, the PIM device 400 may perform the data that is read operation and the MAC arithmetic operation.

The PIM device 400 may perform the deterministic MAC arithmetic operation. Thus, the host or the controller may always predict a point in time (or a clock) when the MAC arithmetic operation terminates in the PIM device 400 from a point in time when an external command requesting the MAC arithmetic operation is transmitted from the host or the controller to the PIM device 400. Because the timing is predictable, no operation for informing the host or the controller of a status of the MAC arithmetic operation is required while the PIM device 400 performs the deterministic MAC arithmetic operation. In an embodiment, a latency during which the MAC arithmetic operation is performed in the PIM device 400 may be set to a fixed value for the deterministic MAC arithmetic operation.

Figure 28:
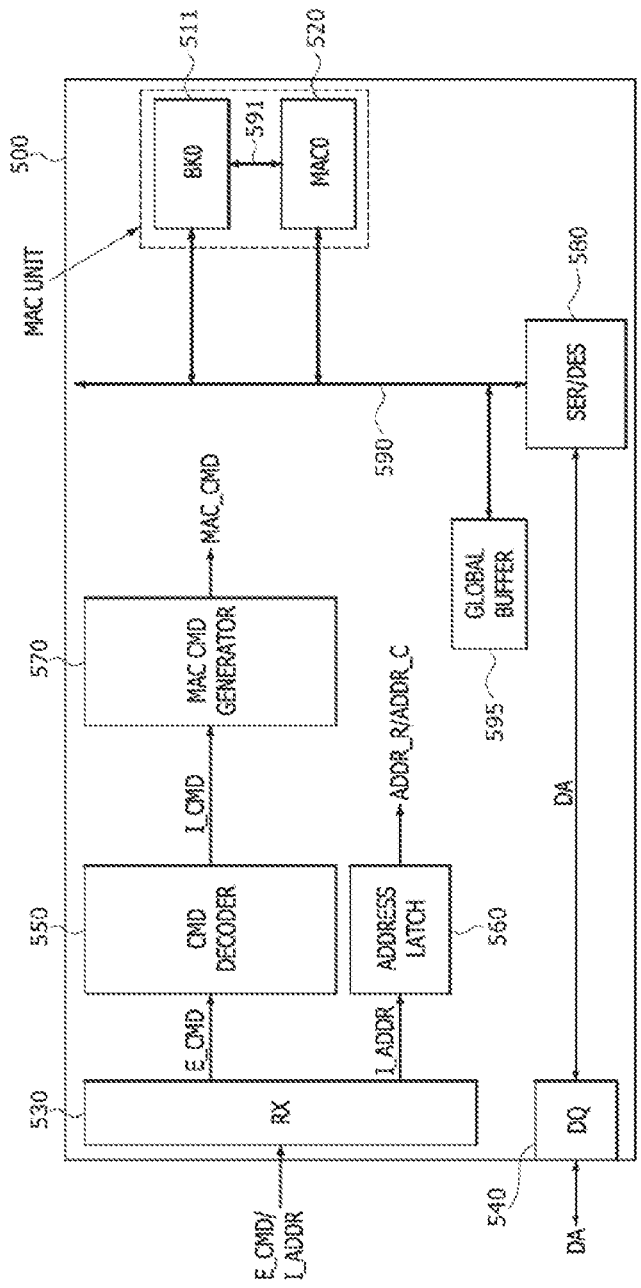
FIG. 28 is a block diagram illustrating a configuration of a PIM device according to the second embodiment of the present disclosure.

FIG. 28 is a block diagram illustrating an example of a detailed configuration of a PIM device 500 corresponding to the PIM device 400 illustrated in FIG. 27. FIG. 28 illustrates only a first memory bank (BK0) 511 and a first MAC operator (MAC0) 520 constituting a first MAC unit among a plurality of MAC units. However, FIG. 28 illustrates merely an example for simplification of the drawing. Accordingly, the following description for the first MAC unit may be equally applicable to the remaining MAC units. Referring to FIG. 28, the PIM device 500 may be configured to include the first memory bank (BK0) 511 and the first MAC operator (MAC0) 520 constituting the first MAC unit as well as a global buffer 595. The PIM device 500 may further include a GIO line 590 and a BIO line 591 used as data transmission lines. The first memory bank (BK0) 511 and the first MAC operator (MAC0) 520 may communicate with the global buffer 595 through the GIO line 590. Only the data transmission between the first memory bank (BK0) 511 and the first MAC operator (MAC0) 520 may be achieved through the BIO line 591. The BIO line 591 is dedicated specifically for data transmission between the first memory bank (BK0) 511 and the first MAC operator (MAC0) 520. Thus, the first MAC operator (MAC0) 520 may receive the first data DA1 to be used for the MAC arithmetic operation from the first memory bank (BK0) 511 through the BIO line 591 and may receive the second data DA2 to be used for the MAC arithmetic operation from the global buffer 595 through the GIO line 590.

The PIM device 500 may include a receiving driver (RX) 530, a data I/O circuit (DQ) 540, a command decoder 550, an address latch 560, a MAC command generator 570, and a serializer/deserializer (SER/DES) 580. The command decoder 550, the address latch 560, the MAC command generator 570, and the serializer/deserializer 580 may be disposed in the peripheral circuit PERI of the PIM device 400 illustrated in FIG. 27. The receiving driver 530 may receive an external command E_CMD and an input address I_ADDR from an external device. The external device may denote a host or a controller coupled to the PIM device 500. Hereinafter, it may be assumed that the external command E_CMD transmitted to the PIM device 500 is a command requesting the MAC arithmetic operation. That is, the PIM device 500 may perform the deterministic MAC arithmetic operation in response to the external command E_CMD. The data I/O circuit 540 may provide a means through which the PIM device 500 communicates with the external device.

The receiving driver 530 may separately output the external command E_CMD and the input address I_ADDR received from the external device. Data DA that is input to the PIM device 500 through the data I/O circuit 540 may be processed by the serializer/deserializer 580 and may be transmitted to the first memory bank (BK0) 511 and the global buffer 595 through the GIO line 590 of the PIM device 500. The data DA that is output from the first memory bank (BK0) 511 and the first MAC operator (MAC0) 520 through the GIO line 590 may be processed by the serializer/deserializer 580 and may be output to the external device through the data I/O circuit 540. The serializer/deserializer 580 may convert the data DA into parallel data if the data DA are serial data or may convert the data DA into serial data if the data DA are parallel data. For the data conversion, the serializer/deserializer 580 may include a serializer converting parallel data into serial data and a deserializer converting serial data into parallel data.

The command decoder 550 may decode the external command E_CMD that is output from the receiving driver 530 to generate and output the internal command signal I_CMD. The internal command signal I_CMD that is output from the command decoder 550 may be the same as the internal command signal I_CMD described with reference to FIG. 17. That is, the internal command signal I_CMD may include a first internal command signal corresponding to the memory active signal ACT_M, a second internal command signal corresponding to the MAC arithmetic signal MAC, and a third internal command signal corresponding to the result read signal READ_RST. The first to third internal command signals that are output from the command decoder 550 may be sequentially input to the MAC command generator 570. As described with reference to FIG. 17, the memory active signal ACT_M, the MAC arithmetic signal MAC, and the result read signal READ_RST that is output from the command decoder 550 may be sequentially generated at predetermined points in time (or clocks) in order to perform the deterministic MAC arithmetic operation of the PIM device 500. Thus, the host or the controller outputting the external command E_CMD may predict the points in time when the first to third internal command signals constituting the internal command signal I_CMD are generated by the command decoder 550 in advance at a point in time when the external command E_CMD is output from the host or the controller. That is, the host or the controller may predict a point in time (or a clock) when the MAC arithmetic operation terminates in the PIM device 500 after the external command E_CMD requesting the MAC arithmetic operation is transmitted from the host or the controller to the PIM device 500, even without receiving any signals from the PIM device 500.

The address latch 560 may convert the input address I_ADDR that is output from the receiving driver 530 into a row/column address ADDR_R/ADDR_C to output the row/column address ADDR_R/ADDR_C. The row/column address ADDR_R/ADDR_C that is output from the address latch 560 may be transmitted to the first memory bank (BK0) 511. According to the present embodiment, the first data and the second data to be used for the MAC arithmetic operation may be simultaneously read out of the first memory bank (BK0) 511 and the global buffer 595, respectively. Thus, it may be unnecessary to generate a bank selection signal for selecting the first memory bank 511. A point in time when the row/column address ADDR_R/ADDR_C is input to the first memory bank 511 may be a point in time when a MAC command (i.e., the MAC arithmetic signal MAC) requesting a data that is read operation for the first memory bank 511 for the MAC arithmetic operation is generated.

The MAC command generator 570 may output the MAC command signal MAC_CMD in response to the internal command signal I_CMD that is output from the command decoder 550. The MAC command signal MAC_CMD that is output from the MAC command generator 570 may be the same as the MAC command signal MAC_CMD described with reference to FIG. 17. That is, the MAC command signal MAC_CMD that is output from the MAC command generator 570 may include the MAC active signal RACTV corresponding to the first MAC command signal, the MAC read signal MAC_RD_BK corresponding to the second MAC command signal, the MAC input latch signal MAC_L1 corresponding to the third MAC command signal, the MAC output latch signal MAC_L3 corresponding to the fourth MAC command signal, and the MAC result latch signal MAC_L_RST corresponding to the fifth MAC command signal.

The MAC active signal RACTV may be generated based on the memory active signal ACT_M that is output from the command decoder 550. The MAC read signal MAC_RD_BK, the MAC input latch signal MAC_L1, the MAC output latch signal MAC_L3, and the MAC result latch signal MAC_L_RST may be sequentially generated based on the MAC arithmetic signal MAC that is output from the command decoder 550. That is, the MAC input latch signal MAC_L1 may be generated at a point in time when a certain time elapses from a point in time when the MAC read signal MAC_RD_BK is generated. The MAC output latch signal MAC_L3 may be generated at a point in time when a certain time elapses from a point in time when the MAC input latch signal MAC_L1 is generated. Finally, the MAC result latch signal MAC_L_RST may be generated based on the result read signal READ_RST that is output from the command decoder 550.

The MAC active signal RACTV that is output from the MAC command generator 570 may control an activation operation for the first memory bank 511. The MAC read signal MAC_RD_BK that is output from the MAC command generator 570 may control a data that is read operation for the first memory bank 511 and the global buffer 595. The MAC input latch signal MAC_L1 that is output from the MAC command generator 570 may control an input data latch operation of the first MAC operator (MAC0) 520. The MAC output latch signal MAC_L3 that is output from the MAC command generator 570 may control an output data latch operation of the first MAC operator (MAC0) 520. The MAC result latch signal MAC_L_RST that is output from the MAC command generator 570 may control an output operation of MAC result data of the first MAC operator (MAC0) 520 and a reset operation of the first MAC operator (MAC0) 520.

As described above, in order to perform the deterministic MAC arithmetic operation of the PIM device 500, the memory active signal ACT_M, the MAC arithmetic signal MAC, and the result read signal READ_RST that is output from the command decoder 550 may be sequentially generated at predetermined points in time (or clocks), respectively. Thus, the MAC active signal RACTV, the MAC read signal MAC_RD_BK, the MAC input latch signal MAC_L1, the MAC output latch signal MAC_L3, and the MAC result latch signal MAC_L_RST may also be generated and output from the MAC command generator 570 at predetermined points in time after the external command E_CMD is input to the PIM device 500, respectively. That is, a time period from a point in time when the first and second memory banks 511 is activated by the MAC active signal RACTV until a point in time when the first MAC operator (MAC0) 520 is reset by the MAC result latch signal MAC_L_RST may be predetermined.

The MAC command generator 570 of the PIM device 500 according to the present embodiment may have the same configuration as described with reference to FIG. 18. In addition, the input signals and the output signals of the MAC command generator 570 may be input to and output from the MAC command generator 570 at the same points in time as described with reference to FIG. 19. As described with reference to FIGS. 18 and 19, the MAC command generator 570 may sequentially receive the memory active signal ACT_M, the MAC arithmetic signal MAC, and the result read signal READ_RST from the command decoder 550. In addition, the MAC command generator 570 may sequentially generate and output the MAC active signal RACTV, the MAC read signal MAC_RD_BK, the MAC input latch signal MAC_L1, the MAC output latch signal MAC_L3, and the MAC result latch signal MAC_L_RST. The MAC active signal RACTV, the MAC read signal MAC_RD_BK, the MAC input latch signal MAC_L1, the MAC output latch signal MAC_L3, and the MAC result latch signal MAC_L_RST may be output from the MAC command generator 570 in series with certain time intervals.

The MAC command generator 570 may generate and output the MAC active signal RACTV in response to the memory active signal ACT_M that is output from the command decoder 550. Subsequently, the MAC command generator 570 may generate and output the MAC read signal MAC_RD_BK in response to the MAC arithmetic signal MAC that is output from the command decoder 550. The MAC command generator 570 may delay the MAC arithmetic signal MAC by a certain time determined by the first delay circuit (372 of FIG. 18) to generate and output the MAC input latch signal MAC_L1. The MAC command generator 570 may delay the MAC input latch signal MAC_L1 by a certain time determined by the second delay circuit (373 of FIG. 18) to generate and output the MAC output latch signal MAC_L3. Subsequently, the MAC command generator 570 may generate and output the MAC result latch signal MAC_L_RST in response to the result read signal READ_RST that is output from the command decoder 550.

Figure 29:
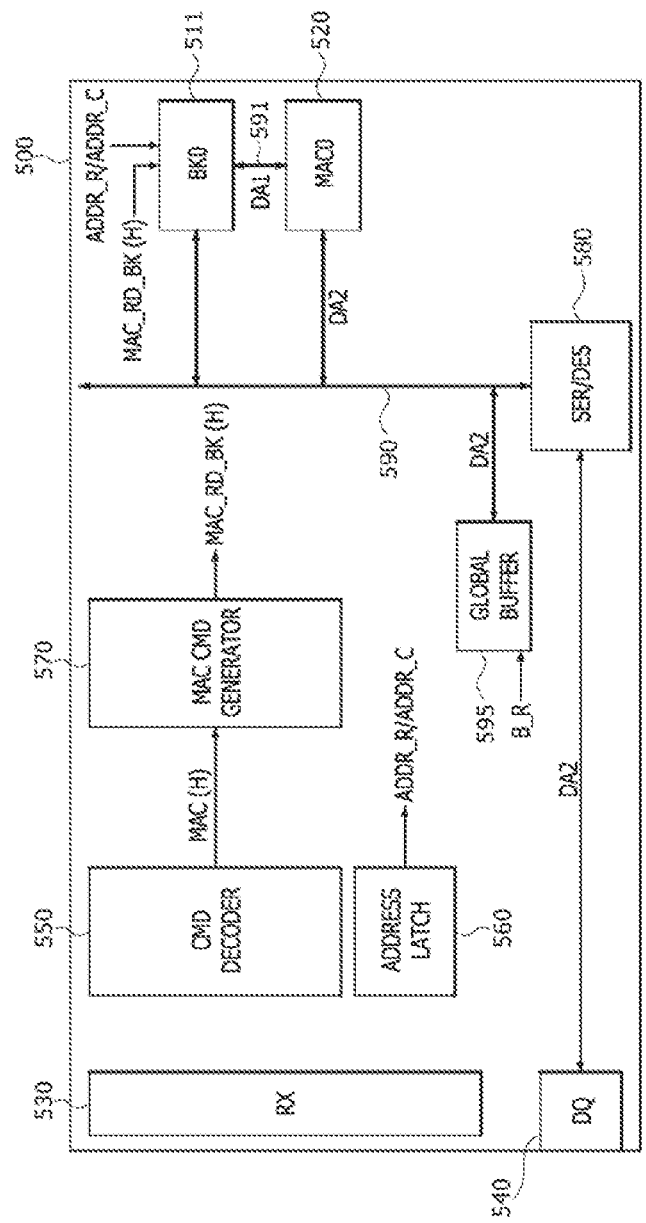
FIG. 29 is a block diagram illustrating an operation of the PIM device illustrated in FIG. 28.

FIG. 29 is a block diagram illustrating an operation of the PIM device 500 illustrated in FIG. 28. In FIG. 29, the same reference numerals or the same reference symbols as used in FIG. 16 denote the same elements. The operation of the PIM device 500 according to the present embodiment may be similar to the operation of the PIM device 300 described with reference to FIG. 16 except a transmission process of the first and second data DA1 and DA2 that are input to the first MAC operator (MAC0) 520. Thus, the operation of the PIM device 500 executed before the first and second data DA1 and DA2 are transmitted to the first MAC operator (MAC0) 520 may be the same as the operation of the PIM device 300 described with reference to FIG. 21. As illustrated in FIG. 29, when the MAC arithmetic signal MAC with a logic "high(H)" level is transmitted from the command decoder 550 to the MAC command generator 570, the MAC command generator 570 may generate and output the MAC read signal MAC_RD_BK with a logic "high(H)" level. The MAC read signal MAC_RD_BK with a logic "high(H)" level, together with the row/column address ADDR_R/ADDR_C, may be transmitted to the first memory bank (BK0) 511. In such a case, a global buffer read signal B_R may also be transmitted to the global buffer 595. The first data DA1 may be read out of the first memory bank (BK0) 511 by the MAC read signal MAC_RD_BK with a logic "high(H)" level and may be transmitted to the first MAC operator (MAC0) 520 through the BIO line 591. In addition, the second data DA2 may be read out of the global buffer 595 by the global buffer read signal B_R and may be transmitted to the first MAC operator (MAC0) 520 through the GIO line 590. The operation of the PIM device 500 executed after the first and second data DA1 and DA2 are transmitted to the first MAC operator (MAC0) 520 may be the same as the operation of the PIM device 300 described with reference to FIGS. 23 to 25.

Figure 30:
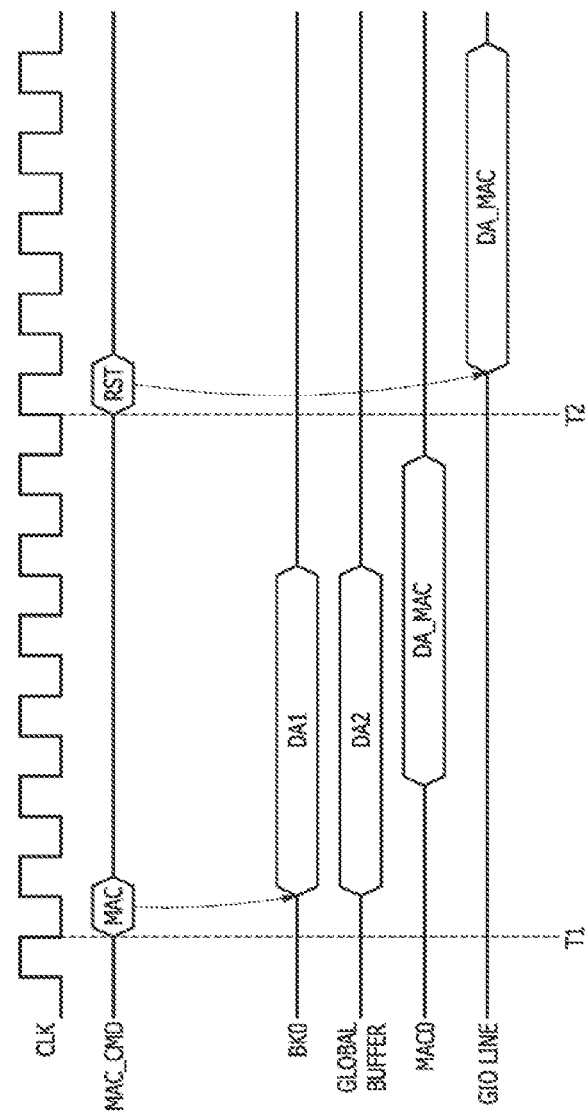
FIG. 30 is a timing diagram illustrating an operation of the PIM device illustrated in FIG. 28.

FIG. 30 is a timing diagram illustrating an operation of the PIM device 500 illustrate in FIG. 28. Referring to FIG. 30, at a first point in time "T1", the MAC command generator 570 may be synchronized with a falling edge of a clock signal CLK to generate and output the MAC read signal MAC_RD_BK (R) with a logic "high(H)" level. The first memory bank (BK0) 511 may be selected by the MAC read signal MAC_RD_BK (R) with a logic "high(H)" level so that the first data DA1 are read out of the first memory bank (BK0) 511. In addition, the second data DA2 may be read out of the global buffer 595. If a certain time elapses from a point in time when the first and second data DA1 and DA2 are read out of the first memory bank (BK0) 511 and the global buffer 595, the first MAC operator (MAC0) 520 may perform the MAC arithmetic operation of the first and second data DA1 and DA2 to generate the MAC result data DA_MAC. At a second point in time "T2", the MAC command generator 570 may be synchronized with a falling edge of the clock signal CLK to generate and output the MAC result latch signal MAC_L_RST (RST). The MAC result data DA_MAC may be transmitted to an external device through the GIO line 590 or to the first memory bank (BK0) 511 through the BIO line 591, by the MAC result latch signal MAC_L_RST (RST).

Figure 31A:
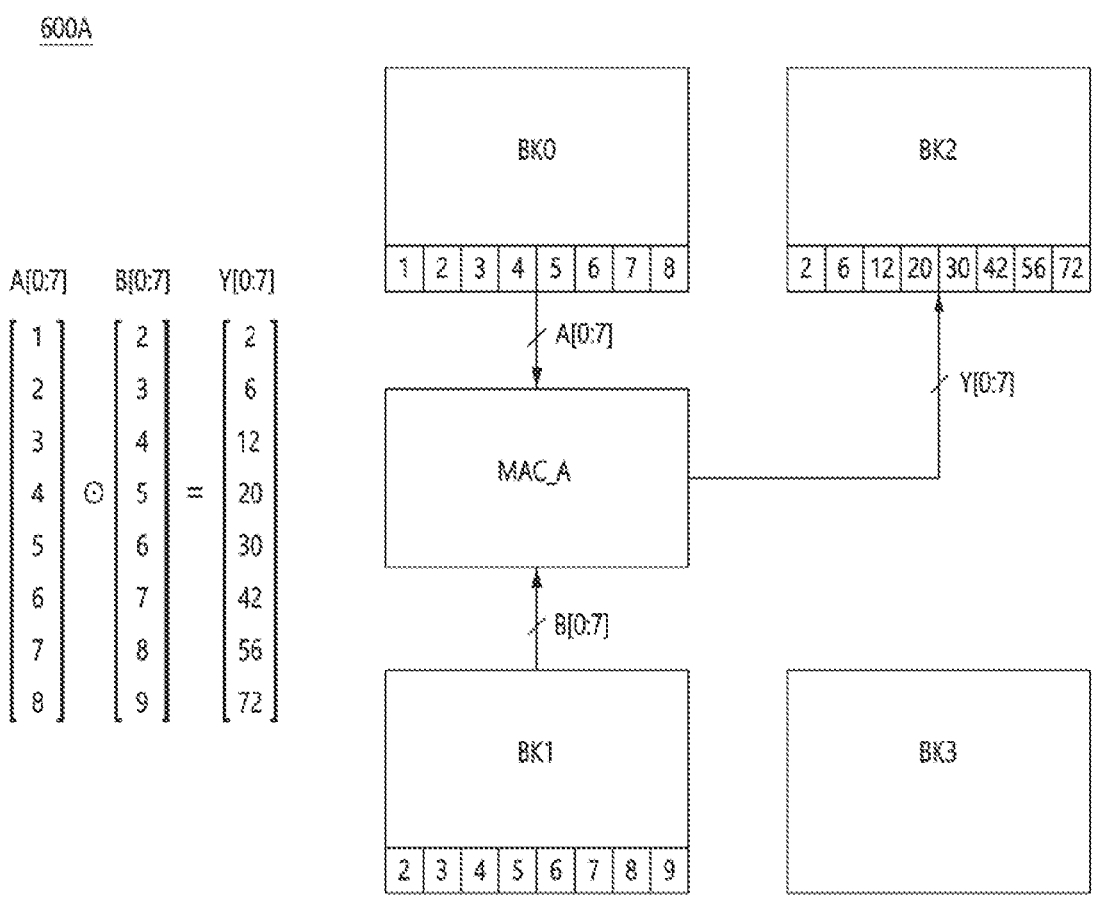
FIG. 31A is a diagram illustrating a configuration and an operation method of a PIM device in accordance with an embodiment of the present disclosure.

FIG. 31A is a diagram illustrating a configuration and an operation method of a PIM device 600A in accordance with an embodiment of the present disclosure. Referring to FIG. 31A, the PIM device 600A may perform an arithmetic operation. In particular, the PIM device 600A may perform an element-wise arithmetic operation. The element-wise arithmetic operation may mean an operation of calculating respective elements of two matrices with the same size. For example, an element-wise multiplication operation may be performed as follows. The PIM device 600A may multiply an element '1' of the first row of a first matrix A[0:7] and an element '2' of the first row of a second matrix B[0:7] to output a multiplication result of an element '2' that is seen in the first row of a third matrix Y[0:7]. The PIM device 600A may multiply an element '2' of the second row of the first matrix A[0:7] and an element '3' of the second row of the second matrix B[0:7] to output a multiplication result of an element '6' that is seen in the second row of the third matrix Y[0:7]. The PIM device 600A may multiply an element '3' of the third row of the first matrix A[0:7] and an element '4' of the third row of the second matrix B[0:7] to output a multiplication result of an element '12' that is seen in the third row of the third matrix Y[0:7]. The PIM device 600A may multiply an element '4' of the fourth row of the first matrix A[0:7] and an element '5' of the fourth row of the second matrix B[0:7] to output a multiplication result of an element '20' that is seen in the fourth row of the third matrix Y[0:7]. In the same manner, the PIM device 600A may multiply elements '5,' '6,' '7,' and '8' of fifth to eighth rows of the first matrix A[0:7] and elements '6,' '7,' '8,' and '9' of fifth to eighth rows of the second matrix B[0:7], respectively, to output multiplication results of elements '30,' '42,' '56,' and '72,' respectively, seen in the fifth to eighth rows of the third matrix Y[0:7]. For the sake of clarity in explanation, it is illustrated that each of the first to third matrices A[0:7], B[0:7] and Y[0:7] includes only elements of a plurality of rows. However, the spirit of the present disclosure may be applied to cases in which each of the first to third matrices A[0:7], B[0:7], and Y[0:7] include elements of a plurality of columns or a plurality of rows and columns. Hereinafter, the elements of the first to eighth rows may be described as first to eighth elements, respectively.

The PIM device 600A may include a plurality of MAC units. One MAC unit may include a plurality of storage regions and an MAC operator MAC_A. The storage region may be a memory bank that stores data. The plurality of storage regions may include a plurality of memory banks. The MAC operator MAC_A may be coupled to the plurality of memory banks and may perform an arithmetic operation on data that is output from the plurality of memory banks. The MAC operator MAC_A may store the result data of the arithmetic operation in the plurality of memory banks. For example, in order to perform the element-wise multiplication operation, one MAC operator MAC_A may be coupled to at least three memory banks. The at least three memory banks and the MAC operator MAC_A may configure one MAC unit. In FIG. 31A, first to fourth memory banks BK0, BK1, BK2, and BK3 are illustrated. The first to third memory banks BK0, BK1, and BK2 and the MAC operator MAC_A may configure one MAC unit, or the first to fourth memory banks BK0, BK1, BK2, and BK3 and the MAC operator MAC_A may configure one MAC unit. Each of the first to fourth memory banks BK0, BK1, BK2, and BK3 may include a plurality of rows and a plurality of columns, and a plurality of memory cells may be coupled to points at which the plurality of rows and the plurality of columns intersect with each other.

In order to perform the element-wise multiplication operation, the PIM device 600A may store data, corresponding to the first to eighth elements '1,' '2,' '3,' '4,' '5,' '6,' '7,' and '8' of the first matrix A[0:7], in the first memory bank BK0. The PIM device 600A may store data, corresponding to the first to eighth elements '2,' '3,' '4,' '5,' '6,' '7,' '8,' and '9' of the second matrix B[0:7], in the second memory bank BK1. The PIM device 600A may simultaneously read data that is stored in the first and second memory banks BK0 and BK1, and may provide the read data to the MAC operator MAC_A. The PIM device 600A may control the data that corresponds to the pluralities of elements of the first and second matrices A[0:7] and B[0:7] to be sequentially output from the first and second memory banks BK0 and BK1, and may control elements with the same order to be simultaneously output. During an operation that is performed based on a single command signal, the PIM device 600A may simultaneously read elements with the same order (that is, a pair of elements with the same order) among the elements of the first and second matrices A[0:7] and B[0:7]. For example, during a first operation that is performed based on the single command signal, the PIM device 600A may simultaneously output data that corresponds to the first elements '1' and '2' of the first and second matrices A[0:7] and B[0:7] among the data that is stored in the first and second memory banks BK0 and BK1. Thereafter, during a second operation that is performed based on the single command signal, the PIM device 600A may simultaneously output data that corresponds to the second elements '2' and '3' of the first and second matrices A[0:7] and B[0:7] among the data that is stored in the first and second memory banks BK0 and BK1. The PIM device 600A may control data that corresponds to the respective third to eighth elements '3' and '4,' '4' and '5,' and '6,' '6' and '7,' '7' and '8' and '8' and '9' of the first and second matrices A[0:7] and B[0:7] to be sequentially output from the first and second memory banks BK0 and BK1.

The MAC operator MAC_A may perform an arithmetic operation on data that is output from the first and second memory banks BK0 and BK1. The MAC operator MAC_A may multiply data that is output from the first and second memory banks BK0 and BK1. The MAC operator MAC_A may sequentially multiply data that corresponds to elements with the same order and may be output from the first and second memory banks BK0 and BK1. The MAC operator MAC_A may receive data, corresponding to the first elements '1' and '2' of the first and second matrices A[0:7] and B[0:7], from the first and second memory banks BK0 and BK1, and may generate arithmetic data by multiplying the data that corresponds to the first elements '1' and '2.' The arithmetic data may be data that corresponds to the first element '2' of the third matrix Y[0:7]. The MAC operator MAC_A may receive data, corresponding to the second elements '2' and '3' of the first and second matrices A[0:7] and B[0:7], from the first and second memory banks BK0 and BK1, and may generate arithmetic data by multiplying the data that corresponds to the second elements '2' and '3.' The arithmetic data may be data that corresponds to the second element '6' of the third matrix Y[0:7]. The MAC operator MAC_A may receive data, corresponding to the third elements '3' and '4' of the first and second matrices A[0:7] and B[0:7], from the first and second memory banks BK0 and BK1, and may generate arithmetic data by multiplying the data that corresponds to the third elements '3' and '4.' The arithmetic data may be data that corresponds to the third element '12' of the third matrix Y[0:7]. The MAC operator MAC_A may receive data, corresponding to the fourth elements '4' and '5' of the first and second matrices A[0:7] and B[0:7], from the first and second memory banks BK0 and BK1, and may generate arithmetic data by multiplying the data that corresponds to the fourth elements '4' and '5.' The arithmetic data may be data that corresponds to the fourth element '20' of the third matrix Y[0:7]. In the same manner, the MAC operator MAC_A may sequentially receive data that corresponds to the fifth to eighth elements '5' and '6,' '6' and '7,' '7' and '8' and '8' and '9' of the first and second matrices A[0:7] and B[0:7], and may generate respective arithmetic data by multiplying the data that corresponds to the fifth to eighth elements '5' and '6,' '6' and '7,' '7' and '8' and '8' and '9.' The arithmetic data may be data that corresponds to the fifth to eighth elements '30,' '42,' '56' and '72,' respectively, of the third matrix Y[0:7].

The MAC operator MAC_A may provide the arithmetic data to the third memory bank BK2, and the arithmetic data may be written into the third memory bank BK2. The third memory bank BK2 may sequentially receive the arithmetic data, corresponding to the first to eighth elements '2,' '6,' '12,' '20,' '30,' '42,' '56,' and '72' of the third matrix Y[0:7], from the MAC operator MAC_A, and the arithmetic data may be sequentially stored in the third memory bank BK2. The PIM device 600A may complete the element-wise arithmetic operation by writing the arithmetic data to the third memory bank BK2.

The PIM device 600A may store elements of the first to third matrices A[0:7], B[0:7] and Y[0:7] in rows, respectively, with the same order of the first to third memory banks BK0, BK1 and BK2. The PIM device 600A may store elements with the same order among the elements of the first to third matrices A[0:7], B[0:7], and Y[0:7] in columns, respectively, with the same order of the first to third memory banks BK0, BK1, and BK2. For example, when the elements of the first matrix A[0:7] are stored in a first row of the first memory bank BK0, the elements of the second matrix B[0:7] may be stored in a first row of the second memory bank BK1, and the elements of the third matrix Y[0:7] may be stored in a first row of the third memory bank BK3. When the first element '1' of the first matrix A[0:7] is stored in a first column that is coupled to the first row of the first memory bank BK0, the first element '2' of the second matrix B[0:7] may be stored in a first column that is coupled to the first row of the second memory bank BK1, and the first element '2' of the third matrix Y[0:7] may be stored in a first column that is coupled to the first row of the third memory bank BK2. When the second element '2' of the first matrix A[0:7] is stored in a second column that is coupled to the first row of the first memory bank BK0, the second element '3' of the second matrix B[0:7] may be stored in a second column that is coupled to the first row of the second memory bank BK1, and the second element '6' of the third matrix Y[0:7] may be stored in a second column that is coupled to the first row of the third memory bank BK2. In the same manner, the third to eighth elements of the first to third matrices A[0:7], B[0:7] and Y[0:7] may be stored in third to eighth columns, respectively, coupled to the first rows of the first to third memory banks BK0, BK1 and BK2. Each of the first to eighth columns may include a plurality of columns.

Figure 31B:
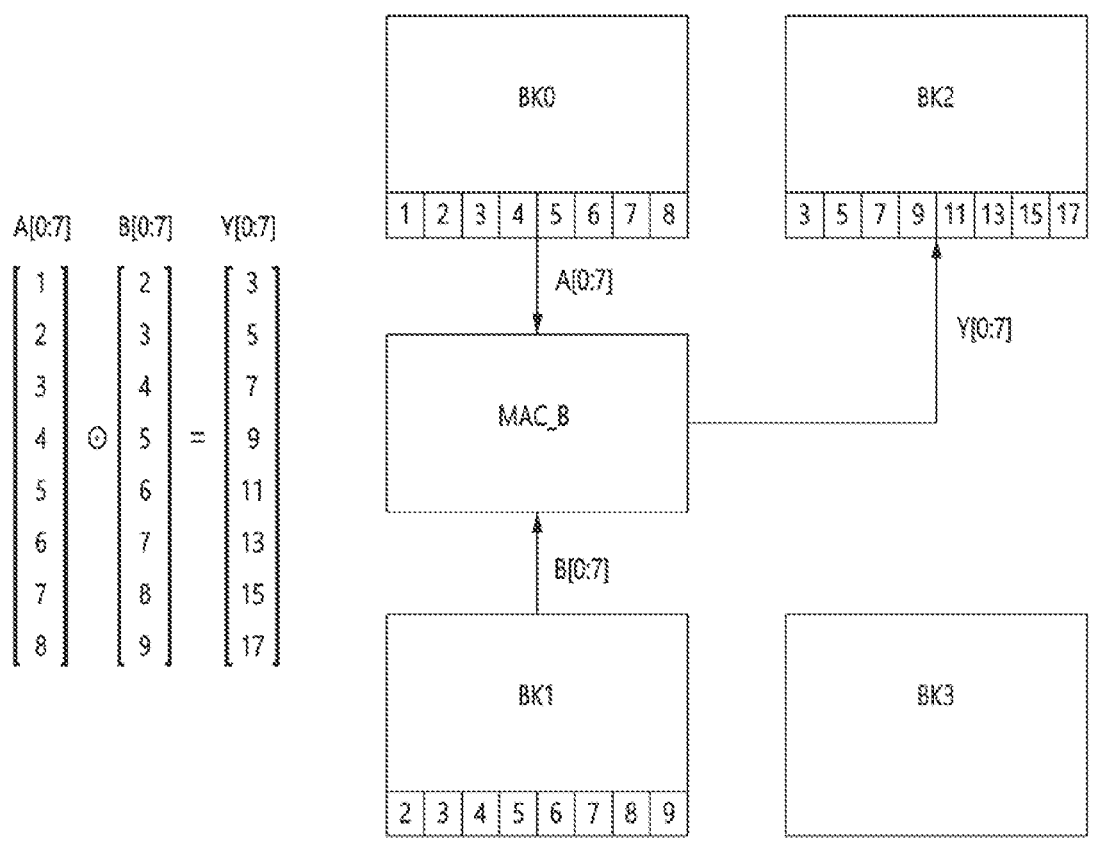
FIG. 31B is a diagram illustrating a configuration and an operation method of a PIM device in accordance with an embodiment of the present disclosure.

FIG. 31B is a diagram illustrating a configuration and an operation method of a PIM device 600B in accordance with an embodiment of the present disclosure. Referring to FIG. 31B, the PIM device 600B may perform an arithmetic operation. In particular, the PIM device 600B may perform an element-wise arithmetic operation. The element-wise arithmetic operation may mean an operation of calculating respective elements of two matrices with the same size. For example, an element-wise addition operation may be performed as follows. The PIM device 600B may add an element '1' of the first row of a first matrix A[0:7] and an element '2' of the first row of a second matrix B[0:7] to output an addition result of an element '3' that is seen in the first row of a third matrix Y[0:7]. The PIM device 600B may add an element '2' of the second row of the first matrix A[0:7] and an element '3' of the second row of the second matrix B[0:7] to output an addition result of an element '5' that is seen in the second row of the third matrix Y[0:7]. The PIM device 600B may add an element '3' of the third row of the first matrix A[0:7] and an element '4' of the third row of the second matrix B[0:7] to output an addition result of an element '7' that is seen in the third row of the third matrix Y[0:7]. The PIM device 600B may add an element '4' of the fourth row of the first matrix A[0:7] and an element '5' of the fourth row of the second matrix B[0:7] to output an addition result of an element '9' that is seen in the fourth row of the third matrix Y[0:7]. In the same manner, the PIM device 600B may add elements '5,' '6,' '7' and '8' of fifth to eighth rows of the first matrix A[0:7] and elements '6,' '7,' '8' and '9' of fifth to eighth rows of the second matrix B[0:7], respectively, to output addition results of elements '11,' '13,' '15,' and '17,' respectively, seen in the fifth to eighth rows of the third matrix Y[0:7]. For the sake of clarity in explanation, it is illustrated that each of the first to third matrices A[0:7], B[0:7] and Y[0:7] includes only elements of a plurality of rows. However, the spirit of the present disclosure may be applied to cases in which each of the first to third matrices A[0:7], B[0:7] and Y[0:7] includes elements of a plurality of columns or a plurality of rows and columns. Hereinafter, the elements of the first to eighth rows may be described as first to eighth elements, respectively.

The PIM device 600B may include a plurality of MAC units. One MAC unit may include a plurality of storage regions and an MAC operator MAC_B. The storage region may be a memory bank for storing data. The plurality of storage regions may include a plurality of memory banks. The MAC operator MAC_B may be coupled to the plurality of memory banks and may perform an arithmetic operation on data that is output from the plurality of memory banks. The MAC operator MAC_B may store result data of the arithmetic operation in the plurality of memory banks. For example, in order to perform the element-wise addition operation, one MAC operator MAC_B may be coupled to at least three memory banks. The at least three memory banks and the MAC operator MAC_B may configure one MAC unit. In FIG. 31B, first to fourth memory banks BK0, BK1, BK2, and BK3 are illustrated. The first to third memory banks BK0, BK1, and BK2 and the MAC operator MAC_B may configure one MAC unit, or the first to fourth memory banks BK0, BK1, BK2, and BK3 and the MAC operator MAC_B may configure one MAC unit. Each of the first to fourth memory banks BK0, BK1, BK2, and BK3 may include a plurality of rows and a plurality of columns, and a plurality of memory cells may be coupled to points at which the plurality of rows and the plurality of columns intersect with each other.

In order to perform the element-wise addition operation, the PIM device 600B may store data, corresponding to the first to eighth elements '1,' '2,' '3,' '4,' '5,' '6,' '7,' and '8' of the first matrix A[0:7], in the first memory bank BK0. The PIM device 600B may store data, corresponding to the first to eighth elements '2,' '3,' '4,' '5,' '6,' '7,' '8,' and '9' of the second matrix B[0:7], in the second memory bank BK1. The PIM device 600B may simultaneously read data that is stored in the first and second memory banks BK0 and BK1, and may provide the read data to the MAC operator MAC_B. The PIM device 600B may control the data that corresponds to the pluralities of elements of the first and second matrices A[0:7] and B[0:7] to be sequentially output from the first and second memory banks BK0 and BK1, and may control elements with the same order to be simultaneously output. During an operation that is performed based on a single command signal, the PIM device 600B may simultaneously read elements with the same order (that is, a pair of elements with the same order) among the elements of the first and second matrices A[0:7] and B[0:7]. For example, during a first operation that is performed based on the single command signal, the PIM device 600B may simultaneously output data that corresponds to the first elements '1' and '2' of the first and second matrices A[0:7] and B[0:7] among the data that is stored in the first and second memory banks BK0 and BK1. Thereafter, during a second operation that is performed based on the single command signal, the PIM device 600B may simultaneously output data that corresponds to the second elements '2' and '3' of the first and second matrices A[0:7] and B[0:7] among the data that is stored in the first and second memory banks BK0 and BK1. The PIM device 600B may control data that corresponds to the respective third to eighth elements '3' and '4,' '4' and '5,' and '6,' '6' and '7,' '7' and '8' and '8' and '9' of the first and second matrices A[0:7] and B[0:7] to be sequentially output from the first and second memory banks BK0 and BK1.

The MAC operator MAC_B may perform an arithmetic operation on data that is output from the first and second memory banks BK0 and BK1. The MAC operator MAC_B may add data that is output from the first and second memory banks BK0 and BK1. The MAC operator MAC_B may sequentially add data which correspond to elements with the same order and are output from the first and second memory banks BK0 and BK1. The MAC operator MAC_B may receive data, corresponding to the first elements '1' and '2' of the first and second matrices A[0:7] and B[0:7], from the first and second memory banks BK0 and BK1, and may generate arithmetic data by adding the data that corresponds to the first elements '1' and '2.' The arithmetic data may be data that corresponds to the first element '3' of the third matrix Y[0:7]. The MAC operator MAC_B may receive data, corresponding to the second elements '2' and '3' of the first and second matrices A[0:7] and B[0:7], from the first and second memory banks BK0 and BK1, and may generate arithmetic data by adding the data that corresponds to the second elements '2' and '3.' The arithmetic data may be data that corresponds to the second element '5' of the third matrix Y[0:7]. The MAC operator MAC_B may receive data, corresponding to the third elements '3' and '4' of the first and second matrices A[0:7] and B[0:7], from the first and second memory banks BK0 and BK1, and may generate arithmetic data by adding the data that corresponds to the third elements '3' and '4.' The arithmetic data may be data that corresponds to the third element '7' of the third matrix Y[0:7]. The MAC operator MAC_B may receive data, corresponding to the fourth elements '4' and '5' of the first and second matrices A[0:7] and B[0:7], from the first and second memory banks BK0 and BK1, and may generate arithmetic data by adding the data that corresponds to the fourth elements '4' and '5.' The arithmetic data may be data that corresponds to the fourth element '9' of the third matrix Y[0:7]. In the same manner, the MAC operator MAC_B may sequentially receive data that corresponds to the fifth to eighth elements '5' and '6,' '6' and '7,' '7' and '8' and '8' and '9' of the first and second matrices A[0:7] and B[0:7], and may generate respective arithmetic data by adding the data that corresponds to the fifth to eighth elements '5' and '6,' '6' and '7,' '7' and '8' and '8' and '9.' The arithmetic data may be data that corresponds to the fifth to eighth elements '11,' '13,' '15' and '17,' respectively, of the third matrix Y[0:7].

The MAC operator MAC_B may provide the arithmetic data to the third memory bank BK2, and the arithmetic data may be written into the third memory bank BK2. The third memory bank BK2 may sequentially receive the arithmetic data, corresponding to the first to eighth elements '3,' '5,' '7,' '9,' '11,' '13,' '15' and '17' of the third matrix Y[0:7], from the MAC operator MAC_B, and the arithmetic data may be sequentially stored in the third memory bank BK2. The PIM device 600B may complete the element-wise arithmetic operation by writing the arithmetic data to the third memory bank BK2.

The PIM device 600B may store elements of the first to third matrices A[0:7], B[0:7] and Y[0:7] in rows, respectively, with the same order of the first to third memory banks BK0, BK1 and BK2. The PIM device 600B may store elements with the same order among the elements of the first to third matrices A[0:7], B[0:7] and Y[0:7] in columns, respectively, with the same order of the first to third memory banks BK0, BK1 and BK2. For example, when the elements of the first matrix A[0:7] are stored in a first row of the first memory bank BK0, the elements of the second matrix B[0:7] may be stored in a first row of the second memory bank BK1, and the elements of the third matrix Y[0:7] may be stored in a first row of the third memory bank BK3. When the first element '1' of the first matrix A[0:7] is stored in a first column that is coupled to the first row of the first memory bank BK0, the first element '2' of the second matrix B[0:7] may be stored in a first column that is coupled to the first row of the second memory bank BK1, and the first element '3' of the third matrix Y[0:7] may be stored in a first column that is coupled to the first row of the third memory bank BK2. When the second element '2' of the first matrix A[0:7] is stored in a second column that is coupled to the first row of the first memory bank BK0, the second element '3' of the second matrix B[0:7] may be stored in a second column that is coupled to the first row of the second memory bank BK1, and the second element '5' of the third matrix Y[0:7] may be stored in a second column that is coupled to the first row of the third memory bank BK2. In the same manner, the third to eighth elements of the first to third matrices A[0:7], B[0:7] and Y[0:7] may be stored in third to eighth columns, respectively, coupled to the first rows of the first to third memory banks BK0, BK1 and BK2. Each of the first to eighth columns may include a plurality of columns.

Figure 32:
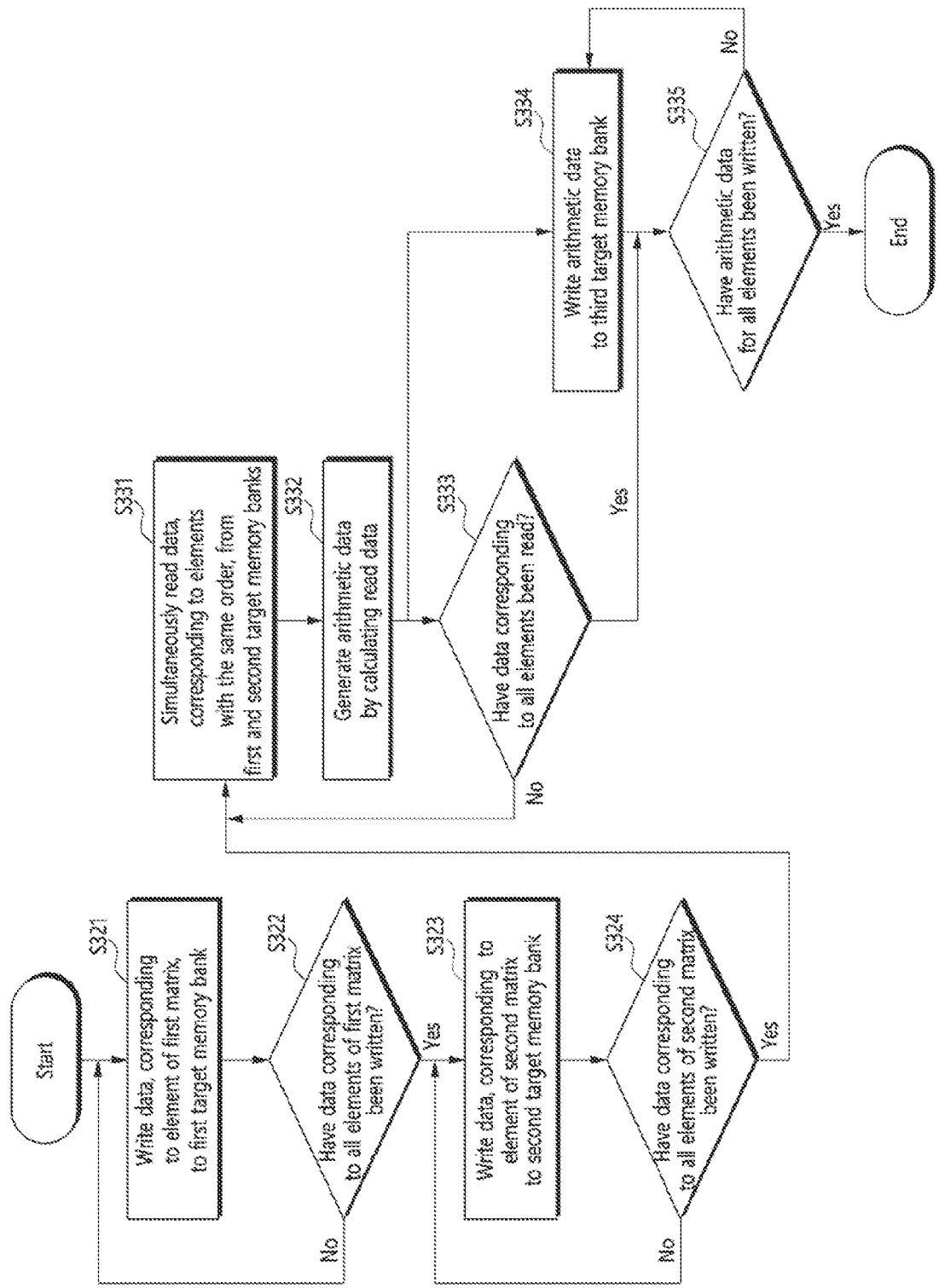
FIG. 32 is a flow chart illustrating an operation method of a PIM device in accordance with an embodiment of the present disclosure.

FIG. 32 is a flow chart illustrating an operation method of a PIM device in accordance with an embodiment of the present disclosure. The operation method of the PIM devices 600A and 600B will be described below with reference to FIG. 32 together with FIGS. 31A and 31B. When the PIM devices 600A and 600B perform an element-wise arithmetic operation, at step S321, the PIM devices 600A and 600B may receive data that corresponds to the elements of the first matrix A[0:7], and may write the data to a first target memory bank. The first target memory bank may be the first memory bank BK0. The PIM devices 600A and 600B may activate the first target memory bank and enable a specific row (e.g., a first row) of the first target memory bank. The PIM devices 600A and 600B may access a first column that is coupled to the first row, and may write the first element '1' of the first matrix A[0:7] to the first column. At step S322, the PIM devices 600A and 600B may determine whether all elements of the first matrix A[0:7] have been written into the first target memory bank. If all the elements of the first matrix A[0:7] have not been written (No of the step S322), the steps S321 and S322 may be repeatedly performed, and the PIM devices 600A and 600B may sequentially write data, corresponding to elements of the first matrix A[0:7], to the first target memory bank. The PIM devices 600A and 600B may sequentially access second to eighth columns that are coupled to the first row of the first target memory bank, and may sequentially write data, corresponding to the second to eighth elements of the first matrix A[0:7], to the second to eighth columns, respectively. If all the elements of the first matrix A[0:7] have been written (Yes of the step S322), the process may proceed to step S323.

At the step S323, the PIM devices 600A and 600B may receive data that corresponds to the elements of the second matrix B[0:7], and may write the data to a second target memory bank. The second target memory bank may be the second memory bank BK1. The PIM devices 600A and 600B may activate the second target memory bank and enable a specific row (e.g., a first row) of the second target memory bank. The PIM devices 600A and 600B may access a first column that is coupled to the first row, and may write the first element '2' of the second matrix B[0:7] to the first column. At step S324, the PIM devices 600A and 600B may determine whether all elements of the second matrix B[0:7] have been written into the second target memory bank. If all the elements of the second matrix B[0:7] have not been written (No of the step S324), the steps S323 and S324 may be repeatedly performed, and the PIM devices 600A and 600B may sequentially write data, corresponding to elements of the second matrix B[0:7], to the second target memory bank. The PIM devices 600A and 600B may sequentially access second to eighth columns that are coupled to the first row of the second target memory bank, and may sequentially write data, corresponding to the second to eighth elements of the second matrix B[0:7], to the second to eighth columns, respectively. If all the elements of the second matrix B[0:7] have been written (Yes of the step S324), the process may proceed to step S331.

At the step S331, the PIM devices 600A and 600B may simultaneously read data, corresponding to elements with the same order among the elements of the first and second matrices A[0:7] and B[0:7], from the first and second target memory banks. The PIM devices 600A and 600B may activate the first and second target memory banks and enable specific rows of the first and second target memory banks. The first and second target memory banks may be simultaneously activated or sequentially activated. The PIM devices 600A and 600B may activate a third target memory bank and enable a specific row of the third target memory bank. The third target memory bank may be the third memory bank BK2. The third target memory bank may be activated simultaneously with the first and second target memory banks, or may be sequentially activated after the first and second target memory banks are activated.

The PIM devices 600A and 600B may simultaneously access columns with the same order of the first and second target memory banks, and may simultaneously read data, corresponding to elements with the same order among the elements of the first and second matrices A[0:7] and B[0:7], from the columns with the same order. For example, the PIM devices 600A and 600B may simultaneously access first columns that are coupled to first rows of the first and second memory banks BK0 and BK1, and may simultaneously read data, corresponding to the first elements '1' and '2' of the first and second matrices A[0:7] and B[0:7], stored in the first columns. At step S332, the PIM devices 600A and 600B may generate arithmetic data by performing an arithmetic operation on the data that is read from the first and second target memory banks. The PIM device 600A may generate the arithmetic data by multiplying data that is read from the first and second memory banks BK0 and BK1. The PIM device 600B may generate the arithmetic data by adding data that is read from the first and second memory banks BK0 and BK1. The arithmetic data, as a result of calculating the data, corresponding to the first elements of the first and second matrices A[0:7] and B[0:7], by the PIM devices 600A and 600B, may be the first element of the third matrix Y[0:7]. At step S333, the PIM devices 600A and 600B may determine whether data that corresponds to all the elements of the first and second matrices A[0:7] and B[0:7] have been read. If data that corresponds to all the elements have not been read (No of the step S333), the steps S331 to S333 may be repeatedly performed. The PIM devices 600A and 600B may sequentially read data, corresponding to the second to eighth elements of the first and second matrices A[0:7] and B[0:7], from the first and second memory banks BK0 and BK1, and may generate respective arithmetic data by performing arithmetic operations on the read data. The arithmetic data may be the second to eighth elements, respectively, of the third matrix Y[0:7]. If data that corresponds to all the elements have been read (Yes of the step S333), the process may proceed to step S335 to be described later.

Step S334 may be performed in parallel with the step S333. At the step S334, the PIM devices 600A and 600B may provide the arithmetic data generated at the step S332 to the third target memory bank, and may write the arithmetic data to the third target memory bank. At step S335, the PIM devices 600A and 600B may determine whether arithmetic data for all the elements of the first and second matrices A[0:7] and B[0:7] (that is, all the elements of the third matrix Y[0:7]) have been written into the third target memory bank. If arithmetic data that corresponds to all the elements of the third matrix Y[0:7] have not been written into the third target memory bank (No of the step S335), the steps S334 and S335 may be repeatedly performed. Each time arithmetic data are sequentially generated at the step S332, the PIM devices 600A and 600B may sequentially write the arithmetic data to the third target memory bank. In the third memory bank BK2, the arithmetic data may be stored in a row and columns with the same orders as rows and columns in which the elements of the first and second matrices A[0:7] and B[0:7] are stored in the first and second memory banks BK0 and BK1. Arithmetic data generated by calculating the first elements of the first and second matrices A[0:7] and B[0:7] (that is, the first element of the third matrix Y[0:7]) may be stored in a first column that is coupled to a first row of the third target memory bank. Arithmetic data generated by calculating the second to eighth elements of the first and second matrices A[0:7] and B[0:7] (that is, the second to eighth elements of the third matrix Y[0:7]) may be stored in second to eighth columns, respectively, coupled to the first row of the third target memory bank. If arithmetic data for all the elements have been written into the third target memory bank (Yes of the step S335), the element-wise arithmetic operation of the PIM devices 600A and 600B may be ended.

Figure 33:
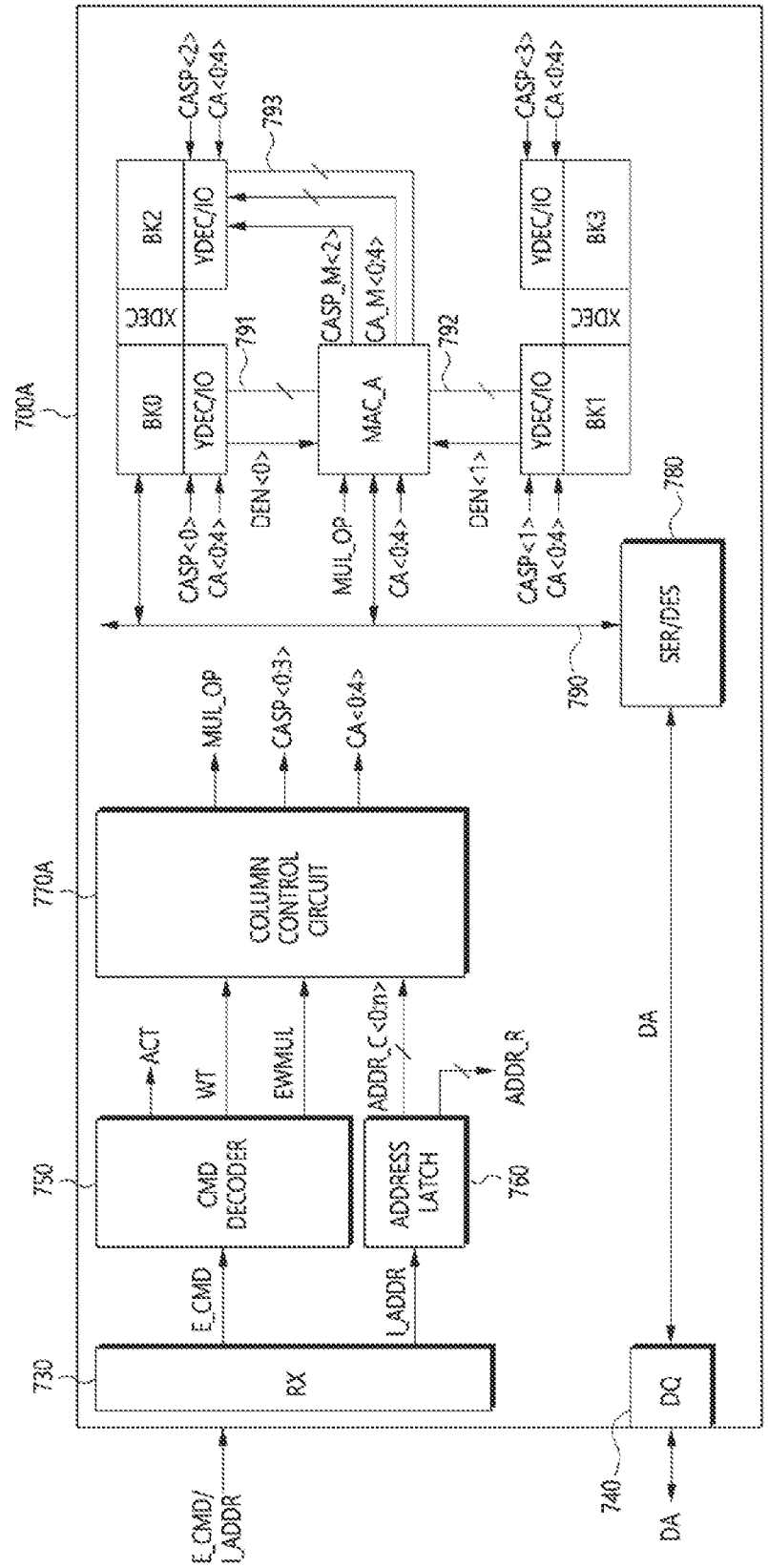
FIG. 33 is a diagram illustrating a configuration of a PIM device in accordance with an embodiment of the present disclosure.

FIG. 33 is a diagram illustrating a configuration of a PIM device 700A in accordance with an embodiment of the present disclosure. Referring to FIG. 33, the PIM device 700A may include components for performing an element-wise multiplication operation among element-wise arithmetic operations. The PIM device 700A may include an MAC unit. The MAC unit may include a plurality of memory banks and an MAC operator MAC_A. The MAC unit may include a first memory bank BK0, a second memory bank BK1, a third memory bank BK2 and a fourth memory bank BK3. However, the number of memory banks included in the MAC unit is not limited thereto, and the number of memory banks included in the MAC unit may be three or more. Each of the first to fourth memory banks BK0, BK1, BK2 and BK3 may include a Y-decoder/I/O circuit YDEC/IO. The first and third memory banks BK0 and BK2 may share one X-decoder XDEC, and the second and fourth memory banks BK1 and BK3 may share one X-decoder XDEC. Each of the first to fourth memory banks BK0, BK1, BK2 and BK3 may be accessed through the X-decoder XDEC and the Y-decoder/I/O circuit YDEC/IO. The first memory bank BK0 may be accessed based on a first bank access control signal CASP<0> and a bank column address signal CA<0:4>. The first bank access control signal CASP<0> and the bank column address signal CA<0:4> may be provided to the Y-decoder/I/O circuit YDEC/IO of the first memory bank BK0. The second memory bank BK1 may be accessed based on a second bank access control signal CASP<1> and the bank column address signal CA<0:4>. The second bank access control signal CASP<1> and the bank column address signal CA<0:4> may be provided to the Y-decoder/I/O circuit YDEC/IO of the second memory bank BK1. The third memory bank BK2 may be accessed based on a third bank access control signal CASP<2> and the bank column address signal CA<0:4>. The third bank access control signal CASP<2> and the bank column address signal CA<0:4> may be provided to the Y-decoder/I/O circuit YDEC/IO of the third memory bank BK2. The fourth memory bank BK3 may be accessed based on a fourth bank access control signal CASP<3> and the bank column address signal CA<0:4>. The fourth bank access control signal CASP<3> and the bank column address signal CA<0:4> may be provided to the Y-decoder/I/O circuit YDEC/IO of the fourth memory bank BK3. In the MAC unit, it may be prescribed that data that corresponds to elements of first and second matrices are stored in the first and second memory banks BK0 and BK1, respectively. In the MAC unit, it may be prescribed that arithmetic data generated through an element-wise arithmetic operation on the first and second matrices (i.e., data that corresponds to elements of a third matrix) are stored in the third memory bank BK2.

The MAC operator MAC_A may be coupled to at least the first to third memory banks BK0, BK1 and BK2. The MAC operator MAC_A may be coupled even to the fourth memory bank BK3. The MAC operator MAC_A may be coupled to the first to third memory banks BK0, BK1 and BK2 through bank I/O lines 791, 792 and 793. The MAC operator MAC_A may be coupled to the first memory bank BK0 through a first bank I/O line 791. The MAC operator MAC_A may be coupled to the second memory bank BK1 through a second bank I/O line 792. The MAC operator MAC_A may be coupled to the third memory bank BK2 through a third bank I/O line 793. The MAC operator MAC_A may receive data, output from the first and second memory banks BK0 and BK1, through the first and second bank I/O lines 791 and 792, and may output arithmetic data, generated by an arithmetic operation, to the third memory bank BK2 through the third bank I/O line 793. The MAC operator MAC_A may perform an arithmetic operation on data that is output from the first and second memory banks BK0 and BK1. In general, the MAC operator MAC_A may perform both multiplication and addition calculations. In order to allow the PIM device 700A to perform an element-wise multiplication operation, the MAC operator MAC_A may perform only a multiplication calculation on data that is output from the first and second memory banks BK0 and BK1.

For example, the bank column address signal CA<0:4> may be a 5-bit signal, and one element may be mapped as 16-bit data. During a single write operation or a single read operation of the PIM device 700A, the PIM device 700A may write 256-bit data to the first and second memory banks BK0 and BK1 or read 256-bit data from the first and second memory banks BK0 and BK1, based on the bank column address signal CA<0:4>. Accordingly, the PIM device 700A may perform an element-wise arithmetic operation on total 16 pairs of matrices. When the PIM device 700A performs an element-wise arithmetic operation on two matrices, 16-bit data that corresponds to one elements of first and second matrices may be written into the first and second memory banks BK0 and BK1 through a single write operation, and the remaining 240-bit data may be written as 0. Among 256 bits that are output from the first and second memory banks BK0 and BK1 during a single read operation, 16-bit data may be data to which one elements of two matrices are respectively mapped, and the remaining 240-bit data may be 0. However, the number of bits of data for mapping one element and the total number of bits of data to be stored in and output from the first and second memory banks BK1 and BK2 or to be stored in and output from the third memory bank BK2 may be variously changed.

The PIM device 700A may include a column control circuit 770A which controls the MAC unit to perform an element-wise arithmetic operation. The column control circuit 770A may generate various control signals so that the MAC unit of the PIM device 700A may perform an element-wise arithmetic operation. The column control circuit 770A may receive a calculation signal EWMUL and a column address signal ADDR_C<0:n> (n is an arbitrary integer), and may generate an arithmetic operation signal MUL_OP, the bank access control signals CASP<0:3> and the bank column address signal CA<0:4> based on the calculation signal EWMUL and the column address signal ADDR_C<0:n>. The column control circuit 770A may enable the first bank access control signal CASP<0> and the second bank access control signal CASP<1> among the bank access control signals CASP<0:3> based on the calculation signal EWMUL. When the calculation signal EWMUL is enabled, the column control circuit 770A may enable the arithmetic operation signal MUL_OP, and may enable the first and second bank access control signals CASP<0> and CASP<1> together. The column control circuit 770A may output at least a part of the column address signal ADDR_C<0:n> as the bank column address signal CA<0:4>. For example, the bank column address signal CA<0:4> may be a 5-bit signal.

The MAC operator MAC_A may receive the arithmetic operation signal MUL_OP from the column control circuit 770A. The MAC operator MAC_A may generate a delayed bank access control signal CASP_M<2> based on the arithmetic operation signal MUL_OP and at least one of the first and second bank access control signals CASP<0> and CASP<1>. The MAC operator MAC_A may generate a delayed column address signal CA_M<0:4> based on the bank column address signal CA<0:4>. The MAC operator MAC_A may provide the delayed bank access control signal CASP_M<2> and the delayed column address signal CA_M<0:4> to the third memory bank BK2. The third memory bank BK2 may be accessed based on the delayed bank access control signal CASP_M<2> and the delayed column address signal CA_M<0:4>. When the PIM device 700A performs an element-wise multiplication operation, the third memory bank BK2 may be accessed based on the delayed bank access control signal CASP_M<2> and the delayed column address signal CA_M<0:4> instead of the third bank access control signal CASP<2> and the bank column address signal CA<0:4>.

The Y-decoder/I/O circuit YDEC/IO of the first memory bank BK0 may generate a first data enable signal DEN<0> based on the first bank access control signal CASP<0>. The Y-decoder/I/O circuit YDEC/IO of the first memory bank BK0 may generate the first data enable signal DEN<0> by delaying the first bank access control signal CASP<0>. The Y-decoder/I/O circuit YDEC/IO of the first memory bank BK0 may provide the first data enable signal DEN<0> to the MAC operator MAC_A. The Y-decoder/I/O circuit YDEC/IO of the second memory bank BK1 may generate a second data enable signal DEN<1> based on the second bank access control signal CASP<1>. The Y-decoder/I/O circuit YDEC/IO of the second memory bank BK1 may generate the second data enable signal DEN<1> by delaying the second bank access control signal CASP<1>. The Y-decoder/I/O circuit YDEC/IO of the second memory bank BK1 may provide the second data enable signal DEN<1> to the MAC operator MAC_A. The MAC operator MAC_A may further receive the first and second data enable signals DEN<0> and DEN<1>. The MAC operator MAC_A may generate the delayed bank access control signal CASP_M<2> based on the arithmetic operation signal MUL_OP and at least one of the first and second data enable signals DEN<0> and DEN<1>. The MAC operator MAC_A may generate the delayed column address signal CA_M<0:4> based on the arithmetic operation signal MUL_OP, at least one of the first and second data enable signals DEN<0> and DEN<1> and the bank column address signal CA<0:4>.

The PIM device 700A may further include a receiving driver (RX) 730, a data I/O circuit (DQ) 740, a command decoder (CMD DECODER) 750, an address latch 760, and a serializer/deserializer (SER/DES) 780. The PIM device 700A may include the same or similar components as or to those of the PIM device 200 illustrated in FIG. 2, and repeated descriptions for the same or similar components will be omitted herein. The receiving driver 730 may receive an external command signal E_CMD and an input address signal I_ADDR from an external device. The receiving driver 730 may provide the external command signal E_CMD to the command decoder 750, and may provide the input address signal I_ADDR to the address latch 760. The data I/O circuit 740 may be coupled to a data I/O line. The PIM device 700A may communicate with the external device through the data I/O circuit 740.

When the external command signal E_CMD has information for performing an element-wise arithmetic operation, the command decoder 750 may generate the calculation signal EWMUL by decoding the external command signal E_CMD. For example, when the external command signal E_CMD has information for performing an element-wise multiplication operation, the command decoder 750 may generate the calculation signal EWMUL by decoding the external command signal E_CMD. When the external command signal E_CMD has information for performing an active operation, the command decoder 750 may generate an active signal ACT by decoding the external command signal E_CMD. When the external command signal E_CMD has information for performing a write operation, the command decoder 750 may generate a write signal WT by decoding the external command signal E_CMD. The active signal ACT may be a signal for enabling a specific row of a memory bank selected among the first to fourth memory banks BK0, BK1, BK2 and BK3. The write signal WT may be a signal for writing data to a memory bank selected among the first to fourth memory banks BK0, BK1, BK2 and BK3. The write signal WT may be provided to the column control circuit 770. The column control circuit 770 may generate the bank access control signals CASP<0:3> and the bank column address signal CA<0:4> based on the write signal WT and the column address signal ADDR_C<0:n>.

The address latch 760 may generate a row address signal ADDR_R and the column address signal ADDR_C<0:n> based on the input address signal I_ADDR. The row address signal ADDR_R may be an address signal for selecting a specific row of a selected memory bank during the active operation. The column address signal ADDR_C<0:n> may be an address signal for selecting a specific column that is coupled to an enabled row. The X-decoders XDEC may receive the active signal ACT and the row address signal ADDR_R, and may enable specific rows of the first to fourth memory banks BK0, BK1, BK2 and BK3, based on the active signal ACT and the row address signal ADDR_R.

The serializer/deserializer 780 may be coupled to a global I/O line 790. The global I/O line 790 may be coupled to the first to fourth memory banks BK0, BK1, BK2, and BK3 and the MAC operator MAC_A. The serializer/deserializer 780 may receive data that is output from at least one of the first to fourth memory banks BK0, BK1, BK2 and BK3 and the MAC operator MAC_A and transmitted through the global I/O line 790, may generate data DA by serializing the received data, and may output the data DA to the external device through the data I/O circuit 740. The serializer/deserializer 780 may deserialize data DA received from the external device through the data I/O circuit 740, and may output the deserialized data through the global I/O line 790. The deserialized data may be transmitted to at least one of the first to fourth memory banks BK0, BK1, BK2 and BK3 and the MAC operator MAC_A through the global input/output line 790.

Figure 34:
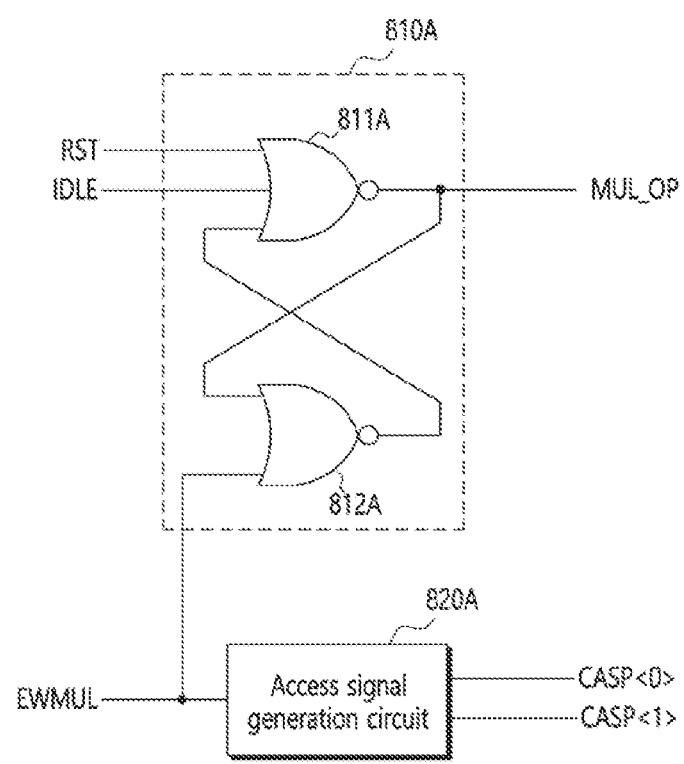
FIG. 34 is a diagram illustrating at least a part of components of a column control circuit illustrated in FIG. 33.

FIG. 34 is a diagram illustrating at least a part of components of the column control circuit 770A illustrated in FIG. 33. Referring to FIG. 34, the column control circuit 770A may include an arithmetic operation signal generation circuit 810A and an access signal generation circuit 820A. The arithmetic operation signal generation circuit 810A may receive the calculation signal EWMUL, and may generate the arithmetic operation signal MUL_OP based on the calculation signal EWMUL. The arithmetic operation signal generation circuit 810A may further receive a reset signal RST and an idle signal IDLE. The reset signal RST may be a signal which is enabled to initialize internal circuits of the PIM device 700A when the PIM device 700A is powered up or booted up. The idle signal IDLE may be a signal which is enabled when the PIM device 700A is in an idle state in which the PIM device 700A does not perform any operation. The arithmetic operation signal generation circuit 810A may generate the arithmetic operation signal MUL_OP based on the calculation signal EWMUL, the reset signal RST and the idle signal IDLE. The arithmetic operation signal generation circuit 810A may enable the arithmetic operation signal MUL_OP when the calculation signal EWMUL is enabled in a state in which the reset signal RST and the idle signal IDLE are disabled. The arithmetic operation signal generation circuit 810A may disable the arithmetic operation signal MUL_OP when one of the reset signal RST and the idle signal IDLE is enabled in a state in which the arithmetic operation signal MUL_OP is enabled.

The arithmetic operation signal generation circuit 810A may be configured by a NOR type RS latch. The arithmetic operation signal generation circuit 810A may include a first NOR gate 811A and a second NOR gate 812A. A first input terminal of the first NOR gate 811A may receive the reset signal RST, a second input terminal of the first NOR gate 811A may receive the idle signal IDLE, and a third input terminal of the first NOR gate 811A may receive a signal output from an output terminal of the second NOR gate 812A. The arithmetic operation signal MUL_OP may be output through an output terminal of the first NOR gate 811A. A first input terminal of the second NOR gate 812A may receive the arithmetic operation signal MUL_OP, and a second input terminal of the second NOR gate 812A may receive the calculation signal EWMUL. The output terminal of the second NOR gate 812A may be coupled to the third input terminal of the first NOR gate 811A. When the calculation signal EWMUL is enabled to a logic high level in a state in which the reset signal RST and the idle signal IDLE are disabled to logic low levels, a signal with a logic low level may be input to the third input terminal of the first NOR gate 811A, and thus, the arithmetic operation signal MUL_OP may be enabled to a logic high level. In a state in which the arithmetic operation signal MUL_OP is enabled to a logic high level, when at least one of the reset signal RST and the idle signal IDLE is enabled to a logic high level, the arithmetic operation signal MUL_OP may be disabled to a logic low level.

The access signal generation circuit 820A may receive the calculation signal EWMUL, and may generate the first and second bank access control signals CASP<0> and CASP<1> based on the calculation signal EWMUL. When the calculation signal EWMUL is enabled, the access signal generation circuit 820A may enable both the first and second bank access control signals CASP<0> and CASP<1>. By simultaneously enabling the first and second bank access control signals CASP<0> and CASP<1>, the access signal generation circuit 820A may cause the first and second memory banks BK0 and BK1 to be simultaneously accessed.

Figure 35:
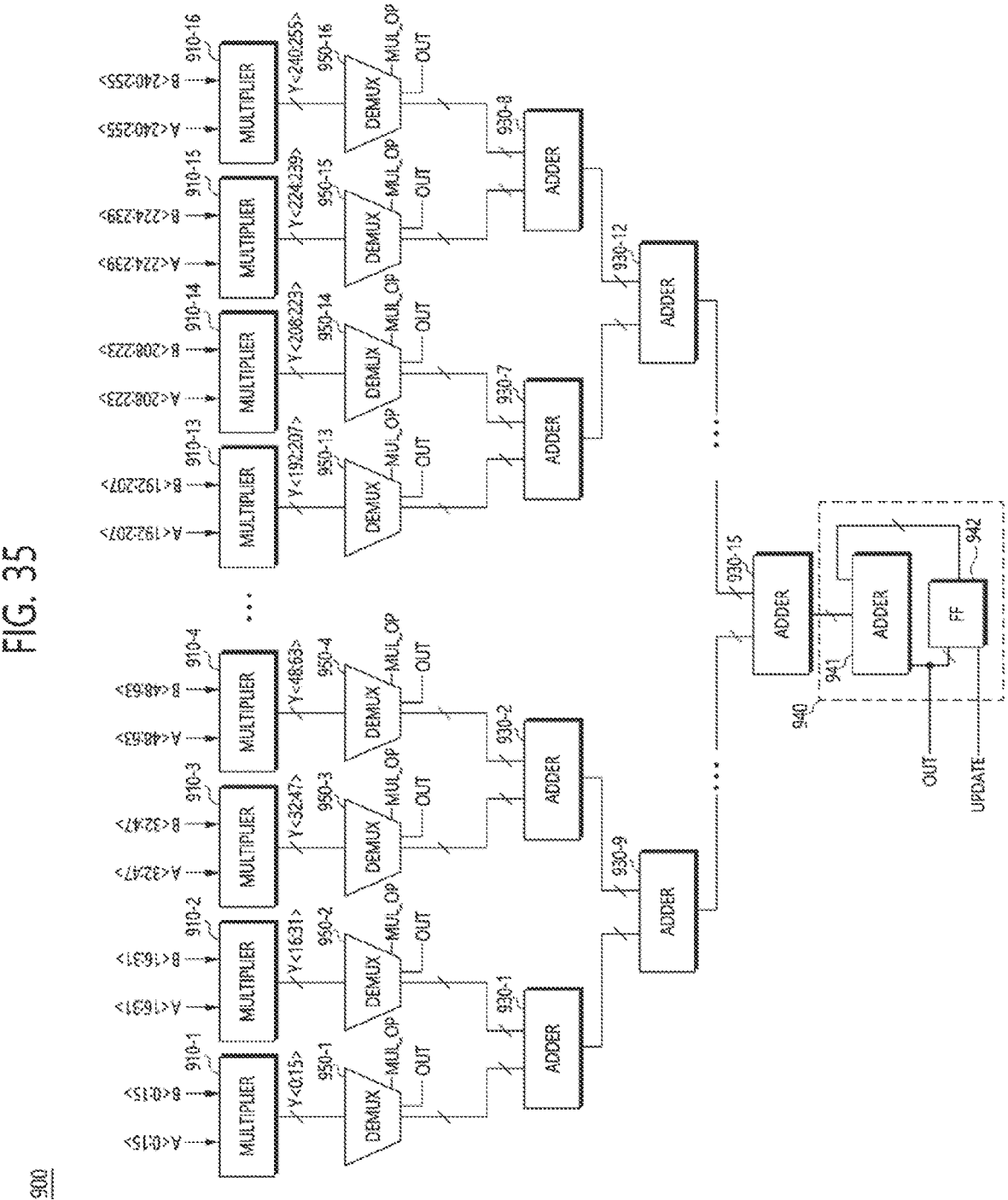
FIG. 35 is a diagram illustrating a configuration of an arithmetic circuit among components of an MAC operator illustrated in FIG. 33.

FIG. 35 is a diagram illustrating a configuration of an arithmetic circuit 900 among components of the MAC operator MAC_A illustrated in FIG. 33. Referring to FIG. 35, the arithmetic circuit 900 may perform a multiplication-accumulative addition calculation on inputted data, and may output a multiplication-accumulative addition calculation result. The arithmetic circuit 900 may include a plurality of multipliers, a plurality of adders and an accumulator. Each of the plurality of multipliers may receive allocated data, and the number of the plurality of multipliers may vary depending on the number of bits of the allocated data. For example, the MAC operator MAC_A may include 16 multipliers to each perform an arithmetic operation on 16 elements. A first multiplier 910-1 may receive first to 16^th bit data A<0:15> that is output from the first memory bank BK0 and first to 16^th bit data B<0:15> that is output from the second memory bank BK1, and may output 16-bit arithmetic data Y<0:15> by multiplying the first to 16^th bit data A<0:15> that is output from the first memory bank BK0 and the first to 16^th bit data B<0:15> that is output from the second memory bank BK1. A second multiplier 910-2 may receive 17^th to 32^rd bit data A<16:31> that is output from the first memory bank BK0 and 17^th to 32^rd bit data B<16:31> that is output from the second memory bank BK1, and may output arithmetic data Y<16:31> by multiplying the 17^th to 32^rd bit data A<16:31> that is output from the first memory bank BK0 and the 17^th to 32^rd bit data B<16:31> that is output from the second memory bank BK1. A third multiplier 910-3 may receive 33^rd to 48^th bit data A<32:47> that is output from the first memory bank BK0 and 33^rd to 48^th bit data B<32:47> that is output from the second memory bank BK1, and may output arithmetic data Y<32:47> by multiplying the 33^rd to 48^th bit data A<32:47> that is output from the first memory bank BK0 and the 33^rd to 48^th bit data B<32:47> that is output from the second memory bank BK1. A fourth multiplier 910-4 may receive 49^th to 64^th bit data A<48:63> that is output from the first memory bank BK0 and 49^th to 64^th bit data B<48:63> that is output from the second memory bank BK1, and may output arithmetic data Y<48:63> by multiplying the 49^th to 64^th bit data A<48:63> that is output from the first memory bank BK0 and the 49^th to 64^th bit data B<48:63> that is output from the second memory bank BK1. A thirteenth multiplier 910-13 may receive 193^rd to 208^th bit data A<192:207> that is output from the first memory bank BK0 and 193^rd to 208^th bit data B<192:207> that is output from the second memory bank BK1, and may output arithmetic data Y<192:207> by multiplying the 193^rd to 208^th bit data A<192:207> that is output from the first memory bank BK0 and the 193^rd to 208^th bit data B<192:207> that is output from the second memory bank BK1. A fourteenth multiplier 910-14 may receive 209^th to 224^th bit data A<208:223> that is output from the first memory bank BK0 and 209^th to 224^th bit data B<208:223> that is output from the second memory bank BK1, and may output arithmetic data Y<208:223> by multiplying the 209^th to 224^th bit data A<208:223> that is output from the first memory bank BK0 and the 209^th to 224^th bit data B<208:223> that is output from the second memory bank BK1. A fifteenth multiplier 910-15 may receive 225^th to 240^th bit data A<224:239> that is output from the first memory bank BK0 and 225^th to 240^th bit data B<224:239> that is output from the second memory bank BK1, and may output arithmetic data Y<224:239> by multiplying the 225^th to 240^th bit data A<224:239> that is output from the first memory bank BK0 and the 225^th to 240^th bit data B<224:239> that is output from the second memory bank BK1. A sixteenth multiplier 910-16 may receive 241^st to 256^th bit data A<240:255> that is output from the first memory bank BK0 and 241^st to 256^th bit data B<240:255> that is output from the second memory bank BK1, and may output arithmetic data Y<240:255> by multiplying the 241^st to 256^th bit data A<240:255> that is output from the first memory bank BK0 and the 241^st to 256^th bit data B<240:255> that is output from the second memory bank BK1.

The MAC operator MAC_A may include 15 adders. A first adder 930-1 may receive data that is output from the first and second multipliers 910-1 and 910-2, and may add the data that is output from the first and second multipliers 910-1 and 910-2. A second adder 930-2 may receive data that is output from the third and fourth multipliers 910-3 and 910-4, and may add the data that is output from the third and fourth multipliers 910-3 and 910-4. A seventh adder 930-7 may receive data that is output from the thirteenth and fourteenth multipliers 910-13 and 910-14, and may add the data that is output from the thirteenth and fourteenth multipliers 910-13 and 910-14. An eighth adder 930-8 may receive data that is output from the fifteenth and sixteenth multipliers 910-15 and 910-16, and may add the data that is output from the fifteenth and sixteenth multipliers 910-15 and 910-16. The first to eighth adders 930-1, 930-2, . . . , 930-7 and 930-8 may be floating point adders. A ninth adder 930-9 may receive data that is output from the first and second adders 930-1 and 930-2, and may add the data that is output from the first and second adders 930-1 and 930-2. A twelfth adder 930-12 may receive data that is output from the seventh and eighth adders 930-7 and 930-8, and may add the data that is output from the seventh and eighth adders 930-7 and 930-8. A fifteenth adder 930-15 may receive data that is output from thirteenth and fourteenth adders (not illustrated), and may add the data that is output from the thirteenth and fourteenth adders.

An accumulator 940 may receive and store data that is output from the fifteenth adder 930-15. The accumulator 940 may add data, newly output from the fifteenth adder 930-15, to a stored data value each time an update signal UPDATE is enabled, and may store added data again. The accumulator 940 may include one adder 941 and an updater 942. The adder 941 may receive data that is output from the fifteenth adder 930-15, and may store the received data. The adder 941 may output stored data to the updater 942. The adder 941 may receive data that is output from the updater 942, and may add the data that is output from the updater 942 and the data that is output from the fifteenth adder 930-15. The updater 942 may be implemented by a flip-flop FF. An input terminal of the flip-flop FF may receive an output of the adder 941, and a clock terminal of the flip-flop FF may receive the update signal UPDATE. An output terminal of the flip-flop FF may be coupled to the adder 941, and the adder 941 may receive data that is output through the output terminal of the flip-flop FF. The input terminal of the flip-flop FF may be coupled to an output terminal OUT of the arithmetic circuit 900.

When the PIM device 700A performs the element-wise multiplication operation, the arithmetic circuit 900 may perform only a multiplication calculation, and may output only a multiplication calculation result. The arithmetic circuit 900 may further include 16 demultiplexers. A first demultiplexer 950-1 may be coupled between the first multiplier 910-1 and the first adder 930-1. An input terminal of the first demultiplexer 950-1 may receive arithmetic data Y<0:15> that is output from the first multiplier 910-1, a first output terminal of the first demultiplexer 950-1 may be coupled to the first adder 930-1, and a second output terminal of the first demultiplexer 950-1 may be coupled to the output terminal OUT of the arithmetic circuit 900. The first demultiplexer 950-1 may receive the arithmetic operation signal MUL_OP as a control signal. When the arithmetic operation signal MUL_OP is enabled, the first demultiplexer 950-1 may output the arithmetic data Y<0:15>, output from the first multiplier 910-1, to the output terminal OUT of the arithmetic circuit 900. When the arithmetic operation signal MUL_OP is disabled, the first demultiplexer 950-1 may output the arithmetic data Y<0:15>, output from the first multiplier 910-1, to the first adder 930-1. A second demultiplexer 950-2 may be coupled between the second multiplier 910-2 and the second adder 930-2. An input terminal of the second demultiplexer 950-2 may receive arithmetic data Y<16:31> that is output from the second multiplier 910-2, a first output terminal of the second demultiplexer 950-2 may be coupled to the first adder 930-1, and a second output terminal of the second demultiplexer 950-2 may be coupled to the output terminal OUT of the arithmetic circuit 900. The second demultiplexer 950-2 may receive the arithmetic operation signal MUL_OP as a control signal. When the arithmetic operation signal MUL_OP is enabled, the second demultiplexer 950-2 may output the arithmetic data Y<16:31>, output from the second multiplier 910-2, to the output terminal OUT of the arithmetic circuit 900. When the arithmetic operation signal MUL_OP is disabled, the second demultiplexer 950-2 may output the arithmetic data Y<16:31>, output from the second multiplier 910-2, to the first adder 930-1. The third to sixteenth demultiplexers 950-3, 950-4, . . . , 950-13, 950-14, 950-15 and 950-16 may be coupled between the third to sixteenth multipliers 910-3, 910-4, . . . , 910-13, 910-14, 910-15 and 910-16 and the third to sixteenth adders 930-3, 930-4, . . . , 930-13, 930-14, 930-15 and 930-16, respectively. When the arithmetic operation signal MUL_OP is enabled, the third to sixteenth demultiplexers 950-3, 950-4, . . . , 950-13, 950-14, 950-15 and 950-16 may output arithmetic data, output from the third to sixteenth multipliers 910-3, 910-4, . . . , 910-13, 910-14, 910-15 and 910-16, respectively, to the output terminal OUT of the arithmetic circuit 900. When the arithmetic operation signal MUL_OP is disabled, the third to sixteenth demultiplexers 950-3, 950-4, . . . , 950-13, 950-14, 950-15 and 950-16 may output arithmetic data, output from the third to sixteenth multipliers 910-3, 910-4, . . . , 910-13, 910-14, 910-15 and 910-16, to the third to sixteenth adders 930-3, 930-4, . . . , 930-13, 930-14, 930-15 and 930-16, respectively. Therefore, when the arithmetic operation signal MUL_OP is enabled, the first to sixteenth demultiplexers 950-1, 950-2, 950-3, 950-4, . . . , 950-13, 950-14, 950-15 and 950-16 may directly output arithmetic data, output from the first to sixteenth multipliers 910-1, 910-2, 910-3, 910-4, . . . , 910-13, 910-14, 910-15 and 910-16, to the output terminal OUT of the arithmetic circuit 900, so that the arithmetic circuit 900 is able to perform only a multiplication calculation. In an embodiment, the arithmetic circuit 900 might not include the demultiplexers, and the plurality of adders may be modified to receive the arithmetic operation signal MUL_OP. The plurality of adders may be modified to, when the arithmetic operation signal MUL_OP is enabled, activate bypass paths and output arithmetic data, output from the plurality of multipliers, to the output terminal OUT of the arithmetic circuit 900.

Figure 36A:
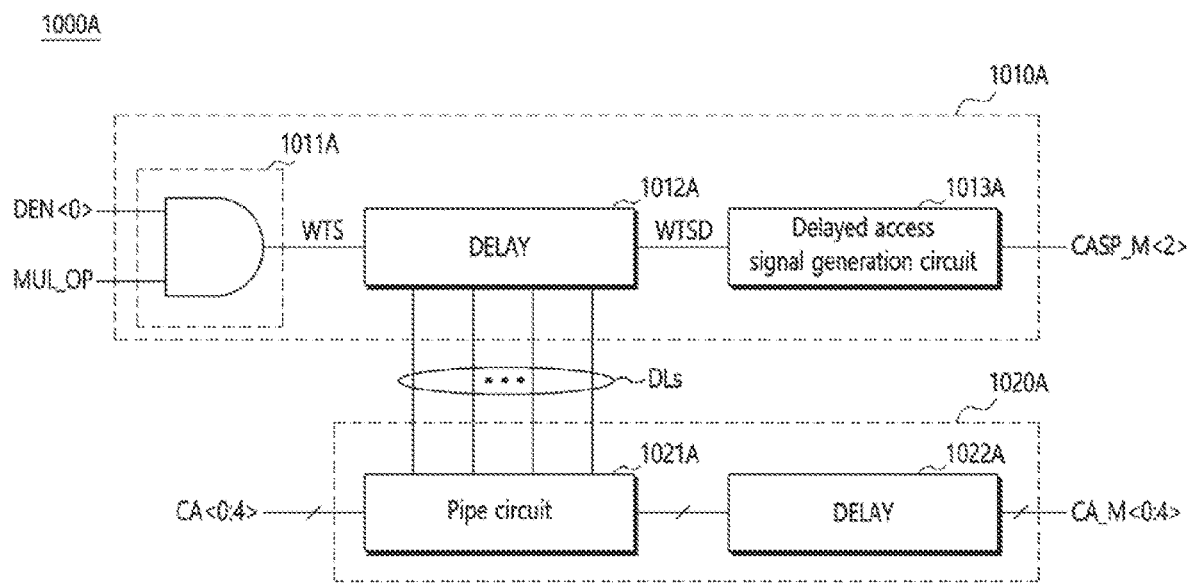
FIGS. 36A and 36B are diagrams illustrating other parts among the components of the MAC operator configured in FIG. 33.
Figure 36B:
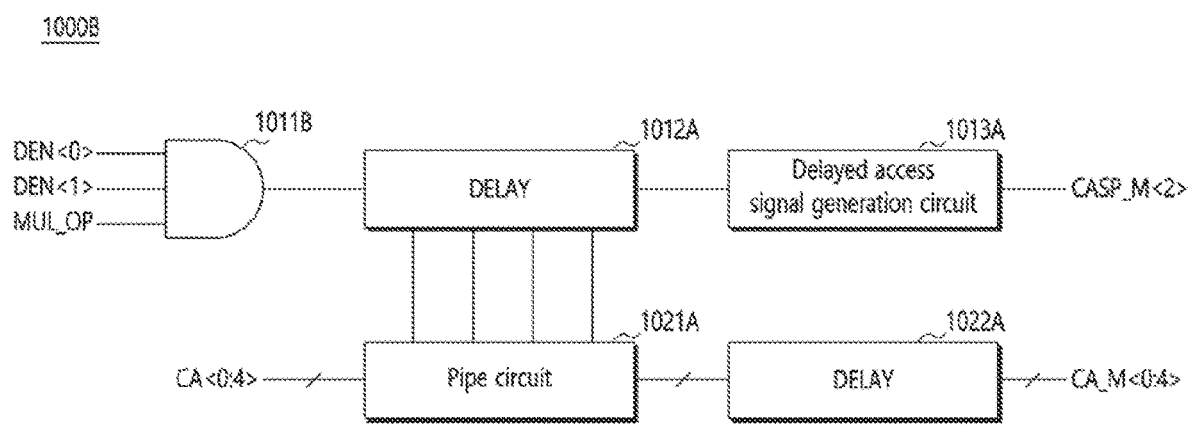

FIGS. 36A and 36B are diagrams illustrating other parts among the components of the MAC operator MAC_A configured in FIG. 33. Referring to FIG. 36A, the MAC operator MAC_A may include a write control circuit 1000A. The write control circuit 1000A may generate control signals for writing arithmetic data, generated through an arithmetic operation of the MAC operator MAC_A, to the third memory bank BK2. The write control circuit 1000A may generate the delayed bank access control signal CASP_M<2> and the delayed column address signal CA_M<0:4> based on the arithmetic operation signal MUL_OP, the first data enable signal DEN<0>, and the bank column address signal CA<0:4>.

The write control circuit 1000A may include an access control circuit 1010A and an address control circuit 1020A. The access control circuit 1010A may generate a plurality of delay signals DLs and the delayed bank access control signal CASP_M<2> based on the arithmetic operation signal MUL_OP and the first data enable signal DEN<0>. The access control circuit 1010A may generate a write start signal WTS based on the arithmetic operation signal MUL_OP and the first data enable signal DEN<0>, and may generate a delayed write start signal WTSD and the plurality of delay signals DLs by delaying the write start signal WTS. The access control circuit 1010A may generate the plurality of delay signals DLs by sequentially delaying the write start signal WTS by a predetermined time when the write start signal WTS is generated. The predetermined time may be a time during which the MAC operator MAC_A performs an arithmetic operation, and may correspond to a time during which the MAC operator MAC_A performs a multiplication calculation. Also, the predetermined time may correspond to a time from after the arithmetic circuit 900 of the MAC operator MAC_A receives data that is output from the first and second memory banks BK0 and BK1 to till the arithmetic circuit 900 of the MAC operator MAC_A outputs arithmetic data to the third memory bank BK2. The access control circuit 1010A may generate the delayed bank access control signal CASP_M<2> each time the delayed write start signal WTSD is generated.

The access control circuit 1010A may include a write start signal generation circuit 1011A, a first delay circuit (DELAY) 1012A and a delayed access signal generation circuit 1013A. The write start signal generation circuit 1011A may generate the write start signal WTS by receiving the first data enable signal DEN<0> and the arithmetic operation signal MUL_OP. The write start signal generation circuit 1011A may enable the write start signal WTS each time the first data enable signal DEN<0> is enabled in a state in which the arithmetic operation signal MUL_OP is enabled. The write start signal generation circuit 1011A may include an AND gate which outputs the write start signal WTS by AND-gating the first data enable signal DEN<0> and the arithmetic operation signal MUL_OP. In an embodiment, the write start signal generation circuit 1011A may be modified to generate the write start signal WTS by receiving the second data enable signal DEN<1> instead of the first data enable signal DEN<0>. The first delay circuit 1012A may generate the delayed write start signal WTSD by delaying the write start signal WTS by the predetermined time. The first delay circuit 1012A may generate the plurality of delay signals DLs by delaying the write start signal WTS by the predetermined time. For example, the first delay circuit 1012A may generate a first delay signal DL by delaying the write start signal WTS, input first, by the predetermined time, and may generate a second delay signal DL by delaying the first delay signal DL by the predetermined time. The delayed access signal generation circuit 1013A may receive the delayed write start signal WTSD, and may generate the delayed bank access control signal CASP_M<2> based on the delayed write start signal WTSD. The delayed access signal generation circuit 1013A may be implemented by a pulse generator.

The address control circuit 1020A may generate the delayed column address signal CA_M<0:4> by delaying the bank column address signal CA<0:4>. The address control circuit 1020A may receive the bank column address signal CA<0:4> and the plurality of delay signals DLs, and may generate the delayed column address signal CA_M<0:4> based on the bank column address signal CA<0:4> and the plurality of delay signals DLs. The address control circuit 1020A may sequentially store the bank column address signal CA<0:4> each time the bank column address signal CA<0:4> is input. The address control circuit 1020A may sequentially output the stored bank column address signal CA<0:4> based on the plurality of delay signals DLs. The address control circuit 1020A may generate the delayed column address signal CA_M<0:4> by delaying the bank column address signal CA<0:4> sequentially output.

The address control circuit 1020A may include a pipe circuit 1021A and a second delay circuit (DELAY) 1022A. The pipe circuit 1021A may be a FIFO (first-in first-out) circuit, may receive the bank column address signal CA<0:4>, and may store the bank column address signal CA<0:4>. The pipe circuit 1021A may sequentially store the bank column address signal CA<0:4> each time the bank column address signal CA<0:4> is input. The pipe circuit 1021A may receive the plurality of delay signals DLs. The pipe circuit 1021A may sequentially output the bank column address signal CA<0:4> sequentially stored, based on the plurality of delay signals DLs. For example, the pipe circuit 1021A may output the bank column address signal CA<0:4> stored first, when the first delay signal DL is enabled, and may output the bank column address signal CA<0:4> stored second, when the second delay signal DL is enabled. The second delay circuit 1022A may receive the output of the pipe circuit 1021A, and may generate the delayed column address signal CA_M<0:4> by delaying the output of the pipe circuit 1021A. A delay time of the second delay circuit 1022A may correspond to a time during which the delayed bank access control signal CASP_M<2> is generated from the delayed write start signal WTSD by the delayed access signal generation circuit 1013A. The second delay circuit 1022A may synchronize a point of time at which the delayed column address signal CA_M<0:4> is output and a point of time at which the delayed bank access control signal CASP_M<2> is output.

Referring to FIG. 36B, the MAC operator MAC_A may include a write control circuit 1000B. The write control circuit 1000B may include a write start signal generation circuit 1011B, and may have the same configuration as the write control circuit 1000A illustrated in FIG. 36A except the write start signal generation circuit 1011B. Repeated descriptions for the same components will be omitted herein. The write start signal generation circuit 1011B may generate a write start signal WTS based on the first data enable signal DEN<0>, the second data enable signal DEN<1> and the arithmetic operation signal MUL_OP. The write start signal generation circuit 1011B may enable the write start signal WTS when the first and second data enable signals DEN<0> and DEN<1> are enabled in a state in which the arithmetic operation signal MUL_OP is enabled. Since the first and second memory banks BK0 and BK1 are simultaneously accessed when the PIM device 700A performs an element-wise arithmetic operation, the first and second data enable signals DEN<0> and DEN <1> may be simultaneously enabled.

Figure 37A:
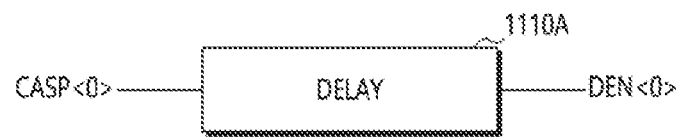
FIG. 37A is a diagram illustrating a part among components of a Y-decoder/I/O circuit of a first memory bank of FIG. 33.

FIG. 37A is a diagram illustrating a part among components of the Y-decoder/I/O circuit YDEC/IO of the first memory bank BK0 of FIG. 33. Referring to FIG. 37A, the Y-decoder/I/O circuit YDEC/IO of the first memory bank BK0 may include a delay circuit 1110A. The delay circuit 1110A may receive the first bank access control signal CASP<0>, and may generate the first data enable signal DEN<0> by delaying the first bank access control signal CASP<0>. A delay time of the delay circuit 1110A may correspond to an amount of time between the first bank access control signal CASP<0> being generated and data being output from the first memory bank BK0.

Figure 37B:
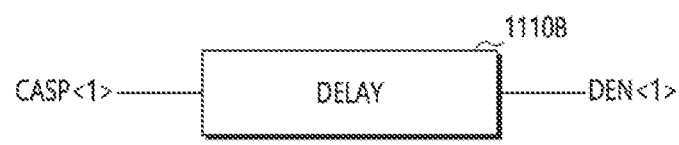
FIG. 37B is a diagram illustrating a part among components of a Y-decoder/I/O circuit of a second memory bank of FIG. 33.

FIG. 37B is a diagram illustrating a part among components of the Y-decoder/I/O circuit YDEC/IO of the second memory bank BK1 of FIG. 33. Referring to FIG. 37B, the Y-decoder/I/O circuit YDEC/IO of the second memory bank BK1 may include a delay circuit 1110B. The delay circuit 1110B may receive the second bank access control signal CASP<1>, and may generate the second data enable signal DEN<1> by delaying the second bank access control signal CASP<1>. A delay time of the delay circuit 1110B may correspond to an amount of time between the second bank access control signal CASP<1> being generated and data being output from the second memory bank BK1.

FIG. 38 is a diagram illustrating a part among components of the Y-decoder/I/O circuit YDEC/IO of the third memory bank BK2 of FIG. 33. Referring to FIG. 38, the Y-decoder/I/O circuit YDEC/IO of the third memory bank BK2 may include a first selection circuit 1210A and a second selection circuit 1220A. The first selection circuit 1210A may receive the arithmetic operation signal MUL_OP, the bank column address signal CA<0:4> and the delayed column address signal CA_M<0:4>, and may output an internal column address signal ICA<0:4>. The first selection circuit 1210A may output one of the bank column address signal CA<0:4> and the delayed column address signal CA_M<0:4> as the internal column address signal ICA<0:4> based on the arithmetic operation signal MUL_OP. When the arithmetic operation signal MUL_OP is disabled to a logic low level, the first selection circuit 1210A may output the bank column address signal CA<0:4> as the internal column address signal ICA<0:4>. When the arithmetic operation signal MUL_OP is enabled to a logic high level, the first selection circuit 1210A may output the delayed column address signal CA_M<0:4> as the internal column address signal ICA<0:4>. The third memory bank BK2 may be accessed based on the internal column address signal ICA<0:4>.

The second selection circuit 1220A may receive the arithmetic operation signal MUL_OP, the third bank access control signal CASP<2> and the delayed bank access control signal CASP_M<2>, and may output an internal bank access control signal ICASP<2>. The second selection circuit 1220A may output one of the third bank access control signal CASP<2> and the delayed bank access control signal CASP_M<2> as the internal bank access control signal ICASP<2> based on the arithmetic operation signal MUL_OP. When the arithmetic operation signal MUL_OP is disabled to a logic low level, the second selection circuit 1220A may output the third bank access control signal CASP<2> as the internal bank access control signal ICASP<2>. When the arithmetic operation signal MUL_OP is enabled to a logic high level, the second selection circuit 1220A may output the delayed bank access control signal CASP_M<2> as the internal bank access control signal ICASP<2>. The third memory bank BK2 may be accessed based on the internal bank access control signal ICASP<2>.

Figure 39:
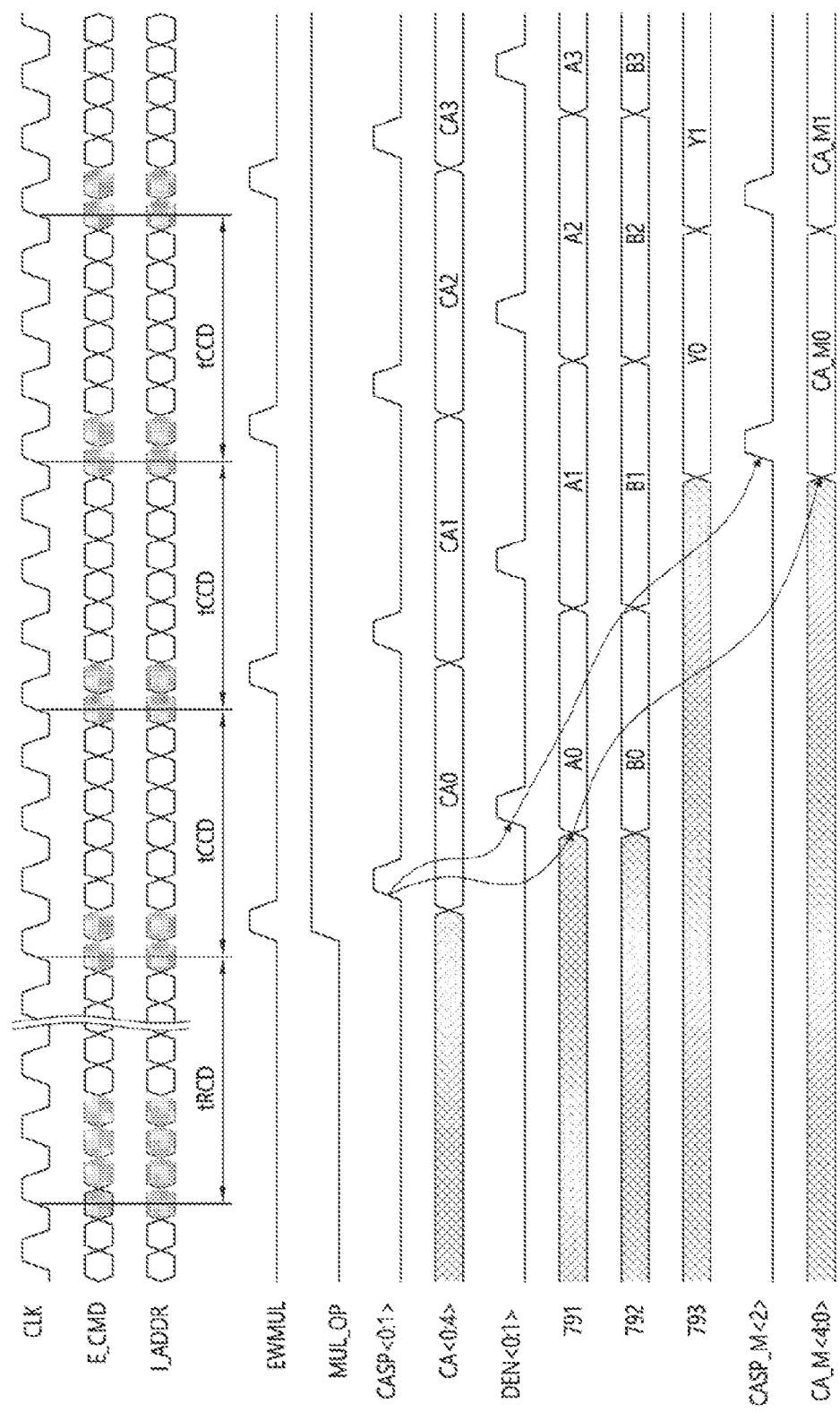
FIG. 39 is a timing diagram illustrating the operation method of the PIM device in accordance with the embodiment of the present disclosure.

FIG. 39 is a timing diagram illustrating the operation method of the PIM device 700A in accordance with the embodiment of the present disclosure. The operation method of the PIM device 700A in accordance with the embodiment of the present disclosure will be described below with reference to FIGS. 33 to 39. The PIM device 700A may store elements of first and second matrices in the first and second memory banks BK0 and BK1, respectively, to perform an element-wise arithmetic operation. When all the elements of the first and second matrices are stored in the first and second memory banks BK0 and BK1, the PIM device 700A may generate the active signal ACT and the row address signal ADDR_R based on the external command signal E_CMD and the input address signal I_ADDR for performing an active operation. The external command signal E_CMD and the input address signal I_ADDR may be input to the PIM device 700A in synchronization with a clock signal CLK. Rows with the same order among the plurality of rows of the first to third memory banks BK0, BK1 and BK2 may be enabled based on the active signal ACT and the row address signal ADDR_R.

When a time corresponding to tRCD elapses after the first to third memory banks BK0, BK1 and BK2 are activated and the external command signal E_CMD instructing the active operation is received, a first external command signal E_CMD and a first input address signal I_ADDR for performing the element-wise arithmetic operation may be input to the PIM device 700A. The tRCD may be defined by a time interval during which a column command signal is input after a row command signal is input. The external command signal E_CMD for performing the active operation may be included in the row command signal, and the external command signal E_CMD for performing the element-wise arithmetic operation may be included in the column command signal. The command decoder 750 may generate a first calculation signal EWMUL based on the first external command signal E_CMD, and the address latch 760 may output the first input address signal I_ADDR as a first column address signal ADDR_C<0:n>. The column control circuit 770A may enable the arithmetic operation signal MUL_OP based on the calculation signal EWMUL, may enable the first and second bank access signals CASP<0:1>, and may provide at least a part of the first column address signal ADDR_C<0:n> as a first bank column address signal CA<0:4> (CA0). A column that is coupled to an enabled row of the first memory bank BK0 may be accessed based on the first first bank access control signal CASP<0> and the first bank column address signal CA0. For example, the bank column address signal CA<0:4> may include 5 bits, and 16 columns may be accessed based on the bank column address signal CA<0:4>. First to sixteenth columns may be accessed based on the first bank column address signal CA0. At the same time, a column that is coupled to an enabled row of the second memory bank BK1 may be accessed based on the first second bank access control signal CASP<1> and the first bank column address signal CA0. Accordingly, 16-bit data A0 corresponding to a first element of the first matrix may be read from the first memory bank BK0, and 16-bit data B0 corresponding to a first element of the second matrix may be read from the second memory bank BK1. The first and second memory banks BK0 and BK1 may enable the first and second data enable signals DEN<0:1>, respectively, while outputting the data A0 and B0 corresponding to the first elements, respectively, of the first and second matrices. The data A0 and B0 corresponding to the first elements of the first and second matrices may be provided to the MAC operator MAC_A through the first and second bank I/O lines 791 and 792.

When a time corresponding to tCCD elapses, a second external command signal E_CMD and a second input address signal I_ADDR for performing the element-wise arithmetic operation may be received in the PIM device 700A. The tCCD may be defined by a time interval during which another column command signal is input after one column command signal is input. The command decoder 750 may generate a second calculation signal EWMUL based on the second external command signal E_CMD, and the address latch 760 may output the second input address signal I_ADDR as a second column address signal ADDR_C<0:n>. The column control circuit 770A may second enable the first and second bank access control signals CASP<0:1> based on the second calculation signal EWMUL, and may provide at least a part of the second column address signal ADDR_C<0:n> as a second bank column address signal CA<0:4> (CA1). Columns that are coupled to the enabled rows of the first and second memory banks BK0 and BK1 may be accessed based on the first and second bank access control signals CASP<0:1> and the second bank column address signal CA1. For example, seventeenth to 32^nd columns may be accessed based on the second bank column address signal CA1. Accordingly, 16-bit data A1 corresponding to a second element of the first matrix may be read from the first memory bank BK0, and 16-bit data B1 corresponding to a second element of the second matrix may be read from the second memory bank BK1. The first and second memory banks BK0 and BK1 may enable the first and second data enable signals DEN<0:1>, respectively, while outputting the data A1 and B1 corresponding to the second elements of the first and second matrices. The data A1 and B1 corresponding to the second elements of the first and second matrices may be provided to the MAC operator MAC_A through the first and second bank I/O lines 791 and 792.

When a time corresponding to tCCD elapses, a third external command signal E_CMD and a third input address signal I_ADDR for performing the element-wise arithmetic operation may be received in the PIM device 700A. The command decoder 750 may generate a third calculation signal EWMUL based on the third external command signal E_CMD, and the address latch 760 may output the third input address signal I_ADDR as a third column address signal ADDR_C<0:n>. The column control circuit 770A may third enable the first and second bank access control signals CASP<0:1> based on the third calculation signal EWMUL, and may provide at least a part of the third column address signal ADDR_C<0:n> as a third bank column address signal CA<0:4> (CA2). Columns that are coupled to the enabled rows of the first and second memory banks BK0 and BK1 may be accessed based on the first and second bank access control signals CASP<0:1> and the third bank column address signal CA2. For example, 33^rd to 48^th columns may be accessed based on the third bank column address signal CA2. Accordingly, 16-bit data A2 corresponding to a third element of the first matrix may be read from the first memory bank BK0, and 16-bit data B2 corresponding to a third element of the second matrix may be read from the second memory bank BK1. The first and second memory banks BK0 and BK1 may enable the first and second data enable signals DEN<0:1>, respectively, while outputting the data A2 and B2 corresponding to the third elements of the first and second matrices. The data A2 and B2 corresponding to the third elements of the first and second matrices may be provided to the MAC operator MAC_A through the first and second bank I/O lines 791 and 792.

When a time corresponding to tCCD elapses, a fourth external command signal E_CMD and a fourth input address signal I_ADDR for performing the element-wise arithmetic operation may be received in the PIM device 700A. The command decoder 750 may generate a fourth calculation signal EWMUL based on the fourth external command signal E_CMD, and the address latch 760 may output the fourth input address signal I_ADDR as a fourth column address signal ADDR_C<0:n>. The column control circuit 770A may fourth enable the first and second bank access control signals CASP<0:1> based on the fourth calculation signal EWMUL, and may provide at least a part of the fourth column address signal ADDR_C<0:n> as a fourth bank column address signal CA<0:4> (CA3). Columns that are coupled to the enabled rows of the first and second memory banks BK0 and BK1 may be accessed based on the first and second bank access control signals CASP<0:1> and the fourth bank column address signal CA3. For example, 49^th to 64^th columns may be accessed based on the fourth bank column address signal CA3. Accordingly, 16-bit data A3 corresponding to a fourth element of the first matrix may be read from the first memory bank BK0, and 16-bit data B3 corresponding to a fourth element of the second matrix may be read from the second memory bank BK1. The first and second memory banks BK0 and BK1 may enable the first and second data enable signals DEN<0:1>, respectively, while outputting the data A3 and B3 corresponding to the fourth elements of the first and second matrices. The data A3 and B3 corresponding to the fourth elements of the first and second matrices may be provided to the MAC operator MAC_A through the first and second bank I/O lines 791 and 792.

The MAC operator MAC_A may receive data, read from the first and second memory banks BK0 and BK1, through the first and second bank I/O lines 791 and 792, and may perform a calculation on the received data. The MAC operator MAC_A may receive the 16-bit data A0 and B0, corresponding to the first elements of the first and second matrices, from the first and second memory banks BK0 and BK1, respectively. The arithmetic circuit 900 of the MAC operator MAC_A may generate a first arithmetic data Y0 by performing only a multiplication calculation on the 16-bit data A0 and B0, corresponding to the first elements of the first and second matrices, based on the arithmetic operation signal MUL_OP, and may output the first arithmetic data Y0 to the third memory bank BK2 through the third bank I/O line 793. When the predetermined time elapses after the first and second data enable signals DEN<0:1> are first received, the MAC operator MAC_A may enable the delayed bank access control signal CASP_M<2>. The MAC operator MAC_A may sequentially store the first to fourth bank column address signals CA0, CA1, CA2 and CA3, and may output the first bank column address signal CA0 as a first delayed column address signal CA_M<0:4> (CA_M0) when a first delayed bank access control signal CASP_M<2> is enabled. The third memory bank BK2 may receive the first delayed bank access control signal CASP_M<2> and the first delayed column address signal CA_M0. A column that is coupled to an enabled row of the third memory bank BK2 may be accessed based on the first delayed bank access control signal CASP_M<2> and the first delayed column address signal CA_M0. First to sixteenth columns may be accessed based on the first delayed column address signal CA_M0, and the first arithmetic data Y0 as a first element of the third matrix may be written into the third memory bank BK2.

The MAC operator MAC_A may receive the 16-bit data A1 and B1, corresponding to the second elements of the first and second matrices, from the first and second memory banks BK0 and BK1, respectively. The arithmetic circuit 900 of the MAC operator MAC_A may generate second arithmetic data Y1 by performing only a multiplication calculation on the 16-bit data A1 and B1, corresponding to the second elements of the first and second matrices, based on the arithmetic operation signal MUL_OP, and may output the second arithmetic data Y1 to the third memory bank BK2 through the third bank I/O line 793. When the predetermined time elapses after the first and second data enable signals DEN<0:1> are second received, the MAC operator MAC_A may second enable the delayed bank access control signal CASP_M<2>. The MAC operator MAC_A may output the second bank column address signal CA1 as a second delayed column address signal CA_M<0:4> (CA_M1) when the second delayed bank access control signal CASP_M<2> is enabled. The third memory bank BK2 may receive the second delayed bank access control signal CASP_M<2> and the second delayed column address signal CA_M1. A column that is coupled to the enabled row of the third memory bank BK2 may be accessed based on the second delayed bank access control signal CASP_M<2> and the second delayed column address signal CA_M1. Seventeenth to 32^nd columns may be accessed based on the second delayed column address signal CA_M1, and the second arithmetic data Y1 as a second element of the third matrix may be written into the third memory bank BK2.

When data that corresponds to all elements of the first and second matrices are read from the first and second memory banks BK0 and BK1 and all arithmetic data generated by the MAC operator MAC_A are written into the third memory bank BK2, the element-wise arithmetic operation of the PIM device 700A may be ended.

Figure 40:
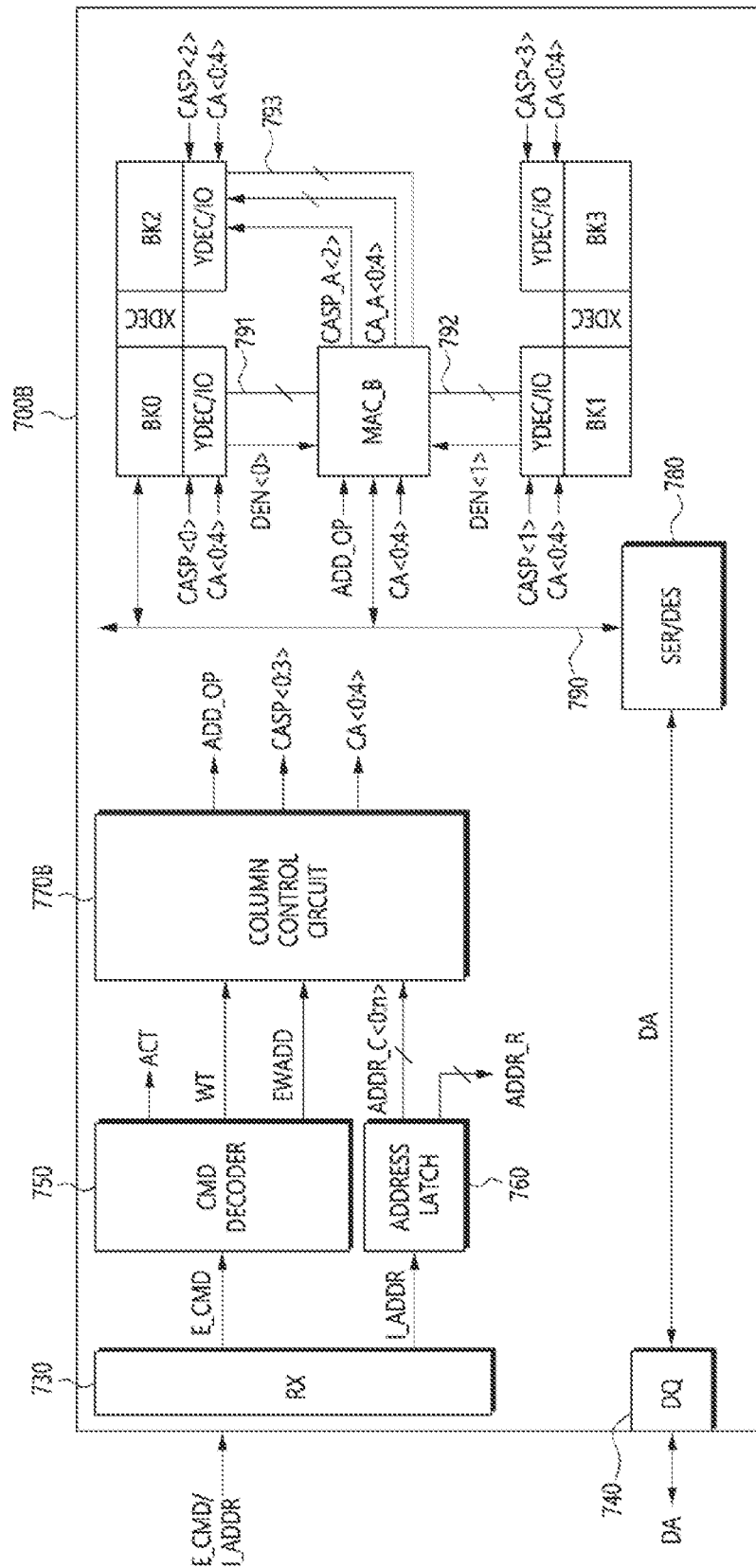
FIG. 40 is a diagram illustrating a configuration of a PIM device in accordance with an embodiment of the present disclosure.

FIG. 40 is a diagram illustrating a configuration of a PIM device 700B in accordance with an embodiment of the present disclosure. Referring to FIG. 40, the PIM device 700B may include components for performing an element-wise addition operation among element-wise arithmetic operations. The PIM device 700B may include the same or similar components as or to those of the PIM device 700A illustrated in FIG. 33, and repeated descriptions for the same components will be omitted herein. The PIM device 700B may include an MAC unit. The MAC unit may include a plurality of memory banks and an MAC operator MAC_B. The MAC unit may include a first memory bank BK0, a second memory bank BK1, a third memory bank BK2 and a fourth memory bank BK3. Each of the first to fourth memory banks BK0, BK1, BK2 and BK3 may include a Y-decoder/I/O circuit YDEC/IO. The first and third memory banks BK0 and BK2 may share one X-decoder XDEC, and the second and fourth memory banks BK1 and BK3 may share one X-decoder XDEC. Each of the first to fourth memory banks BK0, BK1, BK2 and BK3 may be accessed through the X-decoder XDEC and the Y-decoder/I/O circuit YDEC/IO. The first memory bank BK0 may be accessed based on a first bank access control signal CASP<0> and a bank column address signal CA<0:4>. The first bank access control signal CASP<0> and the bank column address signal CA<0:4> may be provided to the Y-decoder/I/O circuit YDEC/IO of the first memory bank BK0. The second memory bank BK1 may be accessed based on a second bank access control signal CASP<1> and the bank column address signal CA<0:4>. The second bank access control signal CASP<1> and the bank column address signal CA<0:4> may be provided to the Y-decoder/I/O circuit YDEC/IO of the second memory bank BK1. The third memory bank BK2 may be accessed based on a third bank access control signal CASP<2> and the bank column address signal CA<0:4>. The third bank access control signal CASP<2> and the bank column address signal CA<0:4> may be provided to the Y-decoder/I/O circuit YDEC/IO of the third memory bank BK2. The fourth memory bank BK3 may be accessed based on a fourth bank access control signal CASP<3> and the bank column address signal CA<0:4>. The fourth bank access control signal CASP<3> and the bank column address signal CA<0:4> may be provided to the Y-decoder/I/O circuit YDEC/IO of the fourth memory bank BK3. In the MAC unit, it may be prescribed that data that corresponds to elements of first and second matrices are stored in the first and second memory banks BK0 and BK1, respectively. In the MAC unit, it may be prescribed that arithmetic data generated through an element-wise arithmetic operation on the first and second matrices (i.e., data that corresponds to elements of a third matrix) are stored in the third memory bank BK2.

The MAC operator MAC_B may be coupled to at least the first to third memory banks BK0, BK1 and BK2. The MAC operator MAC_B may be coupled even to the fourth memory bank BK3. The MAC operator MAC_B may be coupled to the first to third memory banks BK0, BK1 and BK2 through bank I/O lines 791, 792 and 793. The MAC operator MAC_B may be coupled to the first memory bank BK0 through a first bank I/O line 791. The MAC operator MAC_B may be coupled to the second memory bank BK1 through a second bank I/O line 792. The MAC operator MAC_B may be coupled to the third memory bank BK2 through a third bank I/O line 793. The MAC operator MAC_B may receive data, output from the first and second memory banks BK0 and BK1, through the first and second bank I/O lines 791 and 792, and may output arithmetic data, generated by an arithmetic operation, to the third memory bank BK2 through the third bank I/O line 793. The MAC operator MAC_B may perform an arithmetic operation on data that is output from the first and second memory banks BK0 and BK1. In general, the MAC operator MAC_B may perform both multiplication and addition calculations. In order to allow the PIM device 700B to perform an element-wise addition operation, the MAC operator MAC_B may perform only an addition calculation on data that is output from the first and second memory banks BK0 and BK1.

The PIM device 700B may include a column control circuit 770B which controls the MAC unit to perform an element-wise arithmetic operation. The column control circuit 770B may generate various control signals so that the MAC unit of the PIM device 700B may perform an element-wise arithmetic operation. The column control circuit 770B may receive a calculation signal EWADD and a column address signal ADDR_C<0:n> (n is an arbitrary integer), and may generate an arithmetic operation signal ADD_OP, the bank access control signals CASP<0:3> and the bank column address signal CA<0:4> based on the calculation signal EWADD and the column address signal ADDR_C<0:n>. The column control circuit 770B may enable the first bank access control signal CASP<0> and the second bank access control signal CASP<1> among the bank access control signals CASP<0:3> based on the calculation signal EWADD. When the calculation signal EWADD is enabled, the column control circuit 770B may enable the arithmetic operation signal ADD_OP, and may enable the first and second bank access control signals CASP<0> and CASP<1> together. The column control circuit 770B may output at least a part of the column address signal ADDR_C<0:n> as the bank column address signal CA<0:4>. For example, the bank column address signal CA<0:4> may be a 5-bit signal.

The MAC operator MAC_B may receive the arithmetic operation signal ADD_OP from the column control circuit 770B. The MAC operator MAC_B may generate a delayed bank access control signal CASP_A<2> based on the arithmetic operation signal ADD_OP and at least one of the first and second bank access control signals CASP<0> and CASP<1>. The MAC operator MAC_B may generate a delayed column address signal CA_A<0:4> based on the bank column address signal CA<0:4>. The MAC operator MAC_B may provide the delayed bank access control signal CASP_A<2> and the delayed column address signal CA_A<0:4> to the third memory bank BK2. The third memory bank BK2 may be accessed based on the delayed bank access control signal CASP_A<2> and the delayed column address signal CA_A<0:4>. When the PIM device 700B performs an element-wise addition operation, the third memory bank BK2 may be accessed based on the delayed bank access control signal CASP_A<2> and the delayed column address signal CA_A<0:4> instead of the third bank access control signal CASP<2> and the bank column address signal CA<0:4>.

The Y-decoder/I/O circuit YDEC/IO of the first memory bank BK0 may generate a first data enable signal DEN<0> based on the first bank access control signal CASP<0>. The Y-decoder/I/O circuit YDEC/IO of the first memory bank BK0 may generate the first data enable signal DEN<0> by delaying the first bank access control signal CASP<0>. The Y-decoder/I/O circuit YDEC/IO of the first memory bank BK0 may provide the first data enable signal DEN<0> to the MAC operator MAC_B. The Y-decoder/I/O circuit YDEC/IO of the second memory bank BK1 may generate a second data enable signal DEN<1> based on the second bank access control signal CASP<1>. The Y-decoder/I/O circuit YDEC/IO of the second memory bank BK1 may generate the second data enable signal DEN<1> by delaying the second bank access control signal CASP<1>. The Y-decoder/I/O circuit YDEC/IO of the second memory bank BK1 may provide the second data enable signal DEN<1> to the MAC operator MAC_B. The MAC operator MAC_B may further receive the first and second data enable signals DEN<0> and DEN<1>. The MAC operator MAC_B may generate the delayed bank access control signal CASP_A<2> based on the arithmetic operation signal ADD_OP and at least one of the first and second data enable signals DEN<0> and DEN<1>. The MAC operator MAC_B may generate the delayed column address signal CA_A<0:4> based on the arithmetic operation signal ADD_OP, at least one of the first and second data enable signals DEN<0> and DEN<1> and the bank column address signal CA<0:4>. The PIM device 700B may further include a receiving driver (RX) 730, a data I/O circuit (DQ) 740, a command decoder (CMD DECODER) 750, an address latch 760, and a serializer/deserializer (SER/DES) 780. When the external command signal E_CMD has information for performing an element-wise arithmetic operation, the command decoder 750 may generate the calculation signal EWADD by decoding the external command signal E_CMD. For example, when the external command signal E_CMD has information for performing an element-wise addition operation, the command decoder 750 may generate the calculation signal EWADD by decoding the external command signal E_CMD.

Figure 41:
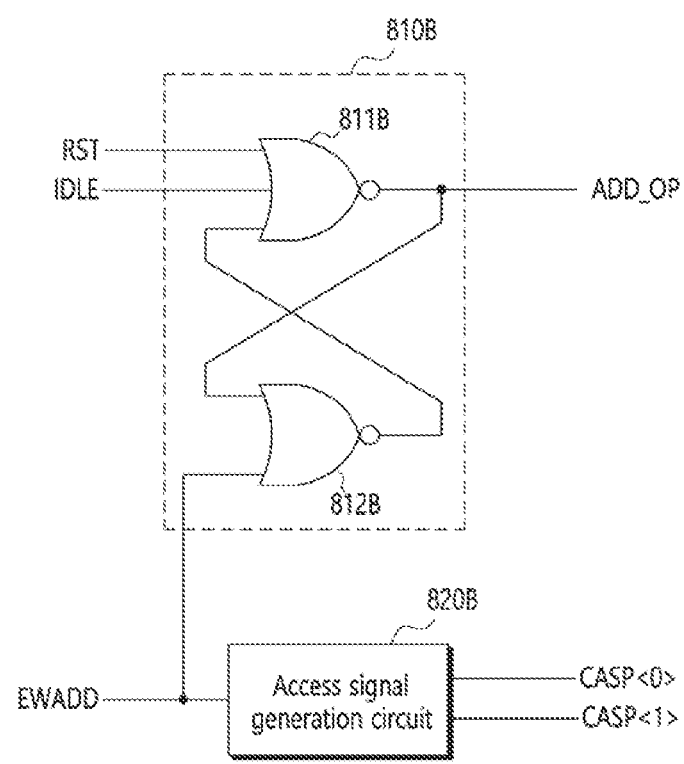
FIG. 41 is a diagram illustrating at least a part of components of a column control circuit illustrated in FIG. 40.

FIG. 41 is a diagram illustrating at least a part of components of the column control circuit 770B illustrated in FIG. 40. Referring to FIG. 41, the column control circuit 770B may include an arithmetic operation signal generation circuit 810B and an access signal generation circuit 820B. The arithmetic operation signal generation circuit 810B may receive the calculation signal EWADD, and may generate the arithmetic operation signal ADD_OP based on the calculation signal EWADD. The arithmetic operation signal generation circuit 810B may further receive a reset signal RST and an idle signal IDLE. The arithmetic operation signal generation circuit 810B may generate the arithmetic operation signal ADD_OP based on the calculation signal EWADD, the reset signal RST and the idle signal IDLE. The arithmetic operation signal generation circuit 810B may enable the arithmetic operation signal ADD_OP when the calculation signal EWADD is enabled in a state in which the reset signal RST and the idle signal IDLE are disabled. The arithmetic operation signal generation circuit 810B may disable the arithmetic operation signal ADD_OP when one of the reset signal RST and the idle signal IDLE is enabled in a state in which the arithmetic operation signal ADD_OP is enabled.

The arithmetic operation signal generation circuit 810B may be configured by a NOR type RS latch. The arithmetic operation signal generation circuit 810B may include a first NOR gate 811B and a second NOR gate 812B. A first input terminal of the first NOR gate 811B may receive the reset signal RST, a second input terminal of the first NOR gate 811B may receive the idle signal IDLE, and a third input terminal of the first NOR gate 811B may receive a signal output from an output terminal of the second NOR gate 812B. The arithmetic operation signal ADD_OP may be output through an output terminal of the first NOR gate 811B. A first input terminal of the second NOR gate 812B may receive the arithmetic operation signal ADD_OP, and a second input terminal of the second NOR gate 812B may receive the calculation signal EWADD. The output terminal of the second NOR gate 812B may be coupled to the third input terminal of the first NOR gate 811B. When the calculation signal EWADD is enabled to a logic high level in a state in which the reset signal RST and the idle signal IDLE are disabled to logic low levels, a signal with a logic low level may be input to the third input terminal of the first NOR gate 811B, and thus, the arithmetic operation signal ADD_OP may be enabled to a logic high level. In a state in which the arithmetic operation signal ADD_OP is enabled to a logic high level, when at least one of the reset signal RST and the idle signal IDLE is enabled to a logic high level, the arithmetic operation signal ADD_OP may be disabled to a logic low level.

The access signal generation circuit 820B may receive the calculation signal EWADD, and may generate the first and second bank access control signals CASP<0> and CASP<1> based on the calculation signal EWADD. When the calculation signal EWADD is enabled, the access signal generation circuit 820B may enable both the first and second bank access control signals CASP<0> and CASP<1>. By simultaneously enabling the first and second bank access control signals CASP<0> and CASP<1>, the access signal generation circuit 820B may cause the first and second memory banks BK0 and BK1 to be simultaneously accessed.

Figure 42A:
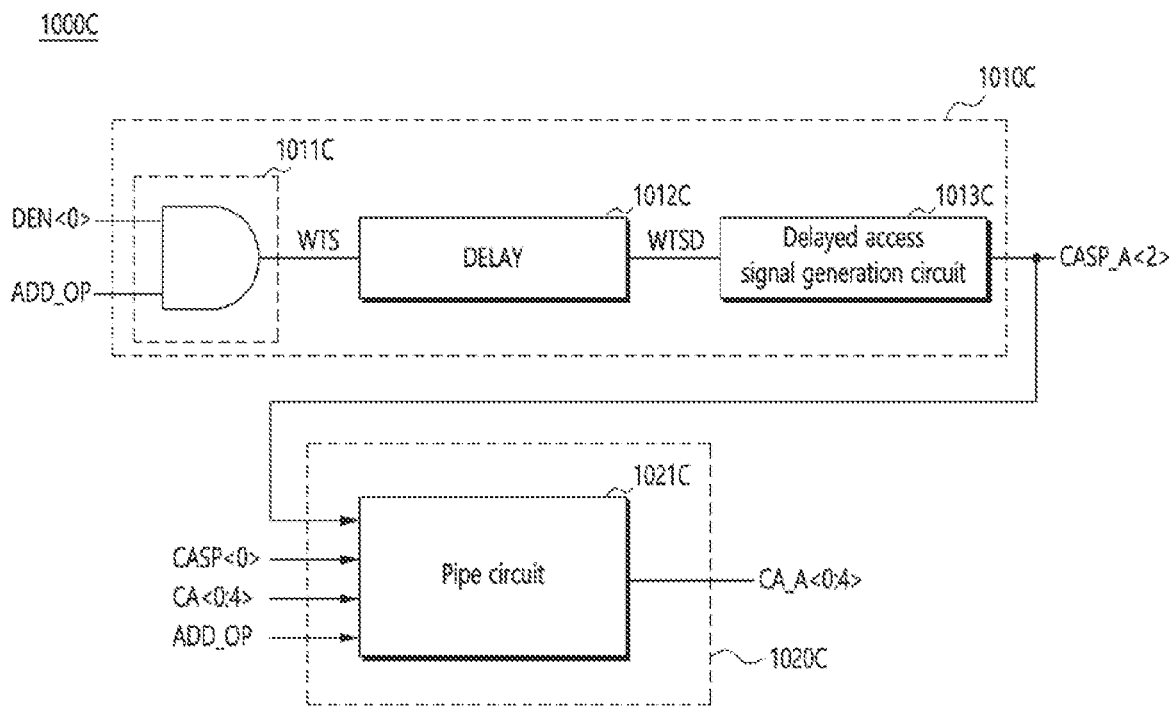
FIGS. 42A and 42B are diagrams illustrating parts among components of an MAC operator configured in FIG. 40.
Figure 42B:
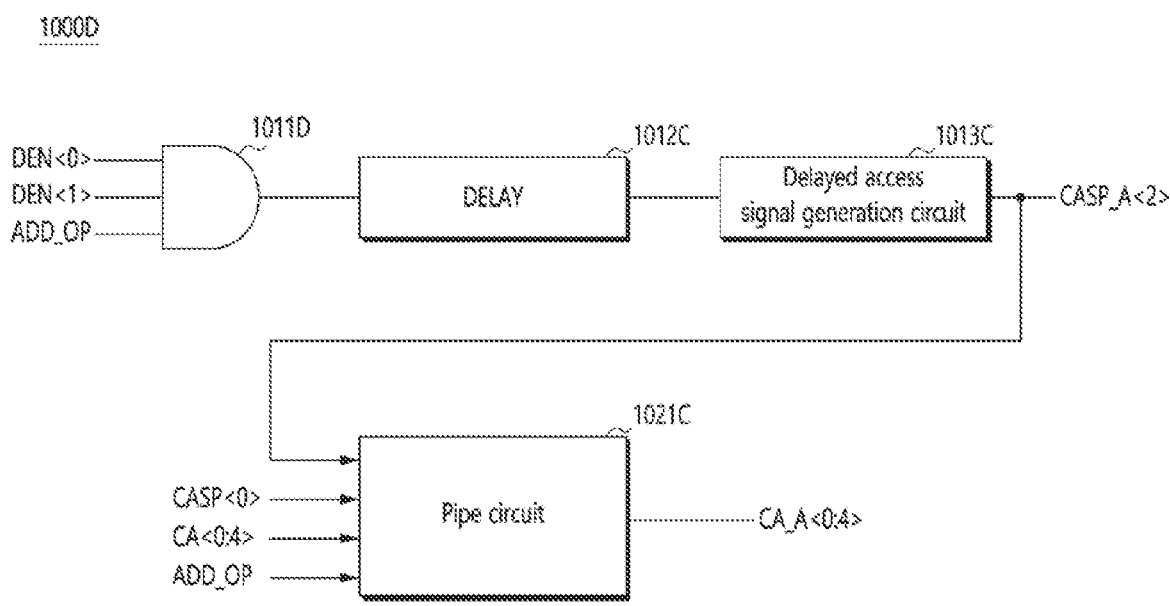

FIGS. 42A and 42B are diagrams illustrating parts among components of the MAC operator MAC_B configured in FIG. 40. Referring to FIG. 42A, the MAC operator MAC_B may include a write control circuit 1000C. The write control circuit 1000C may generate control signals for writing arithmetic data, generated through an arithmetic operation of the MAC operator MAC_B, to the third memory bank BK2. The write control circuit 1000C may generate the delayed bank access control signal CASP_A<2> and the delayed column address signal CA_A<0:4> based on the arithmetic operation signal ADD_OP, the first data enable signal DEN<0> and the bank column address signal CA<0:4>.

The write control circuit 1000C may include an access control circuit 1010C and an address control circuit 1020C. The access control circuit 1010C may generate the delayed bank access control signal CASP_A<2> based on the arithmetic operation signal ADD_OP and the first data enable signal DEN<0>. The access control circuit 1010C may generate a write start signal WTS based on the arithmetic operation signal ADD_OP and the first data enable signal DEN<0>, and may generate a delayed write start signal WTSD by delaying the write start signal WTS by a predetermined time. The predetermined time may be a time during which the MAC operator MAC_B performs an arithmetic operation, and may correspond to a time from after the MAC operator MAC_B receives data that is output from the first and second memory banks BK0 and BK1 to till the MAC operator MAC_B outputs arithmetic data to the third memory bank BK2. The access control circuit 1010C may generate the delayed bank access control signal CASP_A<2> each time the delayed write start signal WTSD is generated.

The access control circuit 1010C may include a write start signal generation circuit 1011C, a first delay circuit (DELAY) 1012C and a delayed access signal generation circuit 1013C. The write start signal generation circuit 1011C may generate the write start signal WTS by receiving the first data enable signal DEN<0> and the arithmetic operation signal ADD_OP. The write start signal generation circuit 1011C may enable the write start signal WTS each time the first data enable signal DEN<0> is enabled in a state in which the arithmetic operation signal ADD_OP is enabled. The write start signal generation circuit 1011C may include an AND gate which outputs the write start signal WTS by AND-gating the first data enable signal DEN<0> and the arithmetic operation signal ADD_OP. In an embodiment, the write start signal generation circuit 1011C may be modified to generate the write start signal WTS by receiving the second data enable signal DEN<1> instead of the first data enable signal DEN<0>. The first delay circuit 1012C may generate the delayed write start signal WTSD by delaying the write start signal WTS by the predetermined time. The delayed access signal generation circuit 1013C may receive the delayed write start signal WTSD, and may generate the delayed bank access control signal CASP_A<2> based on the delayed write start signal WTSD. The delayed access signal generation circuit 1013C may be implemented by a pulse generator.

The address control circuit 1020C may generate the delayed column address signal CA_A<0:4> by delaying the bank column address signal CA<0:4>. The address control circuit 1020C may receive the arithmetic operation signal ADD_OP, the bank column address signal CA<0:4>, the first bank access control signal CASP<0> and the delayed bank access control signal CASP_A<2>. The address control circuit 1020C may generate the delayed column address signal CA_A<0:4> based on the arithmetic operation signal ADD_OP, the bank column address signal CA<0:4>, the first bank access control signal CASP<0> and the delayed bank access control signal CASP_A<2>. The address control circuit 1020C may sequentially store the bank column address signal CA<0:4> each time the first bank access control signal CASP<0> is enabled in a state in which the arithmetic operation signal ADD_OP is enabled. The address control circuit 1020C may sequentially output the sequentially stored bank column address signal CA<0:4> as the delayed column address signal CA_A<0:4> each time the delayed bank access control signal CASP_A<2> is enabled. By sequentially outputting the stored bank column address signal CA<0:4> as the delayed column address signal CA_A<0:4> each time the delayed bank access control signal CASP_A<2> is enabled, the address control circuit 1020C may synchronize a point of time at which the delayed bank access control signal CASP_A<2> is output and a point of time at which the delayed column address signal CA_A<0:4> is output. When the delayed bank access control signal CASP_A<2> is first enabled, the address control circuit 1020C may provide the bank column address signal CA<0:4> received when the first bank access control signal CASP<0> is first enabled, as the delayed column address signal CA_A<0:4>. When the delayed bank access control signal CASP_A<2> is second enabled, the address control circuit 1020C may provide the bank column address signal CA<0:4> received when the first bank access control signal CASP<0> is second enabled, as the delayed column address signal CA_A<0:4>. Accordingly, after the predetermined time elapses, a column of the third memory bank BK2 with the same order as columns accessed in the first and second memory banks BK0 and BK1 may be accessed. In an embodiment, the address control circuit 1020C may be modified to receive the second bank access control signal CASP<1> instead of the first bank access control signal CASP<0>.

The address control circuit 1020C may include a pipe circuit 1021C. The pipe circuit 1021C may generate the delayed column address signal CA_A<0:4> based on the arithmetic operation signal ADD_OP, the first bank access control signal CASP<0>, the delayed bank access control signal CASP_A<2> and the bank column address signal CA<0:4>. The pipe circuit 1021C may generate a plurality of input strobe signals based on the arithmetic operation signal ADD_OP and the first bank access control signal CASP<0>. The pipe circuit 1021C may generate a plurality of output strobe signals based on the delayed bank access control signal CASP_A<2>. The pipe circuit 1021C may sequentially store the bank column address signal CA<0:4>, input to the pipe circuit 1021C, based on the plurality of input strobe signals. The pipe circuit 1021C may sequentially output the bank column address signal CA<0:4> sequentially stored in the pipe circuit 1021C, as the delayed column address signal CA_A<0:4>, based on the plurality of output strobe signals.

Referring to FIG. 42B, the MAC operator MAC_B may include a write control circuit 1000D. The write control circuit 1000D may include a write start signal generation circuit 1011D, and may have the same configuration as the write control circuit 1000C illustrated in FIG. 42A except the write start signal generation circuit 1011D. Repeated descriptions for the same components will be omitted herein. The write start signal generation circuit 1011D may generate a write start signal WTS based on the first data enable signal DEN<0>, the second data enable signal DEN<1> and the arithmetic operation signal ADD_OP. The write start signal generation circuit 1011D may enable the write start signal WTS when the first and second data enable signals DEN<0> and DEN<1> are enabled in a state in which the arithmetic operation signal ADD_OP is enabled. Since the first and second memory banks BK0 and BK1 are simultaneously accessed when the PIM device 700B performs an element-wise arithmetic operation, the first and second data enable signals DEN<0> and DEN <1> may be simultaneously enabled.

Figure 43:
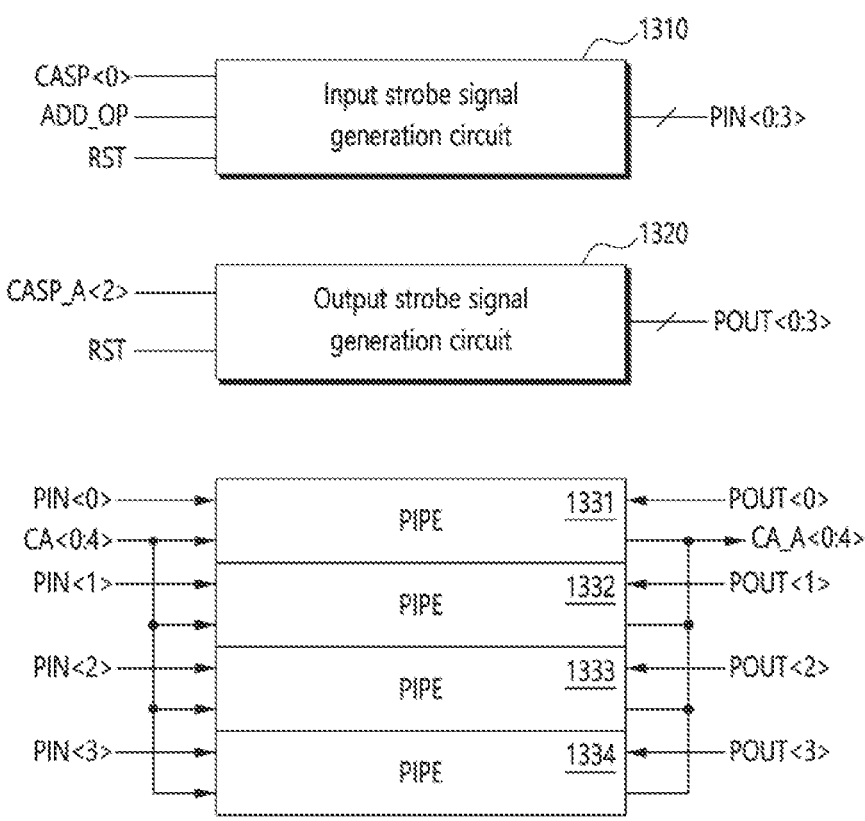
FIG. 43 is a diagram illustrating a configuration of a pipe circuit illustrated in FIGS. 42A and 42B.

FIG. 43 is a diagram illustrating a configuration of the pipe circuit 1021C illustrated in FIGS. 42A and 42B. Referring to FIG. 43, the pipe circuit 1021C may include an input strobe signal generation circuit 1310, an output strobe signal generation circuit 1320, and a plurality of pipes (PIPE) 1331, 1332, 1333 and 1334. The input strobe signal generation circuit 1310 may generate a plurality of input strobe signals PIN<0:3> by receiving the first bank access control signal CASP<0> and the arithmetic operation signal ADD_OP. The number of the plurality of input strobe signals PIN<0:3> may be changed depending on a depth of the pipe circuit 1021C. In FIG. 43, the depth of the pipe circuit 1021C is illustrated as 4, and each of the number of the plurality of input strobe signals PIN<0:3> and the number of a plurality of output strobe signals POUT<0:3> may be four. When the arithmetic operation signal ADD_OP is enabled, the input strobe signal generation circuit 1310 may generate first to fourth input strobe signals PIN<0:3> each time the first bank access control signal CASP<0> is enabled. For example, in a state in which the arithmetic operation signal ADD_OP is enabled, the input strobe signal generation circuit 1310 may generate the first input strobe signal PIN<0> when the first bank access control signal CASP<0> is first enabled, and may generate the second input strobe signal PIN<1> when the first bank access control signal CASP<1> is second enabled. In the same manner, the input strobe signal generation circuit 1310 may generate the third and fourth input strobe signals PIN<2> and PIN<3> when the first bank access control signal CASP<0> is third and fourth enabled. The input strobe signal generation circuit 1310 may generate the first input strobe signal PIN<0> again when the first bank access control signal CASP<0> is fifth enabled. When the first bank access control signal CASP<0> is enabled a predetermined number of times, the input strobe signal generation circuit 1310 might not generate the first to fourth input strobe signals PIN<0:3> any more. For example, when the first bank access control signal CASP<0> is counted a predetermined number of times, the input strobe signal generation circuit 1310 may block the first to fourth input strobe signals PIN<0:3> from being generated. The input strobe signal generation circuit 1310 may further receive the reset signal RST, and may be initialized based on the reset signal RST.

The output strobe signal generation circuit 1320 may generate the plurality of output strobe signals POUT<0:3> based on the delayed bank access control signal CASP_A<2>. The output strobe signal generation circuit 1320 may generate the first to fourth output strobe signals POUT<0:3> each time the delayed bank access control signal CASP_A<2> is enabled. For example, the output strobe signal generation circuit 1320 may generate the first output strobe signal POUT<0> when the delayed bank access control signal CASP_A<2> is first enabled, and may generate the second output strobe signal POUT<1> when the delayed bank access control signal CASP_A<2> is second enabled. In the same manner, the output strobe signal generation circuit 1320 may generate the third and fourth output strobe signals POUT<2> and POUT<3> when the delayed bank access control signal CASP_A<2> is third and fourth enabled. The output strobe signal generation circuit 1320 may generate the first output strobe signal POUT<0> again when the delayed bank access control signal CASP_A<2> is fifth enabled. When the delayed bank access control signal CASP_A<2> is enabled a predetermined number of times, the output strobe signal generation circuit 1320 might not generate the first to fourth output strobe signals POUT<0:3> any more. For example, when the delayed bank access control signal CASP_A<2> is counted a predetermined number of times, the output strobe signal generation circuit 1320 may block the first to fourth output strobe signals POUT<0:3> from being generated. The output strobe signal generation circuit 1320 may further receive the reset signal RST, and may be initialized based on the reset signal RST.

The plurality of pipes 1331, 1332, 1333 and 1334 may include a first pipe 1331, a second pipe 1332, a third pipe 1333 and a fourth pipe 1334. The first pipe 1331, the second pipe 1332, the third pipe 1333 and the fourth pipe 1334 may receive in common the bank column address signal CA<0:4>, and may output in common the delayed column address signal CA_A<0:4>. The first pipe 1331 may receive the first input strobe signal PIN<0> and the first output strobe signal POUT<0>. The first pipe 1331 may store the bank column address signal CA<0:4> based on the first input strobe signal PIN<0>, and may output the bank column address signal CA<0:4>, stored therein, as the delayed column address signal CA_A<0:4> based on the first output strobe signal POUT<0>. The second pipe 1332 may receive the second input strobe signal PIN<1> and the second output strobe signal POUT<1>. The second pipe 1332 may store the bank column address signal CA<0:4> based on the second input strobe signal PIN<1>, and may output the bank column address signal CA<0:4>, stored therein, as the delayed column address signal CA_A<0:4> based on the second output strobe signal POUT<1>. The third pipe 1333 may receive the third input strobe signal PIN<2> and the third output strobe signal POUT<2>. The third pipe 1333 may store the bank column address signal CA<0:4> based on the third input strobe signal PIN<2>, and may output the bank column address signal CA<0:4>, stored therein, as the delayed column address signal CA_A<0:4> based on the third output strobe signal POUT<2>. The fourth pipe 1334 may receive the fourth input strobe signal PIN<3> and the fourth output strobe signal POUT<3>. The fourth pipe 1334 may store the bank column address signal CA<0:4> based on the fourth input strobe signal PIN<3>, and may output the bank column address signal CA<0:4>, stored therein, as the delayed column address signal CA_A<0:4> based on the fourth output strobe signal POUT<3>.

Figure 44A:
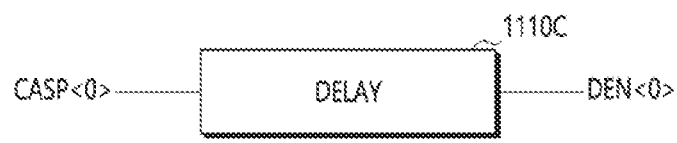
FIG. 44A is a diagram illustrating a part among components of a Y-decoder/I/O circuit of a first memory bank of FIG. 40.

FIG. 44A is a diagram illustrating a part among components of the Y-decoder/I/O circuit YDEC/IO of the first memory bank BK0 of FIG. 40. Referring to FIG. 44A, the Y-decoder/I/O circuit YDEC/IO of the first memory bank BK0 may include a delay circuit 1110C. The delay circuit 1110C may receive the first bank access control signal CASP<0>, and may generate the first data enable signal DEN<0> by delaying the first bank access control signal CASP<0>. A delay time of the delay circuit 1110C may correspond to an amount of time between the first bank access control signal CASP<0> being generated and data being output from the first memory bank BK0.

Figure 44B:
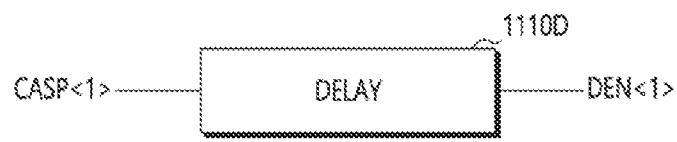
FIG. 44B is a diagram illustrating a part among components of a Y-decoder/I/O circuit of a second memory bank of FIG. 40.

FIG. 44B is a diagram illustrating a part among components of the Y-decoder/I/O circuit YDEC/IO of the second memory bank BK1 of FIG. 40. Referring to FIG. 44B, the Y-decoder/I/O circuit YDEC/IO of the second memory bank BK1 may include a delay circuit 1110D. The delay circuit 1110D may receive the second bank access control signal CASP<1>, and may generate the second data enable signal DEN<1> by delaying the second bank access control signal CASP<1>. A delay time of the delay circuit 1110D may correspond to an amount of time between the second bank access control signal CASP<1> being generated and data being output from the second memory bank BK1.

FIG. 45 is a diagram illustrating a part among components of the Y-decoder/I/O circuit YDEC/IO of the third memory bank BK2 of FIG. 40. Referring to FIG. 45, the Y-decoder/I/O circuit YDEC/IO of the third memory bank BK2 may include a first selection circuit 1210B and a second selection circuit 1220B. The first selection circuit 1210B may receive the arithmetic operation signal ADD_OP, the bank column address signal CA<0:4> and the delayed column address signal CA_A<0:4>, and may output an internal column address signal ICA<0:4>. The first selection circuit 1210B may output one of the bank column address signal CA<0:4> and the delayed column address signal CA_A<0:4> as the internal column address signal ICA<0:4> based on the arithmetic operation signal ADD_OP. When the arithmetic operation signal ADD_OP is disabled to a logic low level, the first selection circuit 1210B may output the bank column address signal CA<0:4> as the internal column address signal ICA<0:4>. When the arithmetic operation signal ADD_OP is enabled to a logic high level, the first selection circuit 1210B may output the delayed column address signal CA_A<0:4> as the internal column address signal ICA<0:4>. The third memory bank BK2 may be accessed based on the internal column address signal ICA<0:4>.

The second selection circuit 1220B may receive the arithmetic operation signal ADD_OP, the third bank access control signal CASP<2> and the delayed bank access control signal CASP_A<2>, and may output an internal bank access control signal ICASP<2>. The second selection circuit 1220B may output one of the third bank access control signal CASP<2> and the delayed bank access control signal CASP_A<2> as the internal bank access control signal ICASP<2> based on the arithmetic operation signal ADD_OP. When the arithmetic operation signal ADD_OP is disabled to a logic low level, the second selection circuit 1220B may output the third bank access control signal CASP<2> as the internal bank access control signal ICASP<2>. When the arithmetic operation signal ADD_OP is enabled to a logic high level, the second selection circuit 1220B may output the delayed bank access control signal CASP_A<2> as the internal bank access control signal ICASP<2>. The third memory bank BK2 may be accessed based on the internal bank access control signal ICASP<2>.

Figure 46:
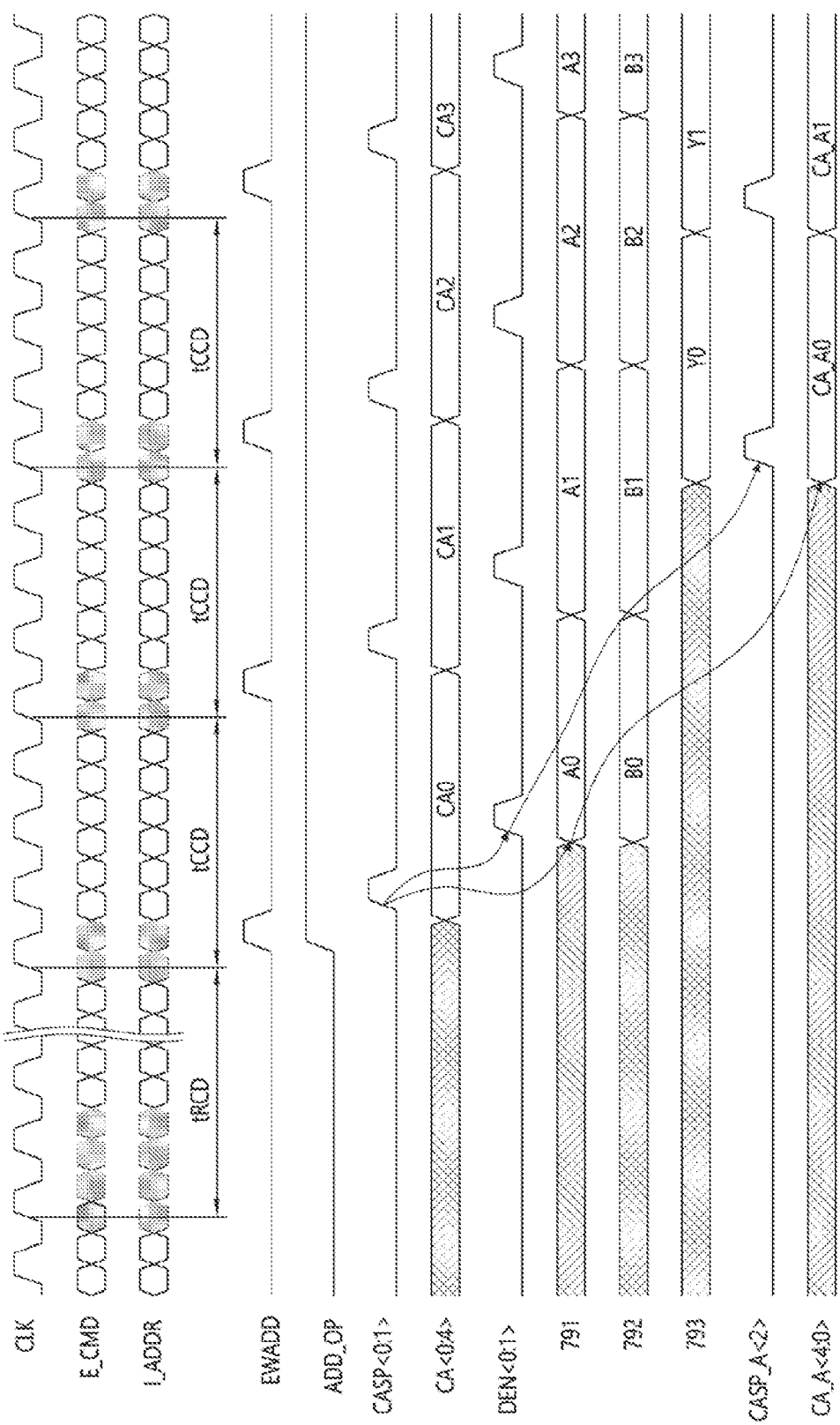
FIG. 46 is a timing diagram illustrating the operation method of the PIM device in accordance with the embodiment of the present disclosure.

FIG. 46 is a timing diagram illustrating the operation method of the PIM device 700B in accordance with the embodiment of the present disclosure. The operation method of the PIM device 700B in accordance with the embodiment of the present disclosure will be described below with reference to FIGS. 40 to 46. The PIM device 700B may store elements of first and second matrices in the first and second memory banks BK0 and BK1, respectively, to perform an element-wise arithmetic operation. When all the elements of the first and second matrices are stored in the first and second memory banks BK0 and BK1, the PIM device 700B may generate an active signal ACT and a row address signal ADDR_R based on the external command signal E_CMD and the input address signal I_ADDR for performing an active operation. The external command signal E_CMD and the input address signal I_ADDR may be input to the PIM device 700B in synchronization with a clock signal CLK. Rows with the same order among the plurality of rows of the first to third memory banks BK0, BK1 and BK2 may be enabled based on the active signal ACT and the row address signal ADDR_R.

When a time corresponding to tRCD elapses after the first to third memory banks BK0, BK1 and BK2 are activated and the external command signal E_CMD instructing the active operation is received, a first external command signal E_CMD and a first input address signal I_ADDR for performing the element-wise arithmetic operation may be input to the PIM device 700B. The tRCD may be defined by a time interval during which a column command signal is input after a row command signal is input. The external command signal E_CMD for performing the active operation may be included in the row command signal, and the external command signal E_CMD for performing the element-wise arithmetic operation may be included in the column command signal. The command decoder 750 may generate a first calculation signal EWADD based on the first external command signal E_CMD, and the address latch 760 may output the first input address signal I_ADDR as a first column address signal ADDR_C<0:n>. The column control circuit 770B may enable the arithmetic operation signal ADD_OP based on the calculation signal EWADD, may enable the first and second bank access signals CASP<0:1>, and may provide at least a part of the first column address signal ADDR_C<0:n> as a first bank column address signal CA<0:4> (CA0). A column that is coupled to an enabled row of the first memory bank BK0 may be accessed based on the first first bank access control signal CASP<0> and the first bank column address signal CA0. For example, the bank column address signal CA<0:4> may include 5 bits, and 16 columns may be accessed based on the bank column address signal CA<0:4>. First to sixteenth columns may be accessed based on the first bank column address signal CA0. At the same time, a column that is coupled to an enabled row of the second memory bank BK1 may be accessed based on the first second bank access control signal CASP<1> and the first bank column address signal CA0. Accordingly, 16-bit data A0 corresponding to a first element of the first matrix may be read from the first memory bank BK0, and 16-bit data B0 corresponding to a first element of the second matrix may be read from the second memory bank BK1. The first and second memory banks BK0 and BK1 may enable the first and second data enable signals DEN<0:1>, respectively, while outputting the data A0 and B0 corresponding to the first elements, respectively, of the first and second matrices. The data A0 and B0 corresponding to the first elements of the first and second matrices may be provided to the MAC operator MAC_B through the first and second bank I/O lines 791 and 792.

When a time corresponding to tCCD elapses, a second external command signal E_CMD and a second input address signal I_ADDR for performing the element-wise arithmetic operation may be received in the PIM device 700B. The tCCD may be defined by a time interval during which another column command signal is input after one column command signal is input. The command decoder 750 may generate a second calculation signal EWADD based on the second external command signal E_CMD, and the address latch 760 may output the second input address signal I_ADDR as a second column address signal ADDR_C<0:n>. The column control circuit 770B may second enable the first and second bank access control signals CASP<0:1> based on the second calculation signal EWADD, and may provide at least a part of the second column address signal ADDR_C<0:n> as a second bank column address signal CA<0:4> (CA1). Columns that are coupled to the enabled rows of the first and second memory banks BK0 and BK1 may be accessed based on the first and second bank access control signals CASP<0:1> and the second bank column address signal CA1. For example, seventeenth to 32^nd columns may be accessed based on the second bank column address signal CA1. Accordingly, 16-bit data A1 corresponding to a second element of the first matrix may be read from the first memory bank BK0, and 16-bit data B1 corresponding to a second element of the second matrix may be read from the second memory bank BK1. The first and second memory banks BK0 and BK1 may enable the first and second data enable signals DEN<0:1>, respectively, while outputting the data A1 and B1 corresponding to the second elements of the first and second matrices. The data A1 and B1 corresponding to the second elements of the first and second matrices may be provided to the MAC operator MAC_B through the first and second bank I/O lines 791 and 792.

When a time corresponding to tCCD elapses, a third external command signal E_CMD and a third input address signal I_ADDR for performing the element-wise arithmetic operation may be received in the PIM device 700B. The command decoder 750 may generate a third calculation signal EWADD based on the third external command signal E_CMD, and the address latch 760 may output the third input address signal I_ADDR as a third column address signal ADDR_C<0:n>. The column control circuit 770B may third enable the first and second bank access control signals CASP<0:1> based on the third calculation signal EWADD, and may provide at least a part of the third column address signal ADDR_C<0:n> as a third bank column address signal CA<0:4> (CA2). Columns that are coupled to the enabled rows of the first and second memory banks BK0 and BK1 may be accessed based on the first and second bank access control signals CASP<0:1> and the third bank column address signal CA2. For example, 33^rd to 48^th columns may be accessed based on the third bank column address signal CA2. Accordingly, 16-bit data A2 corresponding to a third element of the first matrix may be read from the first memory bank BK0, and 16-bit data B2 corresponding to a third element of the second matrix may be read from the second memory bank BK1. The first and second memory banks BK0 and BK1 may enable the first and second data enable signals DEN<0:1>, respectively, while outputting the data A2 and B2 corresponding to the third elements of the first and second matrices. The data A2 and B2 corresponding to the third elements of the first and second matrices may be provided to the MAC operator MAC_B through the first and second bank I/O lines 791 and 792.

When a time corresponding to tCCD elapses, a fourth external command signal E_CMD and a fourth input address signal I_ADDR for performing the element-wise arithmetic operation may be received in the PIM device 700B. The command decoder 750 may generate a fourth calculation signal EWADD based on the fourth external command signal E_CMD, and the address latch 760 may output the fourth input address signal I_ADDR as a fourth column address signal ADDR_C<0:n>. The column control circuit 770B may fourth enable the first and second bank access control signals CASP<0:1> based on the fourth calculation signal EWADD, and may provide at least a part of the fourth column address signal ADDR_C<0:n> as a fourth bank column address signal CA<0:4> (CA3). Columns that are coupled to the enabled rows of the first and second memory banks BK0 and BK1 may be accessed based on the first and second bank access control signals CASP<0:1> and the fourth bank column address signal CA3. For example, 49^th to 64^th columns may be accessed based on the fourth bank column address signal CA3. Accordingly, 16-bit data A3 corresponding to a fourth element of the first matrix may be read from the first memory bank BK0, and 16-bit data B3 corresponding to a fourth element of the second matrix may be read from the second memory bank BK1. The first and second memory banks BK0 and BK1 may enable the first and second data enable signals DEN<0:1>, respectively, while outputting the data A3 and B3 corresponding to the fourth elements of the first and second matrices. The data A3 and B3 corresponding to the fourth elements of the first and second matrices may be provided to the MAC operator MAC_B through the first and second bank I/O lines 791 and 792.

The MAC operator MAC_B may receive data, read from the first and second memory banks BK0 and BK1, through the first and second bank I/O lines 791 and 792, and may perform a calculation on the received data. The MAC operator MAC_B may receive the 16-bit data A0 and B0, corresponding to the first elements of the first and second matrices, from the first and second memory banks BK0 and BK1, respectively. The MAC operator MAC_B may generate a first arithmetic data Y0 by performing only an addition on the 16-bit data A0 and B0, corresponding to the first elements of the first and second matrices, based on the arithmetic operation signal ADD_OP, and may output the first arithmetic data Y0 to the third memory bank BK2 through the third bank I/O line 793. When the predetermined time elapses after the first and second data enable signals DEN<0:1> are first received, the MAC operator MAC_B may enable the delayed bank access control signal CASP_A<2>. The MAC operator MAC_B may sequentially store the first to fourth bank column address signals CA0, CA1, CA2 and CA3 based on the first bank access control signal CASP<0>, and may output the first bank column address signal CA0 as a first delayed column address signal CA_A<0:4> (CA_A0) when a first delayed bank access control signal CASP_A<2> is enabled. The third memory bank BK2 may receive the first delayed bank access control signal CASP_A<2> and the first delayed column address signal CA_A0. A column that is coupled to an enabled row of the third memory bank BK2 may be accessed based on the first delayed bank access control signal CASP_A<2> and the first delayed column address signal CA_A0. First to sixteenth columns may be accessed based on the first delayed column address signal CA_A0, and the first arithmetic data Y0 as a first element of the third matrix may be written into the third memory bank BK2.

The MAC operator MAC_B may receive the 16-bit data A1 and B1, corresponding to the second elements of the first and second matrices, from the first and second memory banks BK0 and BK1, respectively. The MAC operator MAC_B may generate second arithmetic data Y1 by performing only an addition on the 16-bit data A1 and B1, corresponding to the second elements of the first and second matrices, based on the arithmetic operation signal ADD_OP, and may output the second arithmetic data Y1 to the third memory bank BK2 through the third bank I/O line 793. When the predetermined time elapses after the first and second data enable signals DEN<0:1> are second received, the MAC operator MAC_B may second enable the delayed bank access control signal CASP_A<2>. The MAC operator MAC_B may output the second bank column address signal CA1 as a second delayed column address signal CA_A<0:4> (CA_A1) when the second delayed bank access control signal CASP_A<2> is enabled. The third memory bank BK2 may receive the second delayed bank access control signal CASP_A<2> and the second delayed column address signal CA_A1. A column that is coupled to the enabled row of the third memory bank BK2 may be accessed based on the second delayed bank access control signal CASP_A<2> and the second delayed column address signal CA_A1. Seventeenth to 32^nd columns may be accessed based on the second delayed column address signal CA_A1, and the second arithmetic data Y1 as a second element of the third matrix may be written into the third memory bank BK2.

When data that corresponds to all elements of the first and second matrices are read from the first and second memory banks BK0 and BK1 and all arithmetic data generated by the MAC operator MAC_B are written into the third memory bank BK2, the element-wise arithmetic operation of the PIM device 700B may be ended.

Figure 47:
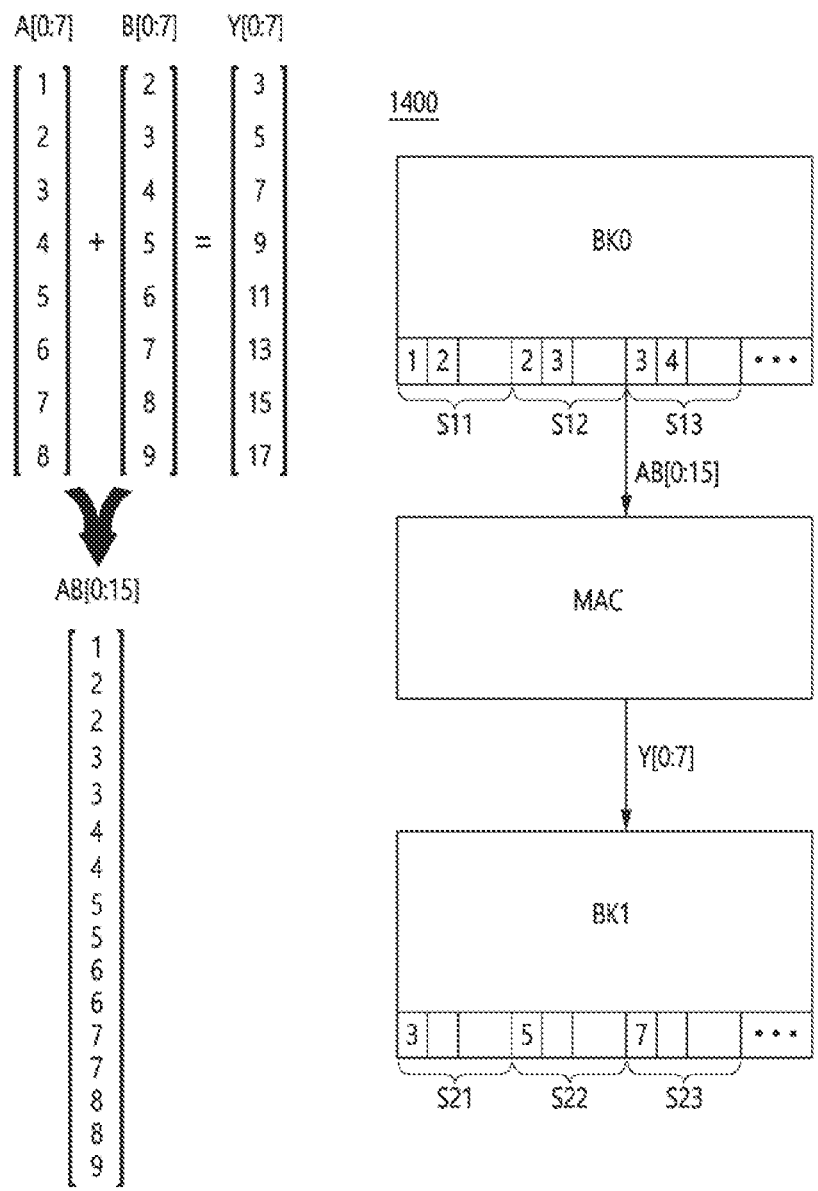
FIG. 47 is a diagram illustrating a configuration and an operation method of a PIM device in accordance with an embodiment of the present disclosure.

FIG. 47 is a diagram illustrating a configuration and an operation method of a PIM device 1400 in accordance with an embodiment of the present disclosure. Referring to FIG. 47, the PIM device 1400 may perform an arithmetic operation. In particular, the PIM device 1400A may perform an element-wise arithmetic operation. The element-wise arithmetic operation may mean an operation of calculating respective elements of two matrices with the same size. For example, an element-wise addition operation may be performed as follows. The PIM device 1400 may add an element '1' of a first row of a first matrix A[0:7] and an element '2' of the first row of a first matrix A[0:7] and an element '2' of the first row of a second matrix B[0:7] to output an addition result of an element '3' that is seen in the first row of a third matrix Y[0:7]. The PIM device 1400 may add an element '2' of the second row of the first matrix A[0:7] and an element '3' of the second row of the second matrix B[0:7] to output an addition result of an element '5' that is seen in the second row of the third matrix Y[0:7]. The PIM device 1400 may add an element '3' of the third row of the first matrix A[0:7] and an element '4' of the third row of the second matrix B[0:7] to output an addition result of an element '7' that is seen in the third row of the third matrix Y[0:7]. The PIM device 1400 may add an element '4' of the fourth row of the first matrix A[0:7] and an element '5' of the fourth row of the second matrix B[0:7] to output an addition result of an element '9' that is seen in the fourth row of the third matrix Y[0:7]. In the same manner, the PIM device 1400 may add elements '5,' '6,' '7,' and '8' of fifth to eighth rows of the first matrix A[0:7] and elements '6,' '7,' '8' and '9' of fifth to eighth rows of the second matrix B[0:7], respectively, to output addition results of elements '11,' '13,' '15,' and '17,' respectively, seen in the fifth to eighth rows of the third matrix Y[0:7]. For the sake of clarity in explanation, it is illustrated that each of the first to third matrices A[0:7], B[0:7] and Y[0:7] includes only elements of a plurality of rows. However, the spirit of the present disclosure may be applied to cases in which each of the first to third matrices A[0:7], B[0:7] and Y[0:7] includes elements of a plurality of columns or a plurality of rows and columns. Hereinafter, the elements of the first to eighth rows may be described as first to eighth elements, respectively.

The PIM device 1400 may include a plurality of MAC units. One MAC unit may include a plurality of first storage regions and an MAC operator MAC. The plurality of first storage regions may be memory banks for storing data. The plurality of first storage regions may include a plurality of memory banks. The MAC operator MAC may be coupled to the plurality of memory banks, and may perform an arithmetic operation on data that is output from the plurality of memory banks. The MAC operator MAC may store result data of the arithmetic operation in a memory bank. For example, in order to perform the element-wise addition operation, one MAC operator MAC may be coupled to at least two memory banks. The at least two memory banks and the MAC operator MAC may configure one MAC unit. In FIG. 47, first and second memory banks BK0 and BK1 are illustrated, and the first and second memory banks BK0 and BK1 and the MAC operator MAC may configure one MAC unit. However, the present disclosure is not limited thereto, and the number of memory banks configuring one MAC unit may be variously changed. Each of the first and second memory banks BK0 and BK1 may include a plurality of rows and a plurality of columns, and a plurality of memory cells may be coupled to points at which the plurality of rows and the plurality of columns intersect with each other.

In order to perform the element-wise addition operation, the first matrix A[0:7] and the second matrix B[0:7] may be merged, and a merge matrix AB[0:15] may be generated as the first and second matrices A[0:7] and B[0:7] are merged. The merge matrix AB[0:15] may include elements which are obtained as elements with the same orders among the elements of the first and second matrices A[0:7] and B[0:7] are merged. By the merging, the first element '1' of the first matrix A[0:7] may become a first element of the merge matrix AB[0:15], and the first element '2' of the second matrix B[0:7] may become a second element of the merge matrix AB[0:15]. The second element '2' of the first matrix A[0:7] may become a third element of the merge matrix AB[0:15], and the second element '3' of the second matrix B[0:7] may become a fourth element of the merge matrix AB[0:15]. The third element '3' of the first matrix A[0:7] may become a fifth element of the merge matrix AB[0:15], and the third element '4' of the second matrix B[0:7] may become a sixth element of the merge matrix AB[0:15]. The fourth element '4' of the first matrix A[0:7] may become a seventh element of the merge matrix AB[0:15], and the fourth element '5' of the second matrix B[0:7] may become an eighth element of the merge matrix AB[0:15]. The fifth element '5' of the first matrix A[0:7] may become a ninth element of the merge matrix AB[0:15], and the fifth element '6' of the second matrix B[0:7] may become a tenth element of the merge matrix AB[0:15]. The sixth element '6' of the first matrix A[0:7] may become an eleventh element of the merge matrix AB[0:15], and the sixth element '7' of the second matrix B[0:7] may become a twelfth element of the merge matrix AB[0:15]. The seventh element '7' of the first matrix A[0:7] may become a thirteenth element of the merge matrix AB[0:15], and the seventh element '8' of the second matrix B[0:7] may become a fourteenth element of the merge matrix AB[0:15]. The eighth element '8' of the first matrix A[0:7] may become a fifteenth element of the merge matrix AB[0:15], and the eighth element '9' of the second matrix B[0:7] may become a sixteenth element of the merge matrix AB[0:15].

The merge matrix AB[0:15] may be generated by an external device (not illustrated) which communicates with the PIM device 1400. The external device may be controlled to generate the merge matrix AB[0:15] by merging the first and second matrices A[0:7] and B[0:7] and to transmit data that corresponds to the elements of the merge matrix AB[0:15] to the PIM device 1400, so that the PIM device 1400 may store the data that corresponds to the elements of the merge matrix AB[0:15]. Alternatively, in an embodiment, the merge matrix AB[0:15] may be generated by a control circuit (not illustrated) included in the PIM device 1400. The control circuit may be programmed with software for generating the merge matrix AB[0:15] by merging the first and second matrices A[0:7] and B[0:7]. The control circuit may receive data that corresponds to the elements of the first and second matrices A[0:7] and B[0:7] from the external device, and may generate a series of data that corresponds to the elements of the merge matrix AB[0:15] by merging the received data.

The PIM device 1400 may store data, corresponding to the first to sixteenth elements '1,' '2,' '2,' '3,' '3,' '4,' '4,' '5,' '5,' '6,' '6,' '7,' '7,' '8,' '8' and '9' of the merge matrix AB[0:15], in the first memory bank BK0. The PIM device 1400 may independently store elements with the same order (that is, a pair of elements with the same order) of the first and second matrices A[0:7] and B[0:7] among the elements of the merge matrix AB[0:15], in a storage space which can be read based on a single command signal. For example, the PIM device 1400 may store the first and second elements '1' and '2' of the merge matrix AB[0:15], corresponding to the first elements of the first and second matrices A[0:7] and B[0:7], in a first storage space S11 of the first memory bank BK0, may store the third and fourth elements '2' and '3' of the merge matrix AB[0:15], corresponding to the second elements of the first and second matrices A[0:7] and B[0:7], in a second storage space S12 of the first memory bank BK0, and may store the fifth and sixth elements '3' and '4' of the merge matrix AB[0:15], corresponding to the third elements of the first and second matrices A[0:7] and B[0:7], in a third storage space S13 of the first memory bank BK0. Although not illustrated, elements of the merge matrix AB[0:15] corresponding to elements with the same order of the first and second matrices A[0:7] and B[0:7] may be independently stored in an allocated storage space of the first memory bank BK0.

The PIM device 1400 may read data that is stored in the first memory bank BK0, and may provide the read data to the MAC operator MAC. The PIM device 1400 may control data, corresponding to the elements with the same orders of the first and second matrices A[0:7] and B[0:7], to be sequentially output from the first memory bank BK0. The PIM device 1400 may read data that is stored in one of a plurality of storage spaces of the first memory bank BK0, during an operation that is performed based on a single command signal. For example, during a first operation that is performed based on the single command signal, the PIM device 1400 may output data that is stored in the first storage space S11 among data that is stored in the first memory bank BK0. Thereafter, during a second operation that is performed based on the single command signal, the PIM device 1400 may output data that is stored in the second storage space S12 among the data that is stored in the first memory bank BK0. Thereafter, during a third operation that is performed based on the single command signal, the PIM device 1400 may output data that is stored in the third storage space S13 among the data that is stored in the first memory bank BK0. The PIM device 1400 may control data that corresponds to the respective fourth to eighth elements of the first and second matrices A[0:7] and B[0:7] and corresponding to elements of the merge matrix AB[0:15], to be sequentially output from the first memory bank BK0.

The MAC operator MAC may perform an arithmetic operation on data that is output from the first memory bank BK0. The MAC operator MAC may add data that is output from the first memory bank BK0. The MAC operator MAC may sequentially add data that is output from the first memory bank BK0. The MAC operator MAC may receive the data, stored in the first storage space S11, from the first memory bank BK0, and may generate arithmetic data by adding the received data. The arithmetic data may be data that corresponds to the first element '3' of the third matrix Y[0:7]. The MAC operator MAC may receive the data, stored in the second storage space S12, from the first memory bank BK0, and may generate arithmetic data by adding the received data. The arithmetic data may be data that corresponds to the second element '5' of the third matrix Y[0:7]. The MAC operator MAC may receive the data, stored in the third storage space S13, from the first memory bank BK0, and may generate arithmetic data by adding the received data. The arithmetic data may be data that corresponds to the third element '7' of the third matrix Y[0:7]. In the same manner, the MAC operator MAC may sequentially receive data that is stored in a plurality of storage spaces of the first memory bank BK0 (that is, data that corresponds to the seventh and eighth elements, the ninth and tenth elements, the eleventh and twelfth elements, the thirteenth and fourteenth elements, and the fifteenth and sixteenth elements of the merge matrix AB[0:15]), and may generate a plurality of arithmetic data by adding the received data. The plurality of arithmetic data may be data that corresponds to the fourth to eighth elements '9,' '11,' '13,' '15' and '17' of the third matrix Y[0:7].

The MAC operator MAC may provide the arithmetic data to the second memory bank BK1, and the arithmetic data may be written into the second memory bank BK1. The second memory bank BK1 may sequentially receive the arithmetic data, corresponding to the first to eighth elements '3,' '5,' '7,' '9,' '11,' '13,' '15' and '17' of the third matrix Y[0:7], from the MAC operator MAC, and the arithmetic data may be sequentially stored in the second memory bank BK1. The PIM device 1400 may complete the element-wise arithmetic operation by writing the arithmetic data to the second memory bank BK1.

The PIM device 1400 may independently store the elements of the third matrix Y[0:7] in storage spaces of the second memory bank BK1 corresponding to the storage spaces in which the elements of the merge matrix AB[0:15] are independently stored in the first memory bank BK0. For example, the PIM device 1400 may store arithmetic data, corresponding to the first element '3' of the third matrix Y[0:7], in a first storage space S21 of the second memory bank BK1, may store arithmetic data, corresponding to the second element '5' of the third matrix Y[0:7], in a second storage space S22 of the second memory bank BK1, and may store arithmetic data, corresponding to the third element '7' of the third matrix Y[0:7], in a third storage space S23 of the second memory bank BK1. The first to third storage spaces S11, S12, S13, S21, S22 and S23 of the first and second memory banks BK0 and BK1 may be specified as a row with the same order and columns with the same orders. For example, when data that corresponds to the elements of the merge matrix AB[0:15] are stored in a first row of the first memory bank BK0, the elements of the third matrix Y[0:7] may be stored in a first row of the second memory bank BK1. When the first and second elements of the merge matrix AB[0:15] are stored in a first column that is coupled to the first row, the first element of the third matrix Y[0:7] may be stored in a first column that is coupled to the first row of the second memory bank BK1. When the third and fourth elements of the merge matrix AB[0:15] are stored in a second column that is coupled to the first row, the second element of the third matrix Y[0:7] may be stored in a second column that is coupled to the first row of the second memory bank BK1. In the same manner, the fifth and sixth elements of the merge matrix AB[0:15] and the third element of the third matrix Y[0:7] may be stored in third columns that are coupled to the first rows of the first and second memory banks BK0 and BK1, and the seventh and eighth elements of the merge matrix AB[0:15] and the fourth element of the third matrix Y[0:7] may be stored in fourth columns that are coupled to the first rows of the first and second memory banks BK0 and BK1. The ninth and tenth elements of the merge matrix AB[0:15] and the fifth element of the third matrix Y[0:7] may be stored in fifth columns that are coupled to the first rows of the first and second memory banks BK0 and BK1, and the eleventh and twelfth elements of the merge matrix AB[0:15] and the sixth element of the third matrix Y[0:7] may be stored in sixth columns that are coupled to the first rows of the first and second memory banks BK0 and BK1. The thirteenth and fourteenth elements of the merge matrix AB[0:15] and the seventh element of the third matrix Y[0:7] may be stored in seventh columns that are coupled to the first rows of the first and second memory banks BK0 and BK1, and the fifteenth and sixteenth elements of the merge matrix AB[0:15] and the eighth element of the third matrix Y[0:7] may be stored in eighth columns that are coupled to the first rows of the first and second memory banks BK0 and BK1. Each of the first to eighth columns may include a plurality of columns.

Figure 48:
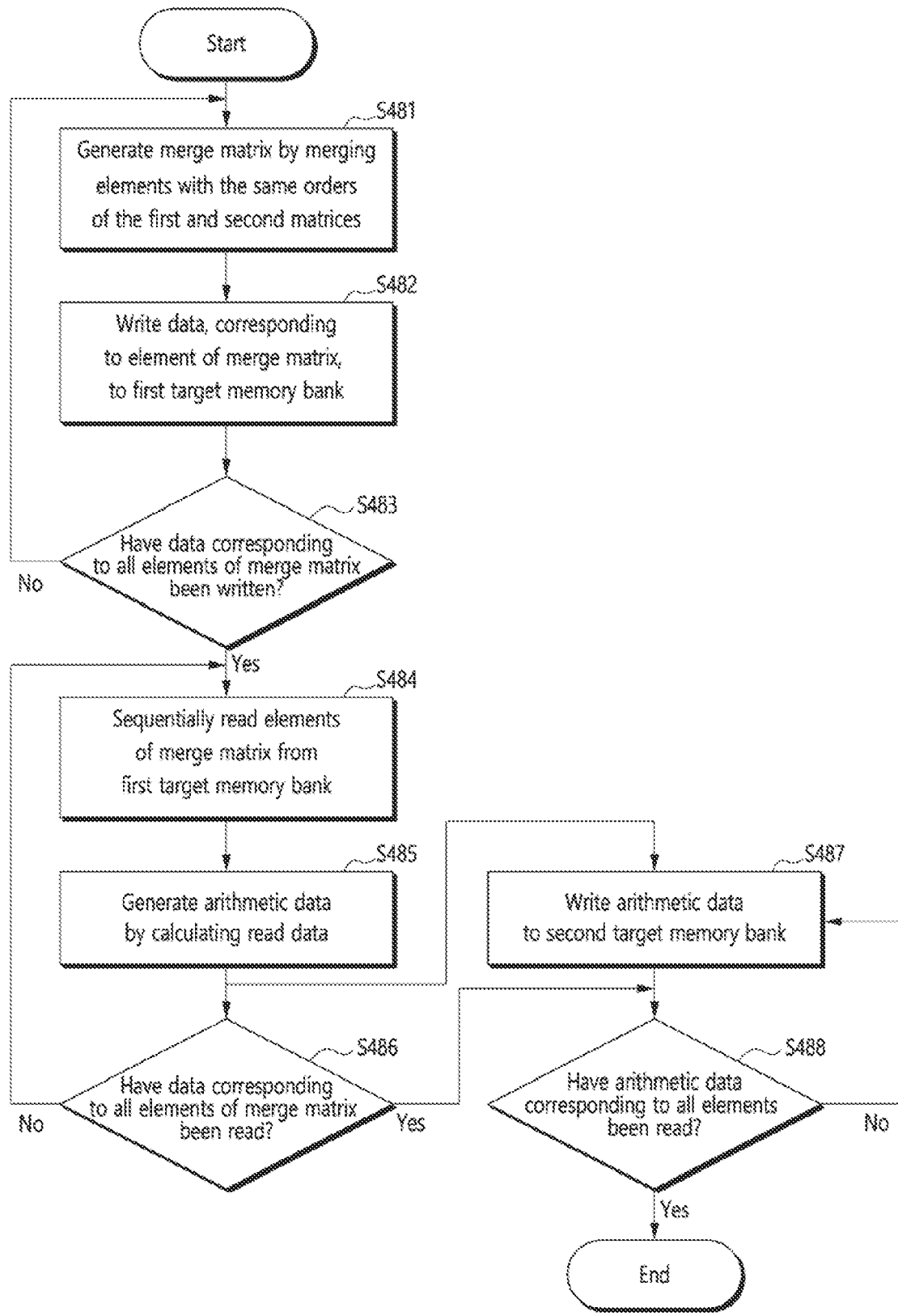
FIG. 48 is a flow chart illustrating an operation method of a PIM device in accordance with an embodiment of the present disclosure.

FIG. 48 is a flow chart illustrating an operation method of the PIM device 1400 in accordance with an embodiment of the present disclosure. The operation method of the PIM device 1400 will be described below with reference to FIGS. 47 and 48. In order for the PIM device 1400 to perform an element-wise arithmetic operation, at step S481, the merge matrix AB[0:15] may be generated as the elements with the same orders of the first matrix A[0:7] and the second matrix B[0:7 are merged by the external device or the control circuit. Pairs of elements with the same orders of the first and second matrices A[0:7] and B[0:7] may sequentially configure the elements of the merge matrix AB[0:15]. At step S482, the PIM device 1400 may receive data that corresponds to elements of the merge matrix AB[0:15], and may write the data to a first target memory bank. The first target memory bank may be the first memory bank BK0. The PIM device 1400 may activate the first target memory bank and enable a specific row (e.g., a first row) of the first target memory bank. The PIM device 1400 may access a first column that is coupled to the first row, and may write the first and second elements '1' and '2' of the merge matrix AB[0:15] to the first storage space S11 which is specified by the first row and the first column. At step S483, the PIM device 1400 may determine whether all the elements of the merge matrix AB[0:15] have been written into the first target memory bank. If all the elements of the merge matrix AB[0:15] have not been written (No of the step S483), the steps S481 and S482 may be repeatedly performed, and the PIM device 1400 may sequentially write data, corresponding to elements of the merge matrix AB[0:5], to the first target memory bank. The PIM device 1400 may sequentially access second to eighth columns that are coupled to the first row of the first target memory bank, and may sequentially write data, corresponding to elements of the merge matrix AB[0:15], to a plurality of storage spaces specified by the first row and the second to eighth columns. If all the elements of the merge matrix AB[0:15] have been written (Yes of the step S483), the process may proceed to step S484.

At the step S484, the PIM device 1400 may sequentially read the elements of the merge matrix AB[0:15] from the first target memory bank. The PIM device 1400 may activate the first target memory bank, and may enable a specific row of the first target memory bank. Also, the PIM device 1400 may activate a second target memory bank, and may enable a specific row of the second target memory bank. The second target memory bank may be the second memory bank BK1. The second target memory bank may be activated simultaneously with the first target memory bank, or may be sequentially activated after the first target memory bank is activated. The PIM device 1400 may sequentially access columns of the first target memory bank, and may read data, corresponding to the elements of the merge matrix AB[0:15], from storage spaces specified by the row and the columns.

At step S485, the PIM device 1400 may generate arithmetic data by performing an arithmetic operation on data that is read from the first target memory bank. The PIM device 1400 may generate the arithmetic data by adding data that corresponds to two elements among the elements of the merge matrix AB[0:15] read from the first memory bank BK0. The arithmetic data, as a result of calculating data, corresponding to the first and second elements of the merge matrix AB[0:15], by the PIM device 1400, may be the first element of the third matrix Y[0:7]. At step S486, the PIM device 1400 may determine whether data that corresponds to all the elements of the merge matrix AB[0:15] have been read. If data that corresponds to all the elements have not been read (No of the step S486), the steps S484 and S485 may be repeatedly performed. The PIM device 1400 may sequentially read data, corresponding to the third to sixteenth elements of the merge matrix AB[0:15], from the first memory bank BK0, and may generate arithmetic data by performing an arithmetic operation on the read data. The arithmetic data may be the second to eighth elements, respectively, of the third matrix Y[0:7]. If data that corresponds to all the elements have been read (Yes of the step S486), the process may proceed to step S488 to be described below.

Step S487 may be performed in parallel with the step S486. At the step S487, the PIM device 1400 may provide the arithmetic data, generated at the step S485, to the second target memory bank, and may write the arithmetic data to the second target memory bank. At the step S488, the PIM device 1400 may determine whether arithmetic data for all the elements of the merge matrix AB[0:15] (that is, all the elements of the third matrix Y[0:7]) have been written into the second target memory bank. If arithmetic data that corresponds to all the elements of the third matrix Y[0:7] have not been written into the second target memory bank (No of the step S488), the steps S487 and S488 may be repeatedly performed. Each time arithmetic data are sequentially generated at the step S487, the PIM device 1400 may sequentially write the arithmetic data to the second target memory bank. The arithmetic data may be stored, in the second memory bank BK1, in storage spaces corresponding to the storage spaces of the first memory bank BK0, in which the elements of the merge matrix AB[0:15] are stored. Arithmetic data (that is, the first element of the third matrix Y[0:7]) that is generated by adding the first and second elements of the merge matrix AB[0:15] may be stored in the first storage space S21 specified by a first row and a first column of the second target memory bank. Arithmetic data (that is, the second to eighth elements of the third matrix Y[0:7]) generated by adding the third to sixteenth elements of the merge matrix AB[0:15] may be stored in storage spaces specified by second to eighth columns that are coupled to the first row of the second target memory bank. If arithmetic data for all the elements have been written into the second target memory bank (Yes of the step S488), the element-wise arithmetic operation of the PIM device 1400 may be ended.

Figure 49:
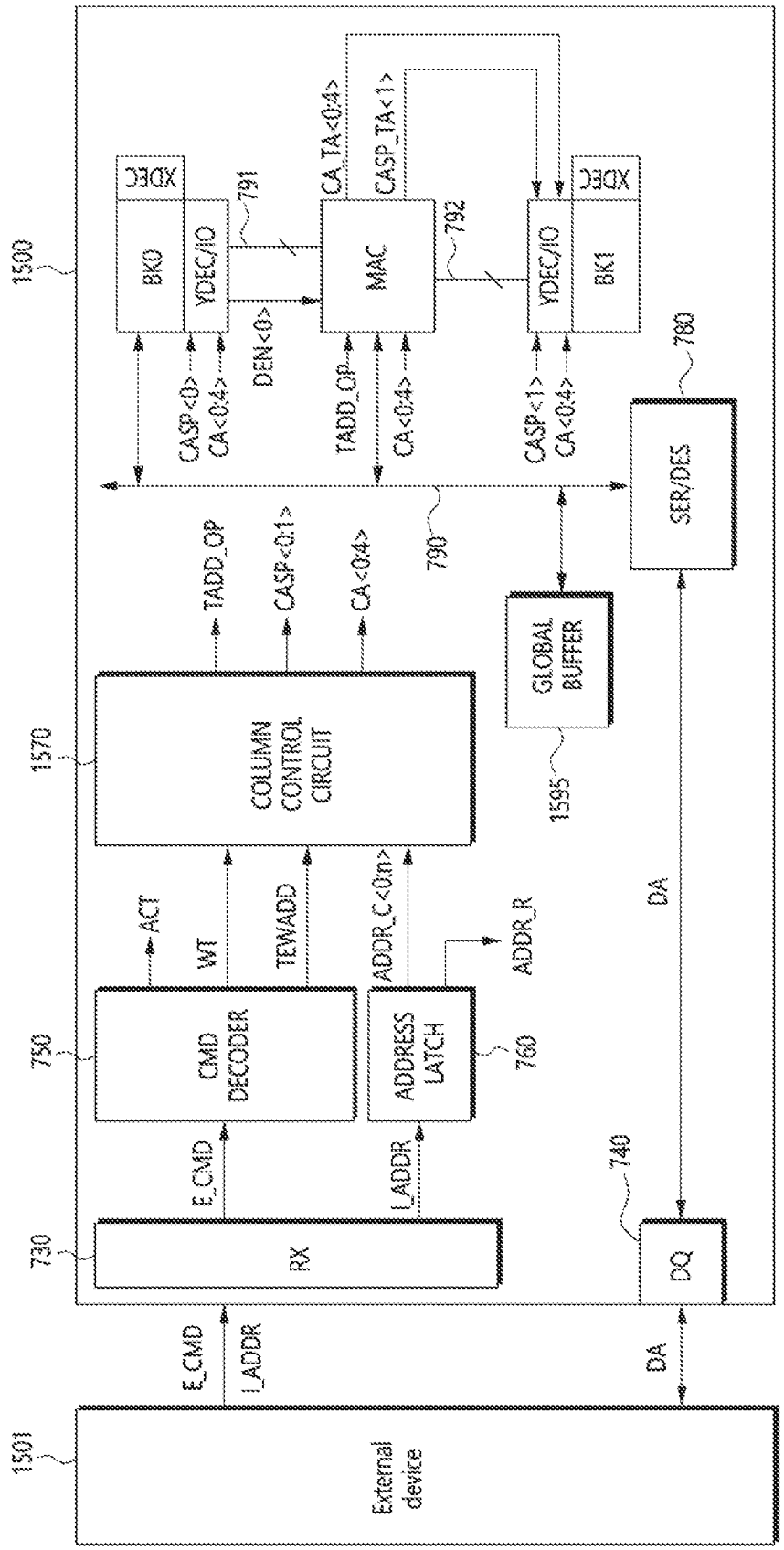
FIG. 49 is a diagram illustrating a configuration of a PIM device in accordance with an embodiment of the present disclosure and an external device coupled to the PIM device.

FIG. 49 is a diagram illustrating a configuration of a PIM device 1500 in accordance with an embodiment of the present disclosure and an external device 1501 coupled to the PIM device 1500. The PIM device 1500 may include the same or similar components as or to those of the PIM device 700A illustrated in FIG. 33, and repeated descriptions for the same components will be omitted herein. Referring to FIG. 49, the PIM device 1500 may perform an arithmetic operation by being coupled to the external device 1501. The PIM device 1500 may receive an external command signal E_CMD, an input address signal I_ADDR and data DA from the external device 1501, and may perform an arithmetic operation on the received data. The PIM device 1500 may output arithmetic data, generated through the arithmetic operation, to the external device 1501.

Referring to FIG. 49, the PIM device 1500 may include an MAC unit. The MAC unit may include a plurality of memory banks and an MAC operator MAC. The MAC unit may include at least a first memory bank BK0 and a second memory bank BK1. Each of the first and second memory banks BK0 and BK1 may include a Y-decoder/I/O circuit YDEC/IO and an X-decoder XDEC. Each of the first and second memory banks BK0 and BK1 may be accessed through the X-decoder XDEC and the Y-decoder/I/O circuit YDEC/IO. The first memory bank BK0 may be accessed based on a first bank access control signal CASP<0> and a bank column address signal CA<0:4>. The first bank access control signal CASP<0> and the bank column address signal CA<0:4> may be provided to the Y-decoder/I/O circuit YDEC/IO of the first memory bank BK0. The second memory bank BK1 may be accessed based on a second bank access control signal CASP<1> and the bank column address signal CA<0:4>. The second bank access control signal CASP<1> and the bank column address signal CA<0:4> may be provided to the Y-decoder/I/O circuit YDEC/IO of the second memory bank BK1. In the MAC unit, it may be prescribed that data that corresponds to an element of a merge matrix is stored in the first memory bank BK0. In the MAC unit, it may be prescribed that arithmetic data generated through an arithmetic operation on elements of the merge matrix (i.e., data that corresponds to elements of a third matrix) are stored in the second memory bank BK1.

The MAC operator MAC may be coupled to the first and second memory banks BK0 and BK1. The MAC operator MAC may be coupled to the first and second memory banks BK0 and BK1 through bank I/O lines 791 and 792. The MAC operator MAC may be coupled to the first memory bank BK0 through a first bank I/O line 791. The MAC operator MAC may be coupled to the second memory bank BK1 through a second bank I/O line 792. The MAC operator MAC may receive data, output from the first memory bank BK0, through the first bank I/O line 791, and may output arithmetic data, generated by an arithmetic operation, to the second memory bank BK1 through the second bank I/O line 792. The MAC operator MAC may perform an arithmetic operation on data that is output from the first memory bank BK0. In general, the MAC operator MAC may perform both multiplication and addition calculations. In order to allow the PIM device 1500 to perform an element-wise addition operation, the MAC operator MAC may perform only an addition calculation on data that is output from the first memory bank BK0.

For example, the bank column address signal CA<0:4> may be a 5-bit signal, and one element may be mapped as 16-bit data. During a single write operation or a single read operation of the PIM device 1500, the PIM device 1500 may write 256-bit data to the first memory bank BK0 or read 256-bit data from the first memory bank BK0, based on the bank column address signal CA<0:4>. Two elements of the merge matrix may be mapped as total 32-bit data. Accordingly, the PIM device 1500 may perform an element-wise arithmetic operation on total 8 pairs of matrices. When the PIM device 1500 performs an element-wise arithmetic operation on two matrices, 32-bit data that corresponds to two elements of the merge matrix may be written into the first memory bank BK0 through a single write operation, and the remaining 224-bit data may be written as 0. Among 256 bits that are output from the first memory bank BK0 during a single read operation, 32-bit data may be data to which two elements of the merge matrix are mapped, and the remaining 224-bit data may be 0. However, the number of bits of data for mapping one element and the total number of bits of data to be stored in and output from the first and second memory banks BK0 and BK1 may be variously changed.

The PIM device 1500 may include a column control circuit 1570 which controls the MAC unit to perform an element-wise arithmetic operation. The column control circuit 1570 may generate various control signals so that the MAC unit of the PIM device 1500 may perform an element-wise arithmetic operation. The column control circuit 1570 may receive a calculation signal TEWADD and a column address signal ADDR_C<0:n> (n is an arbitrary integer), and may generate an arithmetic operation signal TADD_OP, the bank access control signals CASP<0:1> and the bank column address signal CA<0:4> based on the calculation signal TEWADD and the column address signal ADDR_C<0:n>. The column control circuit 1570 may enable the first bank access control signal CASP<0> of the bank access control signals CASP<0:1> and the arithmetic operation signal TADD_OP based on the calculation signal TEWADD. The column control circuit 1570 may output at least a part of the column address signal ADDR_C<0:n> as the bank column address signal CA<0:4>. For example, the bank column address signal CA<0:4> may be a 5-bit signal.

The MAC operator MAC may receive the arithmetic operation signal TADD_OP from the column control circuit 1570. The MAC operator MAC may generate a delayed bank access control signal CASP_TA<1> based on the arithmetic operation signal TADD_OP and the first bank access control signal CASP<0>. The MAC operator MAC may generate a delayed column address signal CA_TA<0:4> based on the bank column address signal CA<0:4>. The MAC operator MAC may provide the delayed bank access control signal CASP_TA<1> and the delayed column address signal CA_TA<0:4> to the second memory bank BK1. The second memory bank BK1 may be accessed based on the delayed bank access control signal CASP_TA<1> and the delayed column address signal CA_TA<0:4>. When the PIM device 1500 performs an element-wise addition operation, the second memory bank BK1 may be accessed based on the delayed bank access control signal CASP_TA<1> and the delayed column address signal CA_TA<0:4> instead of the second bank access control signal CASP<1> and the bank column address signal CA<0:4>.

The Y-decoder/I/O circuit YDEC/IO of the first memory bank BK0 may generate a first data enable signal DEN<0> based on the first bank access control signal CASP<0>. The Y-decoder/I/O circuit YDEC/IO of the first memory bank BK0 may generate the first data enable signal DEN<0> by delaying the first bank access control signal CASP<0>. The Y-decoder/I/O circuit YDEC/IO of the first memory bank BK0 may provide the first data enable signal DEN<0> to the MAC operator MAC. The MAC operator MAC may further receive the first data enable signal DEN<0>. The MAC operator MAC may generate the delayed bank access control signal CASP_TA<1> based on the arithmetic operation signal TADD_OP and the first data enable signal DEN<0>. The MAC operator MAC may generate the delayed column address signal CA_TA<0:4> based on the arithmetic operation signal ADD_OP, the first data enable signal DEN<0> and the bank column address signal CA<0:4>.

The PIM device 1500 may further include a receiving driver (RX) 730, a data I/O circuit (DQ) 740, a command decoder (CMD DECODER) 750, an address latch 760, a serializer/deserializer (SER/DES) 780, and a global buffer 1595. When the external command signal E_CMD has information for performing an element-wise arithmetic operation, the command decoder 750 may generate the calculation signal TEWADD by decoding the external command signal E_CMD. For example, when the external command signal E_CMD has information for performing an element-wise addition operation, the command decoder 750 may generate the calculation signal TEWADD by decoding the external command signal E_CMD. The global buffer 1595 may be coupled to the first and second memory banks BK0 and BK1 and the MAC operator MAC through a global I/O line 790. The global buffer 1595 may provide data to the first and second memory banks BK0 and BK1, and may store data that is output from the first and second memory banks BK0 and BK1. The global buffer 1595 may provide data used for an arithmetic operation of the MAC operator MAC, and may store arithmetic data generated from the MAC operator MAC. The global buffer 1595 may receive the arithmetic operation signal TADD_OP. The global buffer 1595 may provide preset data to the MAC operator MAC based on the arithmetic operation signal TADD_OP. Descriptions will be made later for the preset data.

Figure 50:
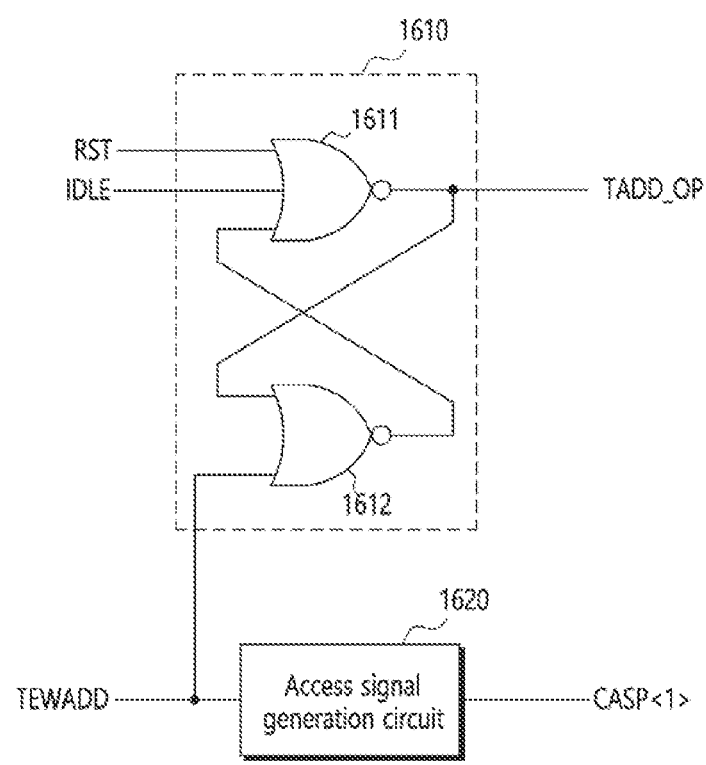
FIG. 50 is a diagram illustrating at least a part of components of a column control circuit illustrated in FIG. 49.

FIG. 50 is a diagram illustrating at least a part of components of the column control circuit 1570 illustrated in FIG. 49. Referring to FIG. 50, the column control circuit 1570 may include an arithmetic operation signal generation circuit 1610 and an access signal generation circuit 1620. The arithmetic operation signal generation circuit 1610 may receive the calculation signal TEWADD, and may generate the arithmetic operation signal TADD_OP based on the calculation signal TEWADD. The arithmetic operation signal generation circuit 1610 may further receive a reset signal RST and an idle signal IDLE. The arithmetic operation signal generation circuit 1610 may generate the arithmetic operation signal TADD_OP based on the calculation signal TEWADD, the reset signal RST and the idle signal IDLE. The arithmetic operation signal generation circuit 1610 may enable the arithmetic operation signal TADD_OP when the calculation signal TEWADD is enabled in a state in which the reset signal RST and the idle signal IDLE are disabled. The arithmetic operation signal generation circuit 1610 may disable the arithmetic operation signal TADD_OP when one of the reset signal RST and the idle signal IDLE is enabled in a state in which the arithmetic operation signal TADD_OP is enabled.

The arithmetic operation signal generation circuit 1610 may be configured by a NOR type RS latch. The arithmetic operation signal generation circuit 1610 may include a first NOR gate 1611 and a second NOR gate 1612. A first input terminal of the first NOR gate 1611 may receive the reset signal RST, a second input terminal of the first NOR gate 1611 may receive the idle signal IDLE, and a third input terminal of the first NOR gate 1611 may receive a signal output from an output terminal of the second NOR gate 1612. The arithmetic operation signal TADD_OP may be output through an output terminal of the first NOR gate 1611. A first input terminal of the second NOR gate 1612 may receive the arithmetic operation signal TADD_OP, and a second input terminal of the second NOR gate 1612 may receive the calculation signal TEWADD. The output terminal of the second NOR gate 1612 may be coupled to the third input terminal of the first NOR gate 1611. When the calculation signal TEWADD is enabled to a logic high level in a state in which the reset signal RST and the idle signal IDLE are disabled to logic low levels, a signal with a logic low level may be input to the third input terminal of the first NOR gate 1611, and thus, the arithmetic operation signal TADD_OP may be enabled to a logic high level. In a state in which the arithmetic operation signal TADD_OP is enabled to a logic high level, when at least one of the reset signal RST and the idle signal IDLE is enabled to a logic high level, the arithmetic operation signal TADD_OP may be disabled to a logic low level.

The access signal generation circuit 1620 may receive the calculation signal TEWADD, and may generate the first bank access control signal CASP<0> based on the calculation signal TEWADD. When the calculation signal TEWADD is enabled, the access signal generation circuit 1620 may enable the first bank access control signal CASP<0>. By enabling the first bank access control signal CASP<0>, the access signal generation circuit 1620 may cause the first memory bank BK0 to be accessed.

Figure 51:
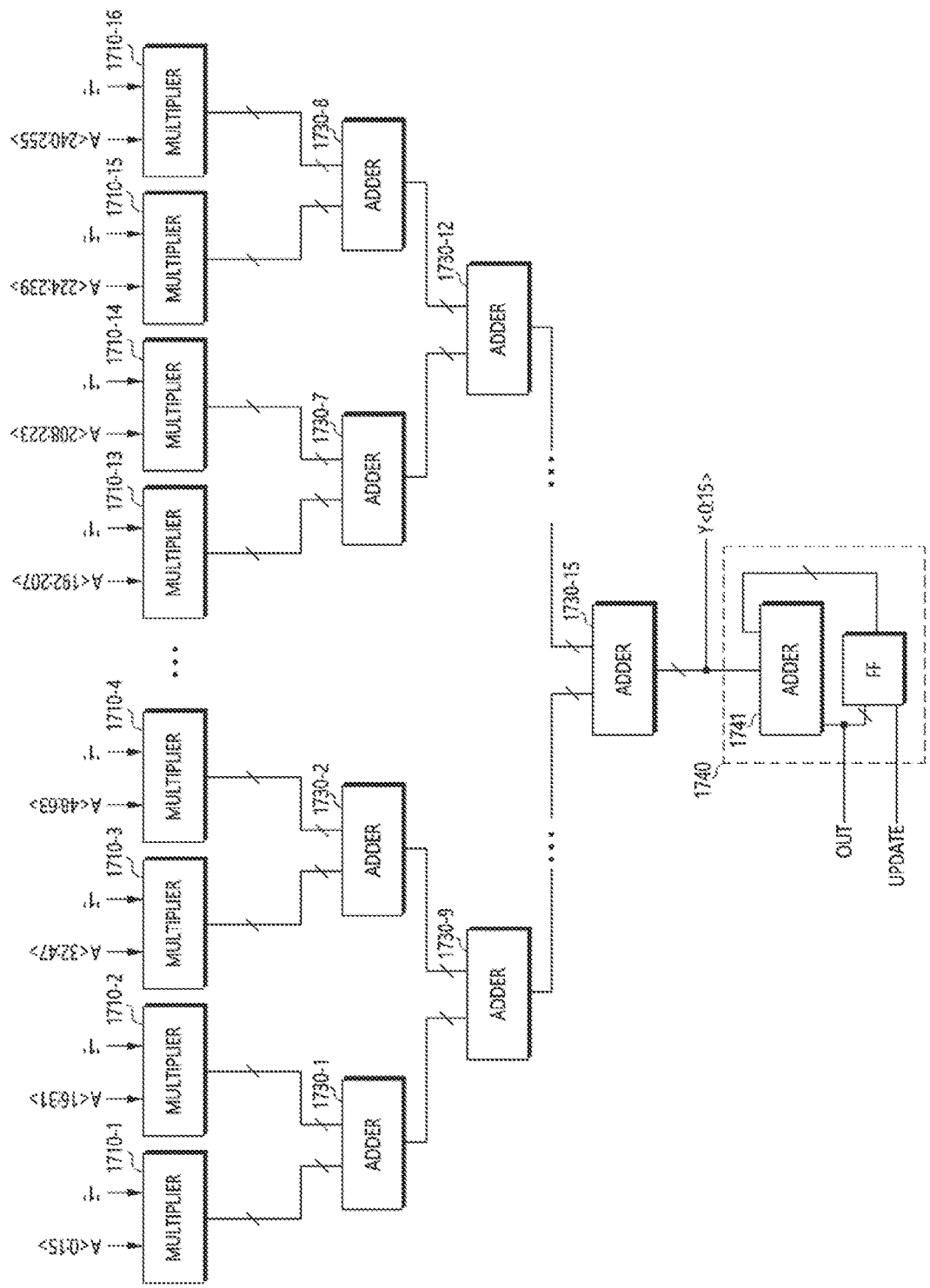
FIG. 51 is a diagram illustrating a configuration of an arithmetic circuit among components of an MAC operator illustrated in FIG. 49.

FIG. 51 is a diagram illustrating a configuration of an arithmetic circuit 1700 among components of the MAC operator MAC illustrated in FIG. 49. Referring to FIG. 51, the arithmetic circuit 1700 may perform a multiplication-accumulative addition calculation on input data, and may output a multiplication-accumulative addition calculation result. The arithmetic circuit 1700 may include a plurality of multipliers, a plurality of adders and an accumulator. Each of the plurality of multipliers may receive allocated data, and the number of the plurality of multipliers may vary depending on the number of bits of the allocated data. For example, the MAC operator MAC may include 16 multipliers to each perform an arithmetic operation on 16 elements. A first multiplier 1710-1 may receive first to sixteenth bit data A<0:15> output from the first memory bank BK0 and first to sixteenth bit data that is output from a memory bank different from the first memory bank BK0 or the global buffer 1595. The first multiplier 1710-1 may multiply the first to sixteenth bit data A<0:15> that is output from the first memory bank BK0 and the data that is output from the different memory bank or the global buffer 1595. A second multiplier 1710-2 may receive seventeenth to 32^nd bit data A<16:31> that is output from the first memory bank BK0 and seventeenth to 32^nd bit data that is output from the different memory bank or the global buffer 1595, and may multiply the seventeenth to 32^nd bit data A<16:31> that is output from the first memory bank BK0 and the seventeenth to 32^nd bit data that is output from the different memory bank or the global buffer 1595. A third multiplier 1710-3 may receive 33^nd to 48^th bit data A<32:47> that is output from the first memory bank BK0 and 33^rd to 48^th bit data that is output from the different memory bank or the global buffer 1595, and may multiply the 33^rd to 48^th bit data A<32:47> that is output from the first memory bank BK0 and the 33^rd to 48^th bit data that is output from the different memory bank or the global buffer 1595. A fourth multiplier 1710-4 may receive 49^th to 64^th bit data A<48:63> that is output from the first memory bank BK0 and 49^th to 64^th bit data that is output from the different memory bank or the global buffer 1595, and may multiply the 49^th to 64^th bit data A<48:63> that is output from the first memory bank BK0 and the 49^th to 64^th bit data that is output from the different memory bank or the global buffer 1595. A thirteenth multiplier 1710-13 may receive 193^rd to 208^th bit data A<192:207> that is output from the first memory bank BK0 and 193^rd to 208^th bit data that is output from the different memory bank or the global buffer 1595, and may multiply the 193^rd to 208^th bit data A<192:207> that is output from the first memory bank BK0 and the 193^rd to 208^th bit data that is output from the different memory bank or the global buffer 1595. A fourteenth multiplier 1710-14 may receive 209^th to 224^th bit data A<208:223> that is output from the first memory bank BK0 and 209^th to 224^th bit data that is output from the different memory bank or the global buffer 1595, and may multiply the 209^th to 224^th bit data A<208:223> that is output from the first memory bank BK0 and the 209^th to 224^th bit data that is output from the different memory bank or the global buffer 1595. A fifteenth multiplier 1710-15 may receive 225^th to 240^th bit data A<224:239> that is output from the first memory bank BK0 and 225^th to 240^th bit data that is output from the different memory bank or the global buffer 1595, and may multiply the 225^th to 240^th bit data A<224:239> that is output from the first memory bank BK0 and the 225^th to 240^th bit data that is output from the different memory bank or the global buffer 1595. A sixteenth multiplier 1710-16 may receive 241^st to 256^th bit data A<240:255> that is output from the first memory bank BK0 and 241^st to 256^th bit data that is output from the different memory bank or the global buffer 1595, and may multiply the 241^st to 256^th bit data A<240:255> that is output from the first memory bank BK0 and the 241^st to 256^th bit data that is output from the different memory bank or the global buffer 1595. In order to ensure that the arithmetic circuit 1700 performs only an addition operation, the plurality of multipliers 1710-1, 1710-2, 1710-3, 1710-4, . . . , 1710-13, 1710-14, 1710-15, and 1710-16 may receive the data A<0:255> that is output from the first memory bank BK0 and data with the value of '1.' Therefore, the plurality of multipliers 1710-1, 1710-2, 1710-3, 1710-4, . . . , 1710-13, 1710-14, 1710-15, and 1710-16 may output data with the same value as the data A<0:255> that is output from the first memory bank BK0. The global buffer 1595 may receive the arithmetic operation signal TADD_OP, and may provide data with the value of '1' to the plurality of multipliers 1710-1, 1710-2, 1710-3, 1710-4, . . . , 1710-13, 1710-14, 1710-15, and 1710-16, based on the arithmetic operation signal TADD_OP.

The MAC operator MAC may include 15 adders. A first adder 1730-1 may receive data that is output from the first and second multipliers 1710-1 and 1710-2, and may add the data that is output from the first and second multipliers 1710-1 and 1710-2. A second adder 1730-2 may receive data that is output from the third and fourth multipliers 1710-3 and 1710-4, and may add the data that is output from the third and fourth multipliers 1710-3 and 1710-4. A seventh adder 1730-7 may receive data that is output from the thirteenth and fourteenth multipliers 1710-13 and 1710-14, and may add the data that is output from the thirteenth and fourteenth multipliers 1710-13 and 1710-14. An eighth adder 1730-8 may receive data that is output from the fifteenth and sixteenth multipliers 1710-15 and 1710-16, and may add the data that is output from the fifteenth and sixteenth multipliers 1710-15 and 1710-16. The first to eighth adders 1730-1, 1730-2, . . . , 1730-7 and 1730-8 may be floating point adders. A ninth adder 1730-9 may receive data that is output from the first and second adders 1730-1 and 1730-2, and may add the data that is output from the first and second adders 1730-1 and 1730-2. A twelfth adder 1730-12 may receive data that is output from the seventh and eighth adders 1730-7 and 1730-8, and may add the data that is output from the seventh and eighth adders 1730-7 and 1730-8. A fifteenth adder 1730-15 may receive data that is output from thirteenth and fourteenth adders (not illustrated), and may add the data that is output from the thirteenth and fourteenth adders.

An accumulator 1740 may receive and store data that is output from the fifteenth adder 1730-15. The accumulator 1740 may add data, newly output from the fifteenth adder 1730-15, to a stored data value each time an update signal UPDATE is enabled, and may store added data again. The accumulator 1740 may include one adder 1741 and an updater 1742. The adder 1741 may receive data that is output from the fifteenth adder 1730-15, and may store the received data. The adder 1741 may output stored data to the updater 1742. The adder 1741 may receive data that is output from the updater 1742, and may add the data that is output from the updater 1742 and the data that is output from the fifteenth adder 1730-15. The updater 1742 may be implemented by a flip-flop FF. An input terminal of the flip-flop FF may receive an output of the adder 1741, and a clock terminal of the flip-flop FF may receive the update signal UPDATE. An output terminal of the flip-flop FF may be coupled to the adder 1741, and the adder 1741 may receive data that is output through the output terminal of the flip-flop FF. The input terminal of the flip-flop FF may be coupled to an output terminal OUT of the arithmetic circuit 1700. When performing the element-wise addition operation, the arithmetic circuit 1700 may output data, output from the fifteenth adder 1730-15, as the arithmetic data. The arithmetic circuit 1700 may generate arithmetic data Y<0:15> with at least 16 bits each time an addition operation on data that is output from the first memory bank BK0 is performed. For example, the arithmetic circuit 1700 may output data, output from the fifteenth adder 1730-15, as the arithmetic data to the second memory bank BK1 based on the arithmetic operation signal TADD_OP.

Figure 52:
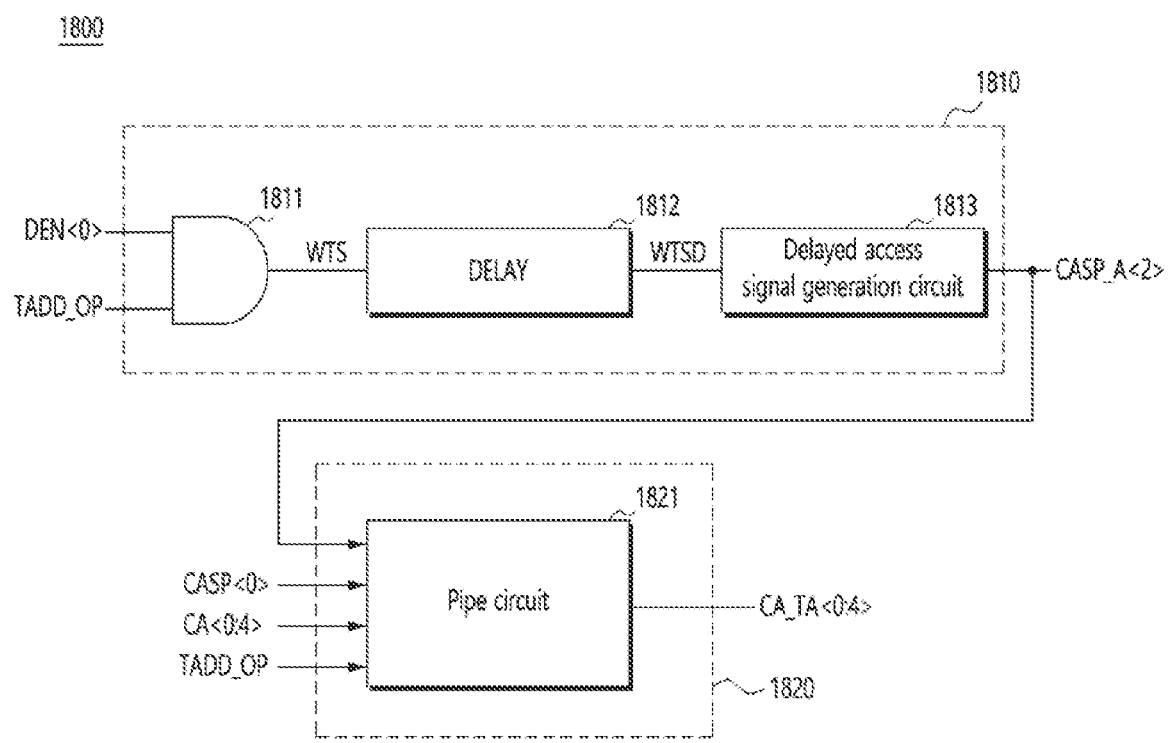
FIG. 52 is a diagram illustrating a part among the components of the MAC operator configured in FIG. 49.

FIG. 52 is a diagram illustrating a part among the components of the MAC operator MAC configured in FIG. 49. Referring to FIG. 52, the MAC operator MAC may include a write control circuit 1800. The write control circuit 1800 may generate control signals for writing arithmetic data, generated through an arithmetic operation of the MAC operator MAC, to the second memory bank BK1. The write control circuit 1800 may generate the delayed bank access control signal CASP_TA<1> and the delayed column address signal CA_TA<0:4> based on the arithmetic operation signal TADD_OP, the first data enable signal DEN<0> and the bank column address signal CA<0:4>.

The write control circuit 1800 may include an access control circuit 1810 and an address control circuit 1820. The access control circuit 1810 may generate the delayed bank access control signal CASP_TA<1> based on the arithmetic operation signal TADD_OP and the first data enable signal DEN<0>. The access control circuit 1810 may generate a write start signal WTS based on the arithmetic operation signal TADD_OP and the first data enable signal DEN<0>, and may generate a delayed write start signal WTSD by delaying the write start signal WTS by a predetermined time. The predetermined time may be a time during which the MAC operator MAC performs an arithmetic operation, and may correspond to a time from after the MAC operator MAC receives data that is output from the first memory bank BK0 to till the MAC operator MAC outputs arithmetic data to the second memory bank BK1. The access control circuit 1810 may generate the delayed bank access control signal CASP_TA<1> each time the delayed write start signal WTSD is generated.

The access control circuit 1810 may include a write start signal generation circuit 1811, a first delay circuit (DELAY) 1812 and a delayed access signal generation circuit 1813. The write start signal generation circuit 1811 may generate the write start signal WTS by receiving the first data enable signal DEN<0> and the arithmetic operation signal TADD_OP. The write start signal generation circuit 1811 may enable the write start signal WTS each time the first data enable signal DEN<0> is enabled in a state in which the arithmetic operation signal TADD_OP is enabled. The write start signal generation circuit 1811 may include an AND gate which outputs the write start signal WTS by AND-gating the first data enable signal DEN<0> and the arithmetic operation signal TADD_OP. The first delay circuit 1812 may generate the delayed write start signal WTSD by delaying the write start signal WTS by the predetermined time. The delayed access signal generation circuit 1813 may receive the delayed write start signal WTSD, and may generate the delayed bank access control signal CASP_TA<1> based on the delayed write start signal WTSD. The delayed access signal generation circuit 1813 may be implemented by a pulse generator.

The address control circuit 1820 may generate the delayed column address signal CA_TA<0:4> by delaying the bank column address signal CA<0:4>. The address control circuit 1820 may receive the arithmetic operation signal TADD_OP, the bank column address signal CA<0:4>, the first bank access control signal CASP<0> and the delayed bank access control signal CASP_TA<1>. The address control circuit 1820 may generate the delayed column address signal CA_TA<0:4> based on the arithmetic operation signal TADD_OP, the bank column address signal CA<0:4>, the first bank access control signal CASP<0> and the delayed bank access control signal CASP_TA<1>. The address control circuit 1820 may sequentially store the bank column address signal CA<0:4> each time the first bank access control signal CASP<0> is enabled in a state in which the arithmetic operation signal TADD_OP is enabled. The address control circuit 1820 may sequentially output the sequentially stored bank column address signal CA<0:4> as the delayed column address signal CA_TA<0:4> each time the delayed bank access control signal CASP_TA<1> is enabled. By sequentially outputting the stored bank column address signal CA<0:4> as the delayed column address signal CA_TA<0:4> each time the delayed bank access control signal CASP_TA<1> is enabled, the address control circuit 1820 may synchronize a point of time at which the delayed bank access control signal CASP_TA<1> is output and a point of time at which the delayed column address signal CA_TA<0:4> is output. When the delayed bank access control signal CASP_TA<1> is first enabled, the address control circuit 1820 may provide the bank column address signal CA<0:4> received when the first bank access control signal CASP<0> is first enabled, as the delayed column address signal CA_TA<0:4>. When the delayed bank access control signal CASP_TA<1> is second enabled, the address control circuit 1820 may provide the bank column address signal CA<0:4> received when the first bank access control signal CASP<0> is second enabled, as the delayed column address signal CA_TA<0:4>. Accordingly, after the predetermined time elapses, a column of the second memory bank BK1 with the same order as a column accessed in the first memory bank BK0 may be accessed.

The address control circuit 1820 may include a pipe circuit 1821. The pipe circuit 1821 may generate the delayed column address signal CA_TA<0:4> based on the arithmetic operation signal TADD_OP, the first bank access control signal CASP<0>, the delayed bank access control signal CASP_TA<1> and the bank column address signal CA<0:4>. The pipe circuit 1821 may generate a plurality of input strobe signals based on the arithmetic operation signal TADD_OP and the first bank access control signal CASP<0>. The pipe circuit 1821 may generate a plurality of output strobe signals based on the delayed bank access control signal CASP_TA<1>. The pipe circuit 1821 may sequentially store the bank column address signal CA<0:4>, input to the pipe circuit 1821, based on the plurality of input strobe signals. The pipe circuit 1821 may sequentially output the bank column address signal CA<0:4> sequentially stored in the pipe circuit 1821, as the delayed column address signal CA_TA<0:4>, based on the plurality of output strobe signals. The pipe circuit 1821 may have substantially the same configuration as the pipe circuit 1021C illustrated in FIG. 43 except a part of input signals.

FIG. 53 is a diagram illustrating a part among components of the Y-decoder/I/O circuit YDEC/IO of the first memory bank BK0 of FIG. 49. Referring to FIG. 53, the Y-decoder/I/O circuit YDEC/IO of the first memory bank BK0 may include a delay circuit 1910. The delay circuit 1910 may receive the first bank access control signal CASP<0>, and may generate the first data enable signal DEN<0> by delaying the first bank access control signal CASP<0>. A delay time of the delay circuit 1910 may correspond to an amount of time between the first bank access control signal CASP<0> being generated and data being output from the first memory bank BK0.

FIG. 54 is a diagram illustrating a part among components of the Y-decoder/I/O circuit YDEC/IO of the second memory bank BK1 of FIG. 49. Referring to FIG. 54, the Y-decoder/I/O circuit YDEC/IO of the second memory bank BK1 may include a first selection circuit 2010 and a second selection circuit 2020. The first selection circuit 2010 may receive the arithmetic operation signal TADD_OP, the bank column address signal CA<0:4>, and the delayed column address signal CA_TA<0:4>, and may output an internal column address signal ICA<0:4>. The first selection circuit 2010 may output one of the bank column address signal CA<0:4> and the delayed column address signal CA_TA<0:4> as the internal column address signal ICA<0:4> based on the arithmetic operation signal TADD_OP. When the arithmetic operation signal TADD_OP is disabled to a logic low level, the first selection circuit 2010 may output the bank column address signal CA<0:4> as the internal column address signal ICA<0:4>. When the arithmetic operation signal TADD_OP is enabled to a logic high level, the first selection circuit 2010 may output the delayed column address signal CA_TA<0:4> as the internal column address signal ICA<0:4>. The second memory bank BK1 may be accessed based on the internal column address signal ICA<0:4>.

The second selection circuit 2020 may receive the arithmetic operation signal TADD_OP, the second bank access control signal CASP<1>, and the delayed bank access control signal CASP_TA<1>, and may output an internal bank access control signal ICASP<1>. The second selection circuit 2020 may output one of the second bank access control signal CASP<1> and the delayed bank access control signal CASP_TA<1> as the internal bank access control signal ICASP<1> based on the arithmetic operation signal TADD_OP. When the arithmetic operation signal TADD_OP is disabled to a logic low level, the second selection circuit 2020 may output the second bank access control signal CASP<1> as the internal bank access control signal ICASP<1>. When the arithmetic operation signal TADD_OP is enabled to a logic high level, the second selection circuit 2020 may output the delayed bank access control signal CASP_TA<1> as the internal bank access control signal ICASP<1>. The second memory bank BK1 may be accessed based on the internal bank access control signal ICASP<1>.

Figure 55:
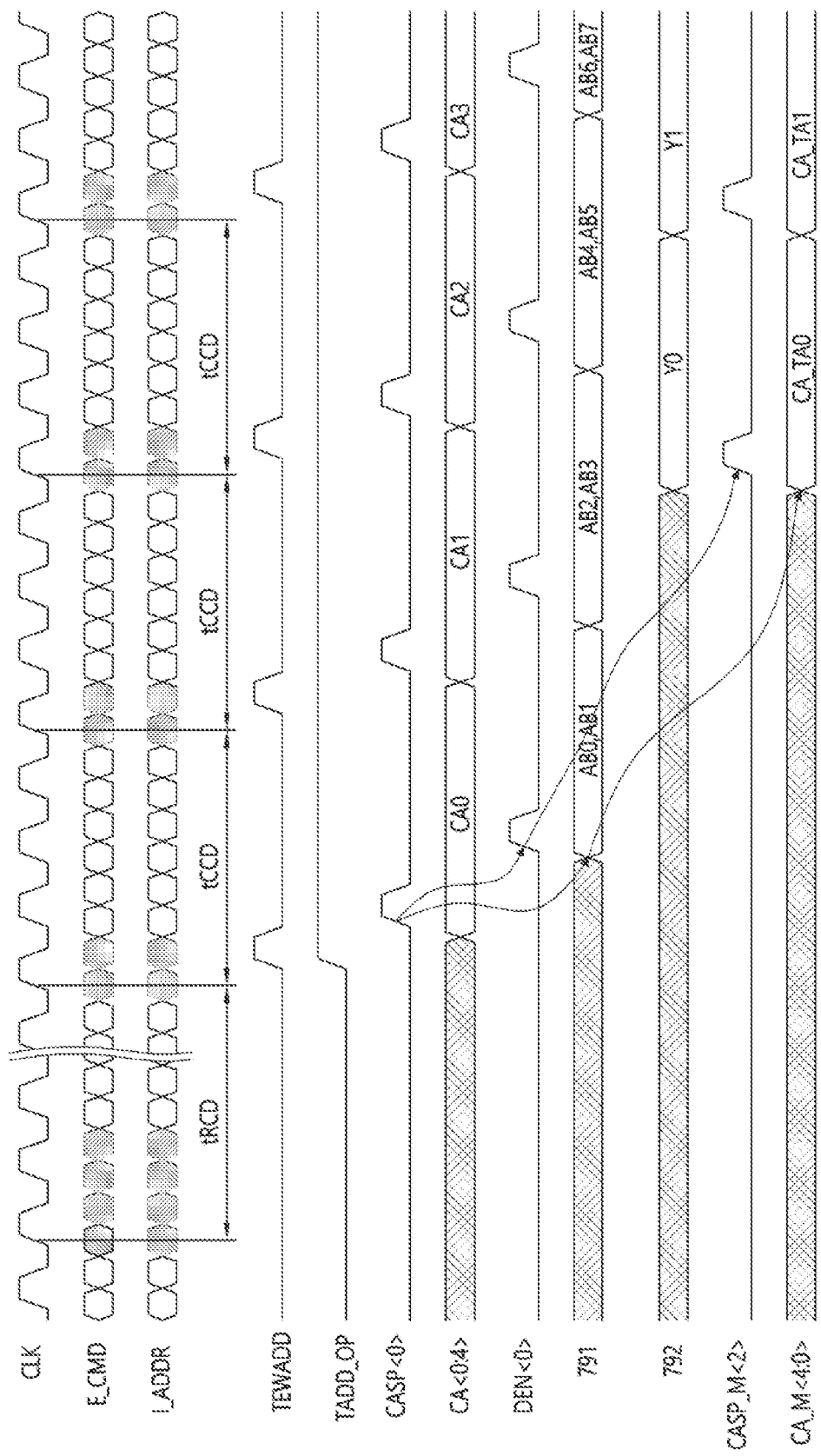
FIG. 55 is a timing diagram illustrating the operation method of the PIM device in accordance with the embodiment of the present disclosure.

FIG. 55 is a timing diagram illustrating the operation method of the PIM device 1500 in accordance with the embodiment of the present disclosure. The operation method of the PIM device 1500 will be described below with reference to FIGS. 49 to 55. The external device 1501 or the control circuit inside the PIM device 1500 may generate a merge matrix by merging first and second matrices so that the PIM device 1500 may perform an element-wise arithmetic operation. In order to perform the element-wise arithmetic operation, the PIM device 1500 may store elements of the merge matrix in the first memory bank BK0. When all the elements of the merge matrix are stored in the first memory bank BK0, the PIM device 1500 may generate the active signal ACT and the row address signal ADDR_R based on the external command signal E_CMD and the input address signal I_ADDR to perform an active operation. The external command signal E_CMD and the input address signal I_ADDR may be input to the PIM device 1500 in synchronization with a clock signal CLK. Rows with the same order among the plurality of rows of the first and second memory banks BK0 and BK1 may be enabled based on the active signal ACT and the row address signal ADDR_R.

When a time that corresponds to tRCD elapses after the first and second memory banks BK0 and BK1 are activated and the external command signal E_CMD that instructs the active operation is received, a first external command signal E_CMD and a first input address signal I_ADDR for performing the element-wise arithmetic operation may be input to the PIM device 1500. The tRCD may be defined by a time interval during which a column command signal is input after a row command signal is input. The external command signal E_CMD for performing the active operation may be included in the row command signal, and the external command signal E_CMD for performing the element-wise arithmetic operation may be included in the column command signal. The command decoder 750 may generate a first calculation signal TEWADD based on the first external command signal E_CMD, and the address latch 760 may output the first input address signal I_ADDR as a first column address signal ADDR_C<0:n>. The column control circuit 1570 may enable the arithmetic operation signal TADD_OP based on the calculation signal TEWADD, may enable the first bank access control signal CASP<0>, and may provide at least a part of the first column address signal ADDR_C<0:n> as a first bank column address signal CA<0:4> (CA0). A column that is coupled to an enabled row of the first memory bank BK0 may be accessed based on the first bank access control signal CASP<0> and the first bank column address signal CA0. For example, the bank column address signal CA<0:4> may include 5 bits, and 32 columns may be accessed based on the bank column address signal CA<0:4>. First to 32^nd columns may be accessed based on the first bank column address signal CA0. Accordingly, data AB0 and AB1 that correspond to a first element and a second element of the merge matrix (that is, data that corresponds to first elements of the first and second matrices) may be read from the first memory bank BK0. The first memory bank BK0 may enable the first data enable signal DEN<0> while outputting the data AB0 and AB1 that correspond to the first and second elements of the merge matrix. The data AB0 and AB1 that correspond to the first and second elements of the merge matrix may be provided to the MAC operator MAC through the first bank I/O line 791.

When a time corresponding to tCCD elapses, a second external command signal E_CMD and a second input address signal I_ADDR for performing the element-wise arithmetic operation may be received in the PIM device 1500. The tCCD may be defined by a time interval during which another column command signal is input after one column command signal is input. The command decoder 750 may generate a second calculation signal TEWADD based on the second external command signal E_CMD, and the address latch 760 may output the second input address signal I_ADDR as a second column address signal ADDR_C<0:n>. The column control circuit 1570 may second enable the first bank access control signal CASP<0> based on the second calculation signal TEWADD, and may provide at least a part of the second column address signal ADDR_C<0:n> as a second bank column address signal CA<0:4> (CA1). Columns that are coupled to the enabled row of the first memory bank BK0 may be accessed based on the first bank access control signal CASP<0> and the second bank column address signal CA1. For example, 33^rd to 64^th columns may be accessed based on the second bank column address signal CA1. Accordingly, 32-bit data AB2 and AB3 that correspond to third and fourth elements of the merge matrix may be read from the first memory bank BK0. The first memory bank BK0 may enable the first data enable signal DEN<0> while outputting the data AB2 and AB3 that correspond to the third and fourth elements of the merge matrix. The data AB2 and AB3 that correspond to the third and fourth elements of the merge matrix may be provided to the MAC operator MAC through the first bank I/O line 791.

When a time corresponding to tCCD elapses, a third external command signal E_CMD and a third input address signal I_ADDR for performing the element-wise arithmetic operation may be received in the PIM device 1500. The command decoder 750 may generate a third calculation signal TEWADD based on the third external command signal E_CMD, and the address latch 760 may output the third input address signal I_ADDR as a third column address signal ADDR_C<0:n>. The column control circuit 1570 may third enable the first bank access control signal CASP<0> based on the third calculation signal TEWADD and may provide at least a part of the third column address signal ADDR_C<0:n> as a third bank column address signal CA<0:4> (CA2). Columns that are coupled to the enabled row of the first memory bank BK0 may be accessed based on the first bank access control signal CASP<0> and the third bank column address signal CA2. For example, 65^th to 96^th columns may be accessed based on the third bank column address signal CA2. Accordingly, 32-bit data AB4 and AB5 that correspond to fifth and sixth elements of the merge matrix may be read from the first memory bank BK0. The first memory bank BK0 may enable the first data enable signal DEN<0> while outputting the data AB4 and AB5 that correspond to the fifth and sixth elements of the merge matrix. The data AB4 and AB5 that correspond to the fifth and sixth elements of the merge matrix may be provided to the MAC operator MAC through the first bank I/O line 791.

When a time that corresponds to tCCD elapses, a fourth external command signal E_CMD and a fourth input address signal I_ADDR for performing the element-wise arithmetic operation may be received in the PIM device 1500. The command decoder 750 may generate a fourth calculation signal TEWADD based on the fourth external command signal E_CMD, and the address latch 760 may output the fourth input address signal I_ADDR as a fourth column address signal ADDR_C<0:n>. The column control circuit 1570 may fourth enable the first bank access control signal CASP<0> based on the fourth calculation signal TEWADD and may provide at least a part of the fourth column address signal ADDR_C<0:n> as a fourth bank column address signal CA<0:4> (CA3). Columns that are coupled to the enabled row of the first memory bank BK0 may be accessed based on the first bank access control signal CASP<0> and the fourth bank column address signal CA3. For example, 97^th to 128^th columns may be accessed based on the fourth bank column address signal CA3. Accordingly, 32-bit data AB6 and AB7 that correspond to seventh and eighth elements of the merge matrix may be read from the first memory bank BK0. The first memory bank BK0 may enable the first data enable signal DEN<0> while outputting the data AB6 and AB7 that correspond to the seventh and eighth elements of the merge matrix. The data AB6 and AB7 that correspond to the seventh and eighth elements of the merge matrix may be provided to the MAC operator MAC through the first bank I/O line 791.

The MAC operator MAC may receive data, read from the first memory bank BK0, through the first bank I/O line 791, and may perform a calculation on the received data. The MAC operator MAC may receive the 32-bit data AB0 and AB1, corresponding to the first and second elements of the merge matrix, from the first memory bank BK0. The global buffer 1595 may provide data with the value of '1' to the MAC operator MAC based on the arithmetic operation signal TADD_OP. The MAC operator MAC may generate a first arithmetic data Y0 by performing a calculation on the 16-bit data AB0 that corresponds to the first element of the merge matrix and the 16-bit data AB1 that corresponds to the second element of the merge matrix, and may output the first arithmetic data Y0 to the second memory bank BK1 through the second bank I/O line 792. When the predetermined time elapses after the first data enable signal DEN<0> is first received, the MAC operator MAC may enable the delayed bank access control signal CASP_TA<1>. The MAC operator MAC may sequentially store the first to fourth bank column address signals CA0, CA1, CA2, and CA3 based on the first bank access control signal CASP<0>, and may output the first bank column address signal CA0 as a first delayed column address signal CA_TA<0:4> (CA_TA0) when the first delayed bank access control signal CASP_TA<1> is enabled. The second memory bank BK1 may receive the first delayed bank access control signal CASP_TA<1> and the first delayed column address signal CA_TA0. Columns that are coupled to an enabled row of the second memory bank BK1 may be accessed based on the first delayed bank access control signal CASP_TA<1> and the first delayed column address signal CA_TA0. First to 32^nd columns may be accessed based on the first delayed column address signal CA_TA0, and the first arithmetic data Y0 as a first element of the third matrix may be written into the second memory bank BK1. The 16-bit arithmetic data Y0 may be written into the first to sixteenth columns that are coupled to the enabled row of the second memory bank BK1, and '0' may be stored in the seventeenth to 32^nd columns. '0' may be stored in the seventeenth to 32^nd columns for zero padding.

The MAC operator MAC may receive the 32-bit data AB2 and AB3, corresponding to the third and fourth elements of the merge matrix, from the first memory bank BK0. The MAC operator MAC may generate second arithmetic data Y1 by performing a calculation on the 16-bit data AB2 corresponding to the third element of the merge matrix and the 16-bit data AB3 corresponding to the fourth element of the merge matrix, and may output the second arithmetic data Y1 to the second memory bank BK1 through the second bank I/O line 792. When the predetermined time elapses after the first data enable signal DEN<0> is second received, the MAC operator MAC may second enable the delayed bank access control signal CASP_TA<1>. The MAC operator MAC may output the second bank column address signal CA1 as a second delayed column address signal CA_TA<0:4> (CA_TA1) when the second delayed bank access control signal CASP_TA<1> is enabled. The second memory bank BK1 may receive the second delayed bank access control signal CASP_TA<1> and the second delayed column address signal CA_TA1. Columns that are coupled to an enabled row of the second memory bank BK1 may be accessed based on the second delayed bank access control signal CASP_TA<1> and the second delayed column address signal CA_TA1. 33^rd to 64^th columns may be accessed based on the second delayed column address signal CA_TA1, and the second arithmetic data Y1 as a second element of the third matrix may be written into the second memory bank BK1. The 16-bit arithmetic data Y1 may be written into the 33^rd to 48^th columns that are coupled to the enabled row of the second memory bank BK1, and '0' may be stored in the 49^th to 64^th columns.

When data that corresponds to all the elements of the merge matrix are read from the first memory bank BK0 and all arithmetic data generated by the MAC operator MAC are written into the second memory bank BK1, the element-wise arithmetic operation of the PIM device 1500 may be ended.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of controlling a processing-in-memory (PIM) device, which comprises a multiplication-accumulative addition (MAC) operator coupled to at least a first memory bank, a second memory bank, and a third memory bank, the MAC operator comprising devices, which perform multiplication-accumulative addition, the method comprising:
    writing data, corresponding to a plurality of elements of a first matrix, to the first memory bank, and writing data, corresponding to a plurality of elements of the second matrix, to the second memory bank;
    reading data, corresponding to elements with the same order among the pluralities of elements of the first and second matrices, from the first and second memory banks;
    generating arithmetic data by performing a calculation on data that is read from the first and second memory banks through the multiplication-accumulative addition operator; and
    writing the arithmetic data to the third memory bank,
    wherein the plurality of elements of the first matrix are written into a plurality of columns that are coupled to one row of the first memory bank,
    wherein the plurality of elements of the second matrix are written into a plurality of columns that are coupled to one row of the second memory bank, which has the same order as the one row of the first memory bank, and
    wherein elements with the same order among the pluralities of elements of the first and second matrices are written into columns, respectively, with the same order of the first and second memory banks.

2. The method according to claim 1, wherein the reading comprises:
    enabling rows with the same order of the first and second memory banks; and
    sequentially accessing a plurality of columns with the same order that is coupled to rows with the same order, and reading data, corresponding to elements with the same order of the first and second matrices, from the first and second memory banks.

3. The method according to claim 2, wherein the generating of the arithmetic data comprises:
    sequentially receiving data that corresponds to all the elements of the first and second matrices, and sequentially generating a plurality of arithmetic data; and
    sequentially providing the plurality of arithmetic data to the third memory bank.

4. The method according to claim 3, wherein the sequentially providing of the plurality of arithmetic data to the third memory bank involves sequentially accessing a plurality of columns that are coupled to a row of the third memory bank with the same order as rows of the first and second memory banks and sequentially writing the plurality of arithmetic data.

5. The method according to claim 4, wherein arithmetic data with orders corresponding to the elements of the first and second matrices are sequentially written into columns, respectively, with the same orders as columns to which the elements of the first and second matrices are written.

6. The method according to claim 4, further comprising:
enabling a row with the same order of the third memory bank at the same time as or after enabling rows with the same order of the first and second memory banks.

7. The method according to claim 1, wherein, in the generating of the arithmetic data, a calculation that is performed on data that is read from the first and second memory banks is a multiplication calculation.

8. The method according to claim 1, wherein, in the generating of the arithmetic data, a calculation that is performed on data that is read from the first and second memory banks is an addition calculation.

9. A processing-in-memory (PIM) device comprising:
a first memory bank configured to output data that corresponds to a plurality of elements of a first matrix based on a first bank access control signal and a bank column address signal;
a second memory bank configured to output data that corresponds to a plurality of elements of a second matrix based on a second bank access control signal and the bank column address signal;
a third memory bank configured to store arithmetic data based on a delayed bank access control signal and a delayed column address signal;
a column control circuit configured to generate the first bank access control signal, the second bank access control signal, and an arithmetic operation signal based on a calculation signal, which is generated by decoding an external command signal received from an external device, and configured to generate the bank column address signal based on a column address signal, which is generated based on an input address signal received from the external device; and
a multiplication-accumulative addition (MAC) operator configured to generate the arithmetic data by performing a calculation on data that is output from the first and second memory banks, provide the arithmetic data to the third memory bank, and generate the delayed bank access control signal and the delayed column address signal based on the first bank access control signal, the second bank access control signal, the arithmetic operation signal, and the bank column address signal.

10. The PIM device according to claim 9,
wherein the MAC operator comprises an arithmetic circuit which performs a calculation on data that is output from the first and second memory banks,
wherein the arithmetic circuit comprises:
a first multiplier configured to generate a first arithmetic data by performing a multiplication calculation on at least data, corresponding to a first element of the first matrix, output from the first memory bank and data, corresponding to a first element of the second matrix, output from the second memory bank;
a second multiplier configured to generate second arithmetic data by performing a multiplication calculation on data, corresponding to a second element of the first matrix, output from the first memory bank and data, corresponding to a second element of the second matrix, output from the second memory bank; and
at least one adder configured to add outputs of the first and second arithmetic data, and
wherein the MAC operator outputs the first and second arithmetic data to an output terminal of the arithmetic circuit based on the arithmetic operation signal.

11. The PIM device according to claim 9, wherein the MAC operator comprises:
a write control circuit configured to generate a write start signal based on the arithmetic operation signal and at least one of a first data enable signal and a second data enable signal, and configured to generate the delayed bank access control signal by delaying the write start signal; and
an address control circuit configured to generate the delayed column address signal by delaying the bank column address signal.

12. The PIM device according to claim 11, wherein the write control circuit comprises:
a write start signal generation circuit configured to enable the write start signal each time at least one of the first and second data enable signals is enabled in a state in which the arithmetic operation signal is enabled;
a first delay circuit configured to generate a delayed write start signal by delaying the write start signal, and generate a plurality of delay signals by sequentially delaying the write start signal by a predetermined time; and
a delayed access signal generation circuit configured to generate the delayed bank access control signal based on the delayed write start signal.

13. The PIM device according to claim 12, wherein a delay time of the first delay circuit corresponds to a time during which the MAC operation performs a calculation.

14. The PIM device according to claim 12, wherein the address control circuit comprises:
a pipe circuit configured to sequentially store the bank column address signal each time the bank column address signal is inputted, and sequentially output the stored bank column address signal based on the plurality of delay signals; and
a second delay circuit configured to generate the delayed column address signal by delaying an output of the pipe circuit.

15. The PIM device according to claim 14, wherein a delay time of the second delay circuit corresponds to a time during which the delayed access signal generation circuit generates the delayed bank access control signal from the delayed write start signal.

16. The PIM device according to claim 12, wherein the address control circuit comprises:
a pipe circuit configured to sequentially store the bank column address signal each time the first bank access control signal is enabled, and sequentially output the sequentially stored bank column address signal as the delayed column address signal each time the delayed bank access control signal is enabled.

17. The PIM device according to claim 11,
wherein the first memory bank comprises a delay circuit that generates the first data enable signal by delaying the first bank access control signal, and
wherein a delay time of the delay circuit corresponds to an amount of time between the first memory bank being received by the first bank access control signal and data being output from the first memory bank.

18. The PIM device according to claim 11,
wherein the second memory bank comprises a delay circuit which generates the second data enable signal by delaying the second bank access control signal, and
wherein a delay time of the delay circuit corresponds to an amount of time between the second memory bank being received by the second bank access control signal and data being output from the second memory bank.

19. The PIM device according to claim 11, wherein the third memory bank comprises:
- a first selection circuit configured to output one of the bank column address signal and the delayed column address signal as an internal column address signal based on the arithmetic operation signal; and
- a second selection circuit configured to output one of a third bank access control signal and the delayed bank access control signal as an internal bank access control signal based on the arithmetic operation signal,
wherein the third memory bank is accessed based on the internal column address signal and the internal bank access control signal.

* * * * *